(12) United States Patent
Pohl

(10) Patent No.: US 12,137,299 B2
(45) Date of Patent: Nov. 5, 2024

(54) DEVICE AND METHOD TO DETERMINE AN ASPECT RATIO AND A FORMAT OF AN IMMERSIVE IMAGE

(71) Applicant: ImmerVR GmbH, HeBdorf (DE)

(72) Inventor: Daniel Pohl, Hessdorf (DE)

(73) Assignee: immerVR GmbH (DE)

( * ) Notice: Subject to any disclaimer, the term of this patent is extended or adjusted under 35 U.S.C. 154(b) by 148 days.

(21) Appl. No.: 18/060,742

(22) Filed: Dec. 1, 2022

(65) Prior Publication Data

US 2023/0179736 A1    Jun. 8, 2023

(30) Foreign Application Priority Data

Dec. 8, 2021    (DE) .................... 10 2021 132 275.8

(51) Int. Cl.
| | | |
|---|---|---|
| H04N 7/01 | (2006.01) | |
| G06T 7/11 | (2017.01) | |
| G06T 7/62 | (2017.01) | |
| G06V 10/44 | (2022.01) | |
| G06V 10/60 | (2022.01) | |
| G06V 10/74 | (2022.01) | |
| G06V 10/75 | (2022.01) | |

(52) U.S. Cl.
CPC ............. *H04N 7/0122* (2013.01); *G06T 7/11* (2017.01); *G06T 7/62* (2017.01); *G06V 10/443* (2022.01); *G06V 10/60* (2022.01); *G06V 10/751* (2022.01); *G06V 10/761* (2022.01)

(58) Field of Classification Search
CPC ...... H04N 7/0122; H04N 13/139; G06T 7/11; G06T 7/62; G06T 7/70; G06T 2207/20084; G06V 10/443; G06V 10/60; G06V 10/751; G06V 10/761
See application file for complete search history.

(56) References Cited

U.S. PATENT DOCUMENTS

| | | | | |
|---|---|---|---|---|
| 8,134,596 | B2 * | 3/2012 | Lei ........................ | G06T 7/254 |
| | | | | 348/739 |
| 8,411,931 | B2 * | 4/2013 | Zhou .................... | H04N 13/139 |
| | | | | 382/154 |
| 8,472,120 | B2 * | 6/2013 | Border ................ | G02B 27/017 |
| | | | | 359/13 |
| 9,338,589 | B2 * | 5/2016 | Loxam .................... | G06T 11/60 |
| 10,268,893 | B2 | 4/2019 | Birkbeck et al. | |
| 10,769,438 | B2 * | 9/2020 | Bendale ............... | G06V 10/235 |
| 10,904,570 | B2 * | 1/2021 | Lim .................... | H04N 19/597 |

(Continued)

OTHER PUBLICATIONS

Extended European Search Report issued in application No. 22209294.2, dated Mar. 29, 2023.

(Continued)

*Primary Examiner* — Vijay Shankar
(74) *Attorney, Agent, or Firm* — BARNES & THORNBURG LLP; Jeffrey R. Stone

(57) ABSTRACT

A device and a method for determining a format of an immersive image and/or for rendering an immersive image are disclosed, wherein the device for determining a format of an immersive image includes one or more processors configured to: determine an aspect ratio of an immersive image and one or more additional characteristics of the immersive image; and determine a format of the immersive image using the determined aspect ratio and the determined one or more additional characteristics of the immersive image.

18 Claims, 29 Drawing Sheets

(56) References Cited

U.S. PATENT DOCUMENTS

| | | | |
|---|---|---|---|
| 2002/0126129 A1 | 9/2002 | Snyder et al. | |
| 2017/0344830 A1* | 11/2017 | Birkbeck | G06F 16/7837 |
| 2018/0270468 A1 | 9/2018 | Zhou | |
| 2018/0341811 A1* | 11/2018 | Bendale | G06V 20/70 |
| 2019/0158825 A1 | 5/2019 | Ma et al. | |
| 2019/0373287 A1 | 12/2019 | Lim et al. | |
| 2020/0221067 A1 | 7/2020 | Abbas et al. | |

OTHER PUBLICATIONS

Communication pursuant to Article 94(3) EPC issued by the European Patent Office for Application No. 22 209 294.2 and dated Mar. 25, 2024.

\* cited by examiner

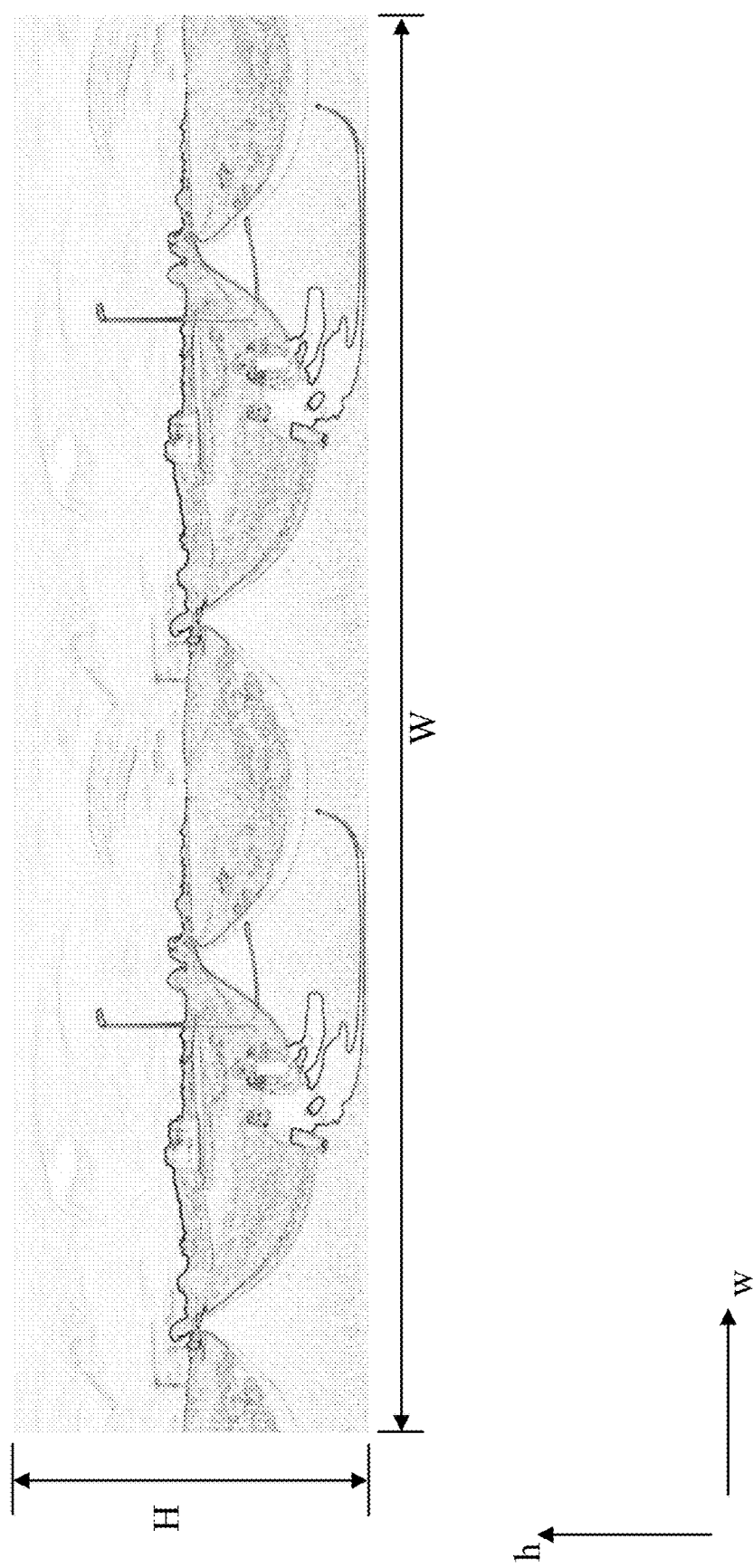

200F

200K 500a  500b  500c  500d  500e  500f 500a-500b  500b-500c  500c-500d  500d-500e  500e-500f

200H

DEVICE AND METHOD TO DETERMINE AN ASPECT RATIO AND A FORMAT OF AN IMMERSIVE IMAGE

CROSS-REFERENCE TO RELATED APPLICATIONS

This application claims priority to German Application DE 10 2021 132 275.8, which was filed on Dec. 8, 2021, the entire contents of which are incorporated by reference herein.

TECHNICAL FIELD

Various embodiments generally relate to a device and method for determining a format of an immersive image and a device and method for rendering an immersive image.

BACKGROUND

Content for computer-simulated reality (such as augmented reality and virtual reality) is represented by immersive media to provide an immersive experience to a user using a dedicated device, such as a head-mounted display. With the rise of computer-simulated reality in the consumer market, various different types and formats of immersive media emerged. Thus, an immersive medium, such as an immersive image or an immersive video, may represent a specific immersive content. In order to provide the computer-simulated reality to the dedicated device and, hence, to the user, it is necessary to know this representation of the immersive content described by the format of the immersive medium. However, so far it is necessary to set the format of the immersive medium manually (e.g., for each immersive image). This prohibits a smooth flow in using immersive media and, hence, reduces the immersive experience for the user.

SUMMARY

According to various aspects, a device and a method are provided which are capable to determine the format of an immersive medium, such as an immersive image and/or an immersive video, substantially automatically (i.e., without a user having to select the format). In various circumstances, a user may not know the format of an immersive medium and, thus, may have to try several formats in order to find the correct one (e.g., by checking the immersive content represented on the dedicated device). Using the device and method for automatically determining the format of the immersive medium, this hurdle is taken. Hence, the device and method improve the immersive experience for the user.

Further, being capable to determine the format of an immersive medium allows to create a (e.g., meaningful) thumbnail of the immersive medium as described herein.

Each of the various formats of immersive media is associated with specific properties. According to various aspects, a device and a method are provided which are capable to improve the rendering of an immersive medium having an Equirectangular format. The rendering method, described herein, may lead to a rendered immersive medium (e.g., image) having a higher quality (e.g., an improved balance between details and blurring).

BRIEF DESCRIPTION OF THE FIGURES

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2A to FIG. 2M show various exemplary immersive images having different formats;

DETAILED DESCRIPTION

Figure 1:
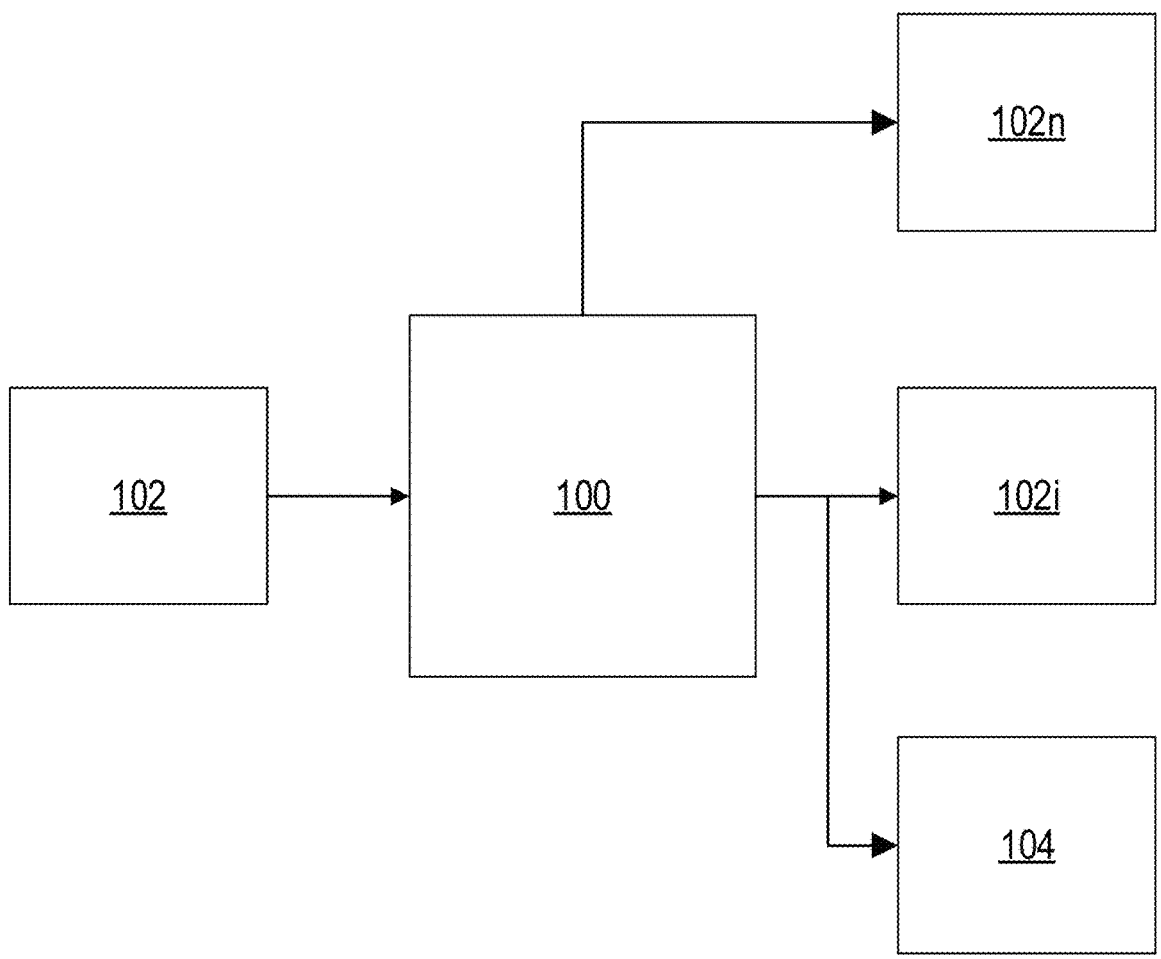
FIG. 1 shows a device according to various aspects.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

The term "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. The term "processor" may be understood as any kind of entity capable to process data and/or signals. For example, the data or signals may be handled according to at least one (i.e., one or more than one) specific function performed by the processor. A processor may include or may be an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described in more detail below, may also be understood to include a processor or logic circuit. It is understood that one or more of the method steps described in detail herein may be carried out (e.g., implemented) by a processor, through one or more specific functions performed by the processor. The processor may therefore be arranged to carry out any of the information processing methods or components thereof described herein.

Until now, it is necessary to manually select the format (e.g., to try several formats in the case that the format is not known) of an immersive image to display the immersive image via a dedicated device (e.g., a head-mounted display). Various aspects relate to a device and a method for automatically determining the format of the immersive image. Hence, the immersive image may be presented to the user via the dedicated device without any required further manual interaction on the side of the user. Illustratively, the device and method improve the computer-simulated reality experience of the user.

FIG. 1 shows a device 100 according to various aspects. The device 100 may include one or more processors. The one or more processors may be configured to process an (e.g., immersive) image 102. The one or more processors may be configured to determine, whether the image 102 is an immersive image 102i. In the case that the image 102 is determined as immersive image 102i, the one or more processors may be configured to determine a format 104 of the immersive image 102i. According to various aspects, the one or more processors may be configured to determine, whether the image 102 is an immersive image 102i or a non-immersive image 102n. A non-immersive image, as described herein, may be a flat two-dimensional image (e.g., generally not used to provide computer-simulated reality).

The immersive image 102i may be an image of an immersive video. According to various aspects, the one or more processors may be configured to process an immersive video. The one or more processors may be configured to determine the format of the immersive video by determining the format 104 of at least one immersive image 102i of the immersive video. An immersive video may include a plurality of images within a predefined time period (e.g., 60 frames per second).

An immersive image, as described herein, may be any kind of image that allows to display, via a dedicated device, computer-simulated reality content in accordance with the image. Hence, an immersive image may show content which allows to provide computer-simulated reality.

Computer-simulated reality (CR) may be related to any kind of immersive environment. The immersive environment may take place in the physical world with, optionally, information (e.g., objects) added virtually (e.g., the computer-simulated reality may be an augmented reality (AR)). The immersive environment may take place in a virtual world (e.g., the computer-simulated reality may be a virtual reality (VR)). It is understood that the virtual world may show a simulation of real-world content. The immersive environment may take place in both, the physical world and the virtual world (e.g., the computer-simulated reality may be a mixed reality (MR)). The immersive environment may be a combination of AR, VR, and MR (e.g., the computer-simulated reality may be an extended reality (XR)). Thus, the immersive image 102 may be associated with AR, VR, MR, and/or XR.

The immersive image 102i may represent a specific content of the computer-simulated reality which is represented by the format 104 of the immersive image 102i. The immersive image 102i may be an image (e.g., photo) taken in the real world, an image rendered by a computer, or an image taken in the real world into which computer-rendered features are added.

The immersive image 102i may represent a specific area within the computer-simulated reality. This area may be defined by a number of degrees the immersive image fills the computer-simulated reality with content. Illustratively, the area may define how many degrees a user can move his angle of view while still seeing computer-simulated reality content.

In an example, a half-sphere may be filled with content. The phrase "filled with content", as used herein, may describe that a pixel having a pixel value (e.g., different from black) may be present. In this case, the immersive image 102i may represent 180 degrees of content. Illustratively, the user can move his head 90 degrees in both directions, left and right, from a center point and still see computer-simulated reality content. In this case, the immersive image 102i may have a half-spherical format (in some aspects referred to as CR180 and exemplarily for virtual reality as VR180). A half-spherical format may be advantageous over a spherical format in that it is easier to capture the immersive image with a camera without the camera (and/or a camera crew) being seen in the immersive image. For example, a stereoscopic, half-spherical immersive image can be easily created using a camera with two lenses. However, in the case of a half-spherical immersive image, the immersive experience may be lowered by seeing the black area in the other region of the sphere in the case of the user moves his/her head.

In another example, a full-sphere may be filled with content. In this case, the immersive image 102i may represent 360 degrees of content. Illustratively, the user can move his head anywhere and still see computer-simulated reality content. In this case, the immersive image 102i may have a (full-) spherical format (in some aspects referred to as CR360 and exemplarily for virtual reality as VR360). A spherical format may be advantageous over a half-spherical format in that the whole 360 degrees around the user are filled with content improving the immersive experience. However, it may be difficult to capture a 360 degrees immersive image without seeing the camera in the image. The 360 degrees immersive image may be created using stitching which, however, may lead to artifacts and, thus, lower the immersive experience.

The above examples serve as illustration. The format 104 of the immersive image 102i may be associated with any number of degrees (filled with content). For example, the immersive image may have format of 130 degrees (CR130, such as VR130), 140 degrees (CR140, such as VR140), 270 degrees (CR270, such as VR270), etc.

The immersive image 102*i* may have an Equirectangular format, a Fisheye format or a Cubemap format.

The Equirectangular format is characterized by a map projection in which meridians are mapped to vertical straight lines of constant spacing (e.g., for meridional intervals of constant spacing) and circles of latitude are mapped to horizontal straight lines of constant spacing (e.g., for constant intervals of parallels). The projection is neither equal area nor conformal. Hence, spherical or half-spherical content may be mapped to a rectangle.

The Fisheye format is characterized by circular representation. The circle in the center of the image may be filled with content whereas the region outside the circle may be black. A Fisheye format may be, for example, captured using a camera having wide-angle lense(s).

The Cubemap format is characterized by six images representing six faces of a cube. "Folding" the six images may lead to the cube and a spectator located inside the cube can see the six images providing spherical content of 360 degrees.

The format of the immersive image 102*i* may indicate, whether the immersive image 102*i* is a stereoscopic image or a monoscopic image. In the case of a monoscopic image, the immersive image 102*i* may include the same content for the left eye and the right eye of the user. In the case of a stereoscopic image, the immersive image 102 may include different content for the left eye and the right eye of the user (e.g., a slightly different perspective).

The Cubemap format may be associated with a spherical content. Besides that, the format 104 of the immersive image 102*i* may represent:
  whether the immersive image 102*i* has a Equirectangular format, the Fisheye format or the Cubemap format;
  whether the immersive image 102*i* has a stereoscopic or a monoscopic format; and
  the number of degrees which are filled with content.

In the case that the format 104 of the immersive image 102*i* is associated with a stereoscopic format, the format 104 may further indicate whether the two images (i.e., the one for the left eye and the one for the right eye) of the stereoscopic immersive image 102*i*:
  are arranged side-by-side (e.g., left/right), or
  are arranged on top of each other (e.g., top/down), or
  exist as two separate files.

In the following, the number of degrees which are filled with content are described as either being half-spherical (CR180) or spherical (CR360) for illustration. It is noted that the format 104 may be associated with any number of degrees equal to or less than 360 degrees (e.g., any number in the range from about 80 degrees to about 360 degrees).

Hence, the format 104 of the immersive image 102*i* may be a format from the following list of formats:
  a monoscopic, half-spherical Equirectangular format;
  a monoscopic, spherical Equirectangular format;
  a stereoscopic, half-spherical Equirectangular format, wherein the two images of the stereoscopic immersive image are arranged side-by-side;
  a stereoscopic, half-spherical Equirectangular format, wherein the two images of the stereoscopic immersive image are arranged on top of each other;
  a stereoscopic, half-spherical Equirectangular format, wherein the two images of the stereoscopic immersive image exist as two separate files;
  a stereoscopic, spherical Equirectangular format, wherein the two images of the stereoscopic immersive image are arranged side-by-side;
  a stereoscopic, spherical Equirectangular format, wherein the two images of the stereoscopic immersive image are arranged on top of each other;
  a stereoscopic, spherical Equirectangular format, wherein the two images of the stereoscopic immersive image exist as two separate files;
  a monoscopic, half-spherical Fisheye format;
  a monoscopic, spherical Fisheye format represented by two half-spherical images, wherein the two half-spherical images are arranged side-by-side;
  a monoscopic, spherical Fisheye format represented by two half-spherical images, wherein the two half-spherical images are arranged on top of each other;
  a monoscopic, spherical Fisheye format represented by two half-spherical images, wherein the two half-spherical images exist as two separate files;
  a stereoscopic, half-spherical Fisheye format, wherein the two images of the stereoscopic immersive image are arranged side-by-side;
  a stereoscopic, half-spherical Fisheye format, wherein the two images of the stereoscopic immersive image are arranged on top of each other;
  a stereoscopic, half-spherical Fisheye format, wherein the two images of the stereoscopic immersive image exist as two separate files;
  a stereoscopic, spherical Fisheye format represented by two stereoscopic images for one half-sphere and two stereoscopic images for the other half-sphere, wherein the four images are arranged side-by-side;
  a stereoscopic, spherical Fisheye format represented by two stereoscopic images for one half-sphere and two stereoscopic images for the other half-sphere, wherein the four images are arranged on top of each other;
  a stereoscopic, spherical Fisheye format represented by two stereoscopic images for one half-sphere and two stereoscopic images for the other half-sphere, wherein the two stereoscopic images for the same half-sphere are arranged side-by-side and wherein the two stereoscopic images of one half-sphere are arranged on top of the two stereoscopic images of the other half-sphere;
  a stereoscopic, spherical Fisheye format represented by two stereoscopic images for one half-sphere and two stereoscopic images for the other half-sphere, wherein the two stereoscopic images for the same half-sphere are arranged on top of each other and wherein the two stereoscopic images of one half-sphere are arranged side-by-side to the two stereoscopic images of the other half-sphere;
  a stereoscopic, spherical Fisheye format represented by a first stereoscopic file (e.g., for one eye) including two half-spheres of the spherical image and a second stereoscopic file (e.g., for the other eye) including two half-spheres of the spherical image, wherein the images of the two half-spheres are arranged side-by-side;
  a stereoscopic, spherical Fisheye format represented by a first stereoscopic file (e.g., for one eye) including two half-spheres of the spherical image and a second stereoscopic file (e.g., for the other eye) including two half-spheres of the spherical image, wherein the images of the two half-spheres are arranged on top of each other;
  a stereoscopic, spherical Fisheye format represented by two stereoscopic images for one half-sphere and two stereoscopic images for the other half-sphere, wherein the four images exist as four separate files;

a monoscopic, spherical Cubemap format (e.g., the six faces of the Cube may be represented by a single file);

a stereoscopic, spherical Cubemap format, wherein the two images of the stereoscopic immersive image are arranged side-by-side;

a stereoscopic, spherical Cubemap format, wherein the two images of the stereoscopic immersive image are arranged on top of each other;

a stereoscopic, spherical Cubemap format, wherein the two images of the stereoscopic immersive image exist as two separate files;

a monoscopic, spherical Cubemap format, wherein the six faces of the Cube exist as six separate files;

a stereoscopic, spherical Cubemap format, wherein the six faces of each of the stereoscopic Cubes exist as six separate files such that the format is represented by twelve separate files.

The above list illustratively shows that an immersive image, such as the immersive image 102i, may have one format 104 of a plurality of different (possible) formats. It is noted that the two half-spherical images of a spherical Fisheye image may be represent 180 degrees. However, the two half-spherical images of a spherical Fisheye image may also represent 190 degrees; in this case, when combining the two half-spherical images to the spherical Fisheye image, there may be some overlap of the two half-spherical images.

According to various aspects, the one or more processors are configured to determine the format 104 of the immersive image 102 using an aspect ratio of the immersive image 102i and one or more additional characteristics of the immersive image 102i (see, for example, FIG. 4A to FIG. 9).

Figure 2A:
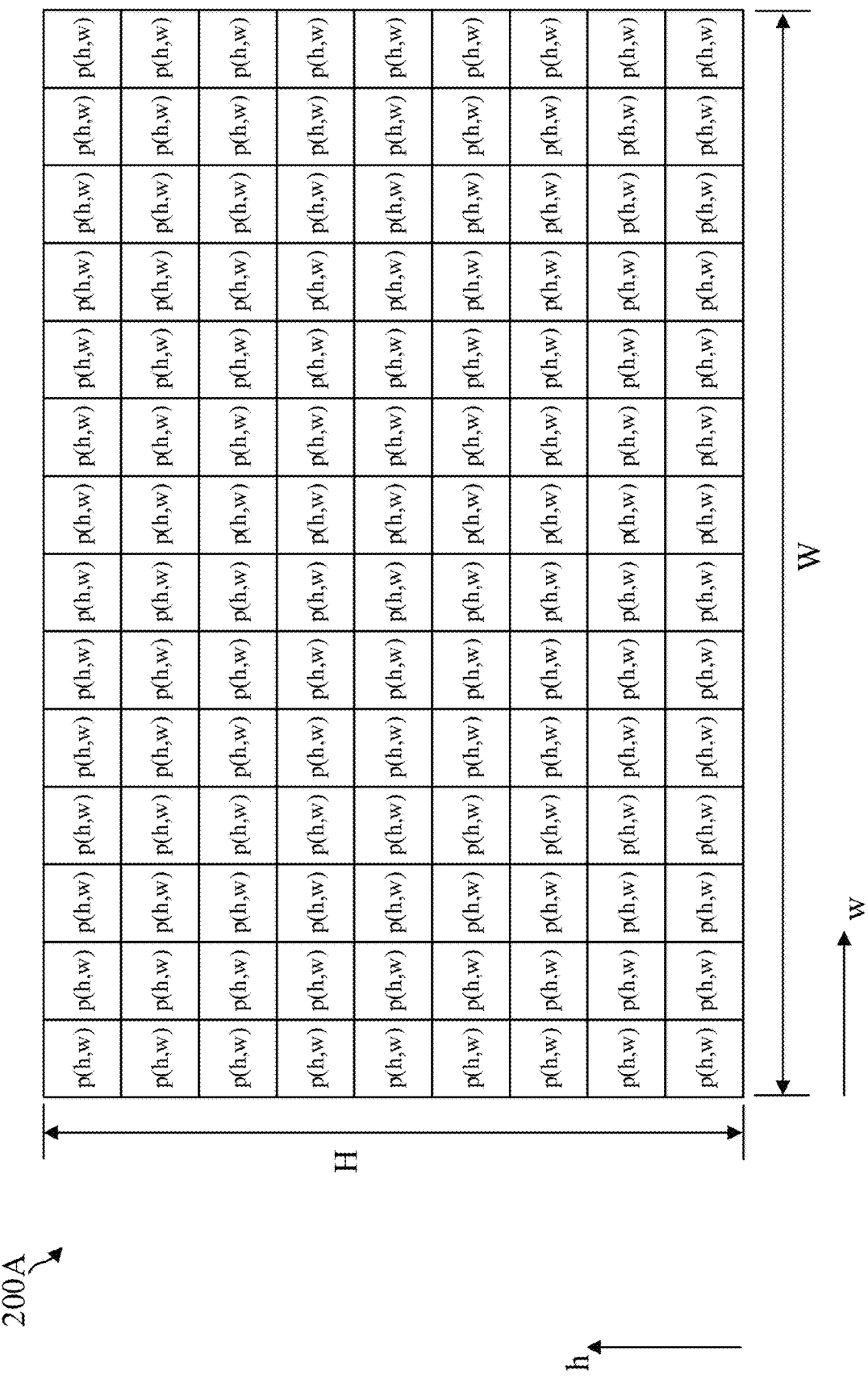

As shown in FIG. 2A, an image 200A (such as the image 102 and/or the immersive image 102i) may include a plurality of pixels p(h, w) arranged adjacent to each other. The plurality of pixels p(h, w) may define a width, W, of the immersive image 200A in a width direction, w, and a height, H, of the immersive image 200A in a height direction, h. Each of the plurality of pixels p(h, w) may be associated with a position within the immersive image 200A different from the position of the other pixels. The position of each pixel may be associated with a position in height direction, h, and a position in width direction, w.

Various exemplary immersive images having different formats are shown in FIG. 2B to FIG. 2M.

Figure 2B:
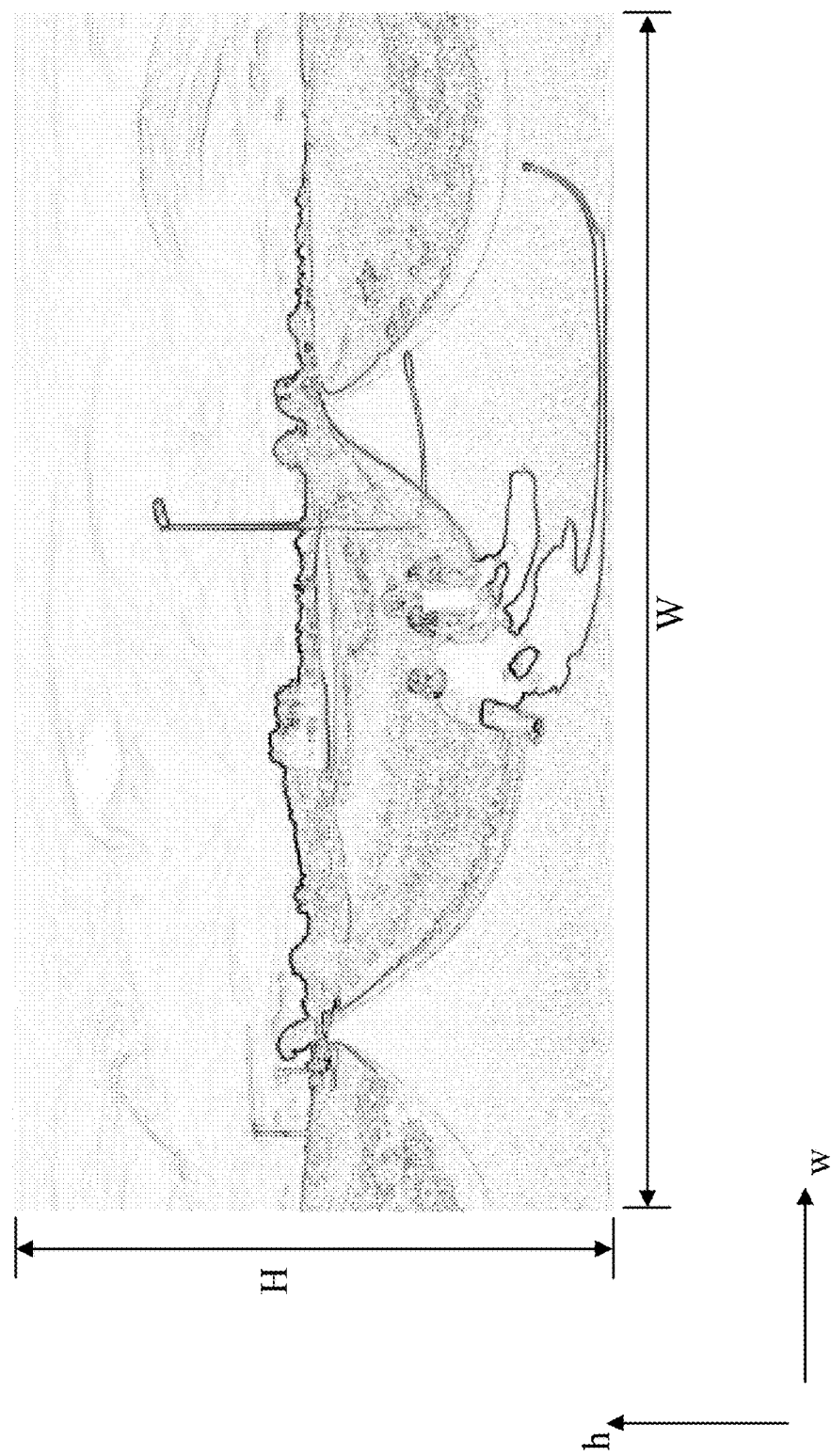

FIG. 2B shows an exemplary immersive image 200B having a monoscopic, spherical Equirectangular format.

Figure 2C:
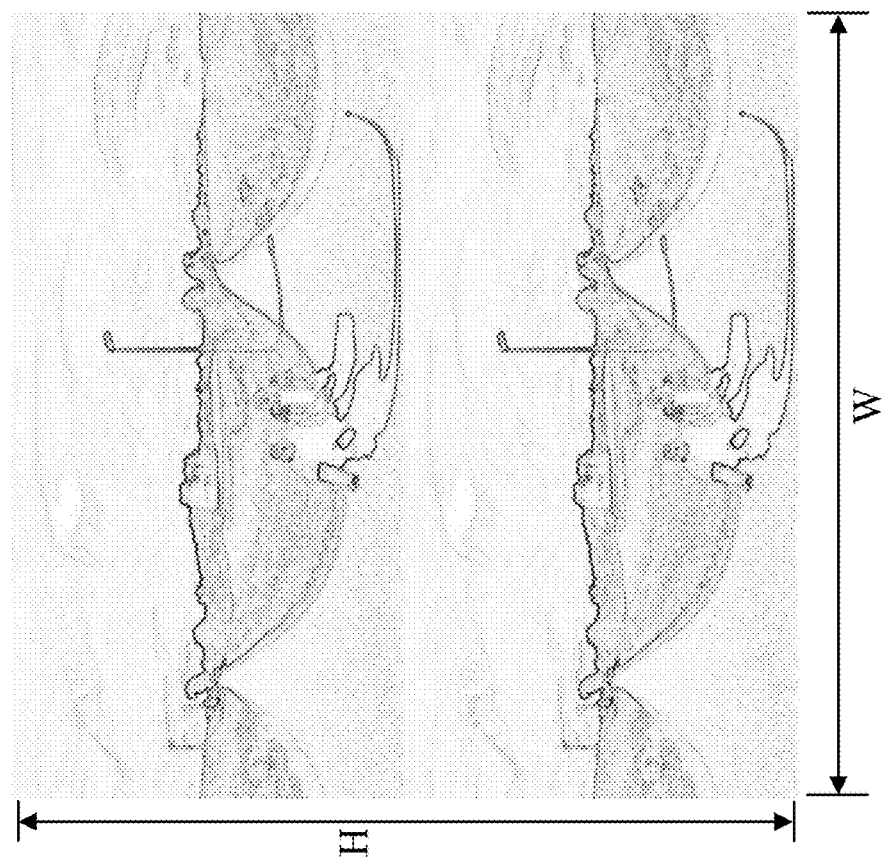
Figure 2C:
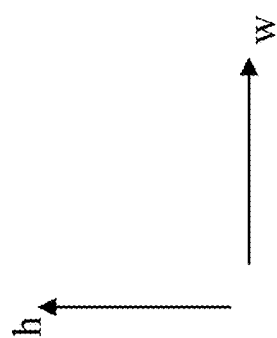

FIG. 2C shows an exemplary immersive image 200C having a stereoscopic, spherical Equirectangular format, wherein the two images (one for the left eye and one of the right eye) of the stereoscopic immersive image are arranged on top of each other.

FIG. 2D shows an exemplary immersive image 200D having a stereoscopic, spherical Equirectangular format, wherein the two images of the stereoscopic immersive image are arranged side-by-side.

Figure 2E:
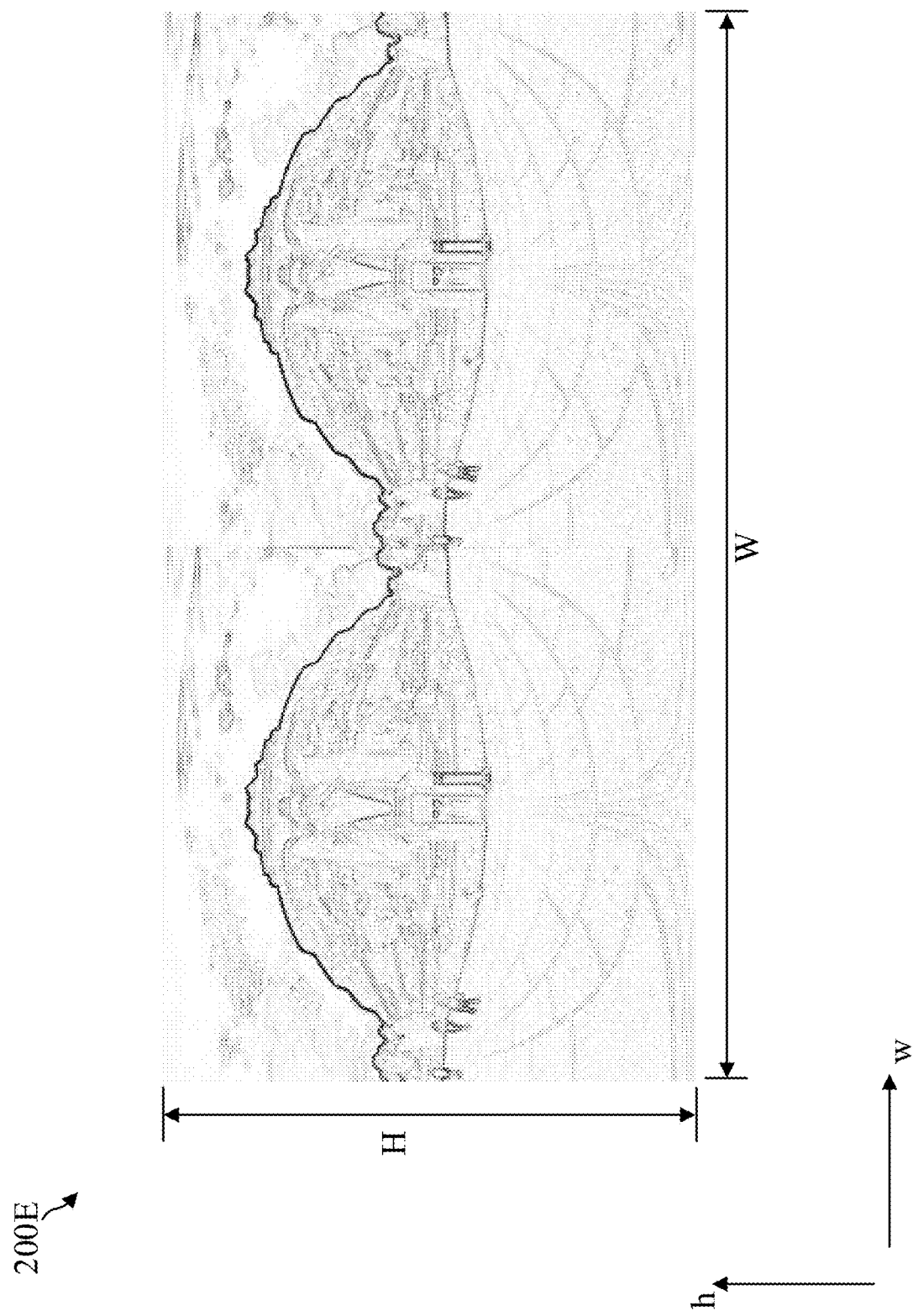

FIG. 2E shows an exemplary immersive image 200E having a stereoscopic, half-spherical Equirectangular format, wherein the two images of the stereoscopic immersive image are arranged side-by-side.

Figure 2F:
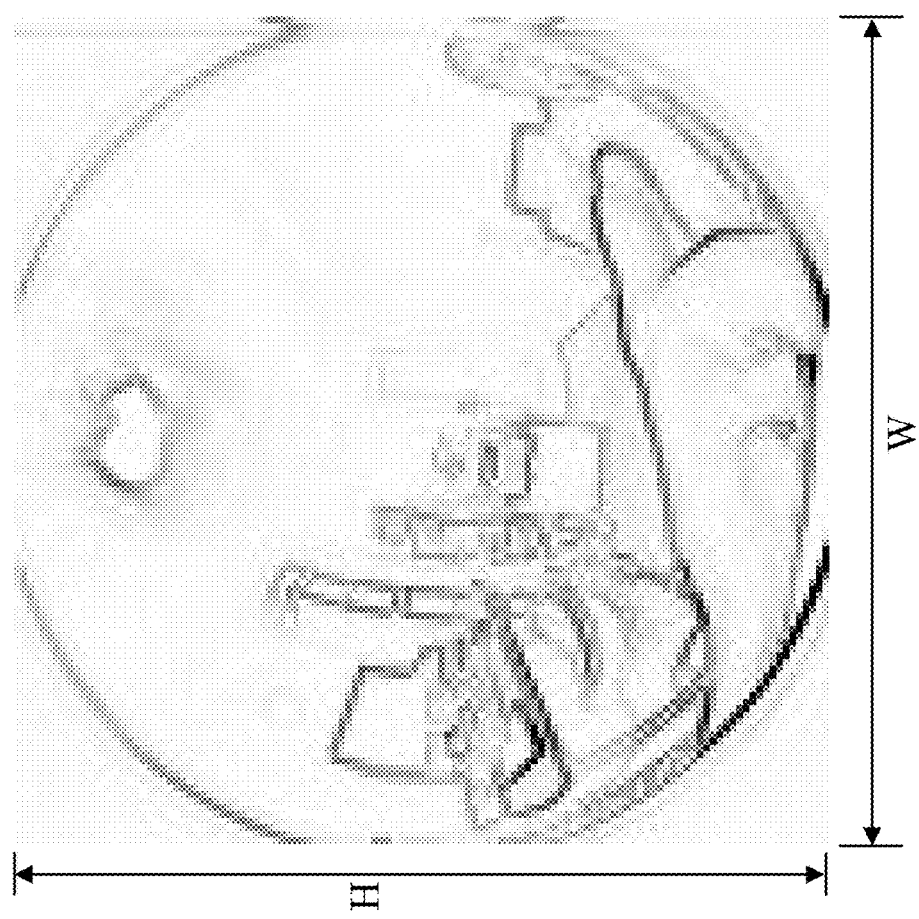
Figure 2F:
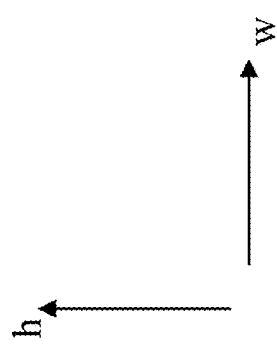

FIG. 2F shows an exemplary immersive image 200F having a monoscopic, half-spherical Fisheye format.

Figure 2G:
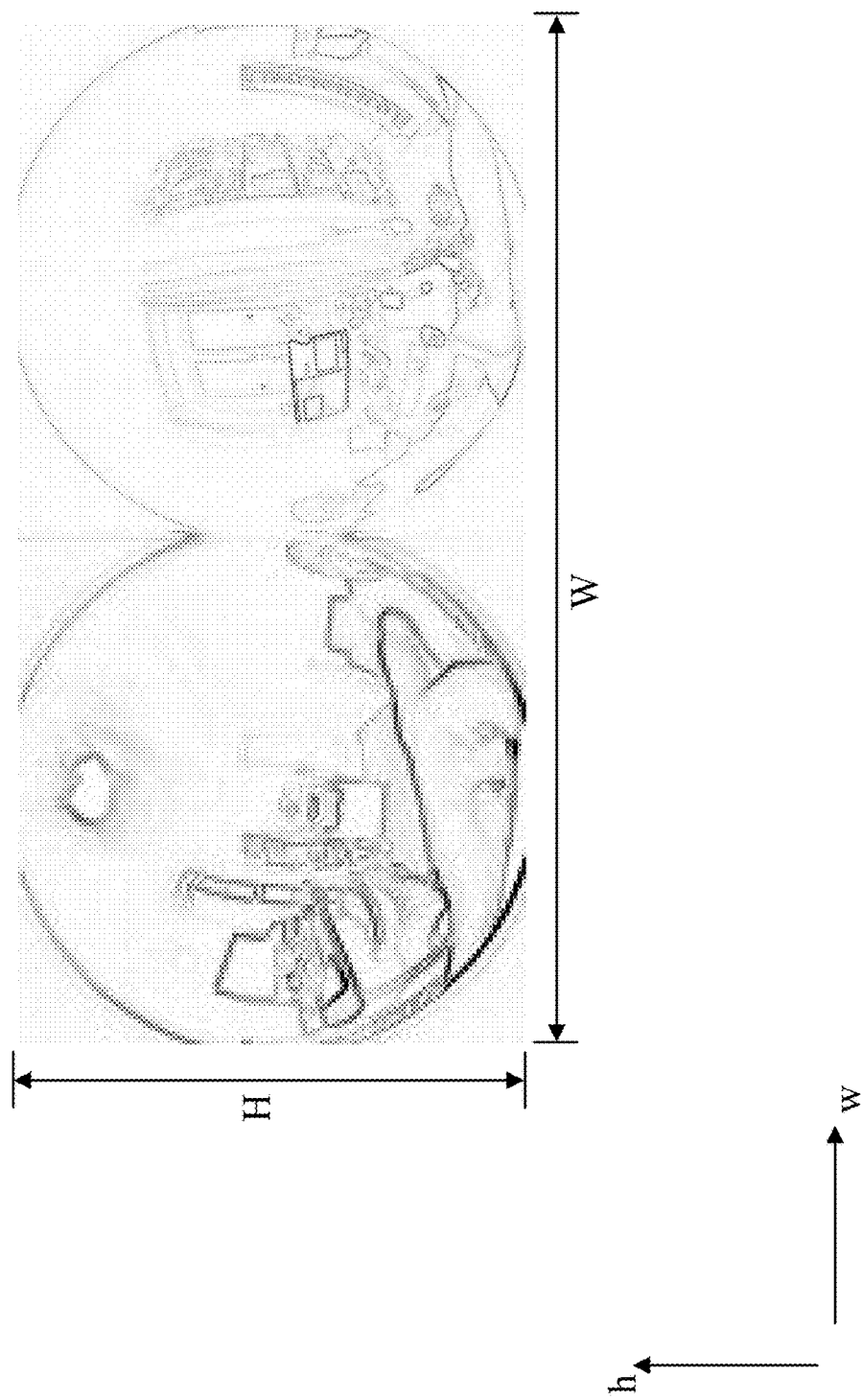

FIG. 2G shows an exemplary immersive image 200G having a monoscopic, spherical Fisheye format represented by two half-spherical images, wherein the two half-spherical images are arranged side-by-side.

Figure 2H:
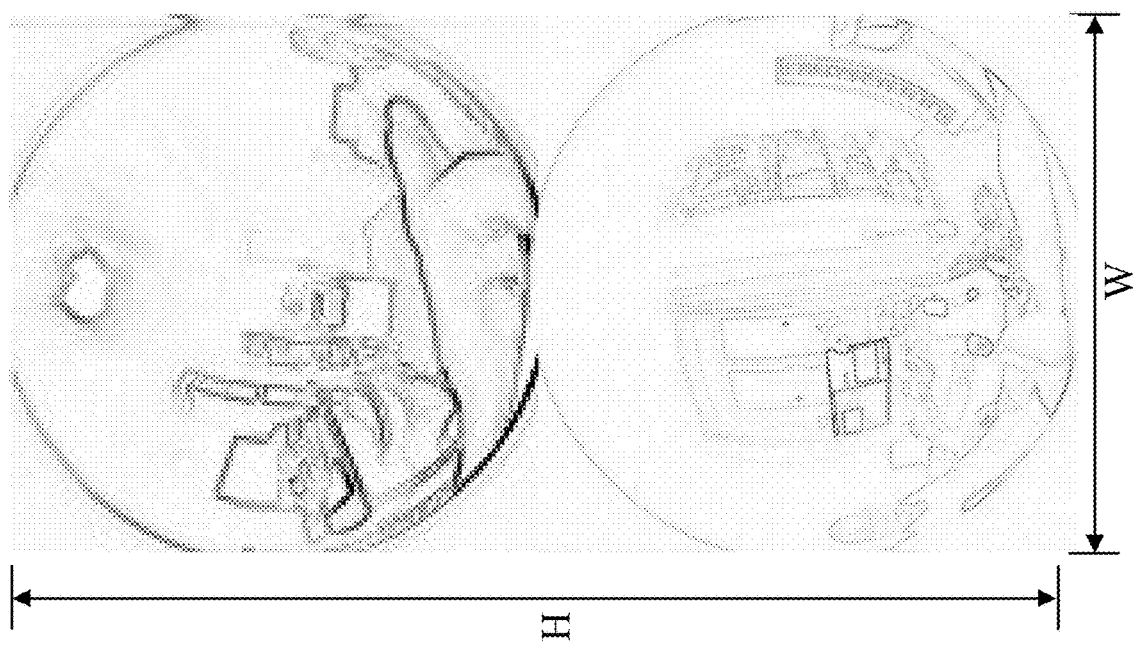
Figure 2H:
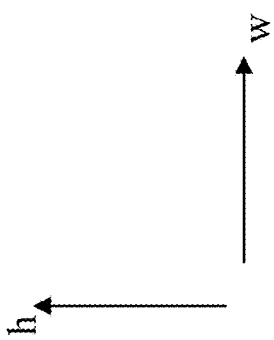

FIG. 2H shows an exemplary immersive image 200H having a monoscopic, spherical Fisheye format represented by two half-spherical images, wherein the two half-spherical images are arranged on top of each other.

Figure 2I:
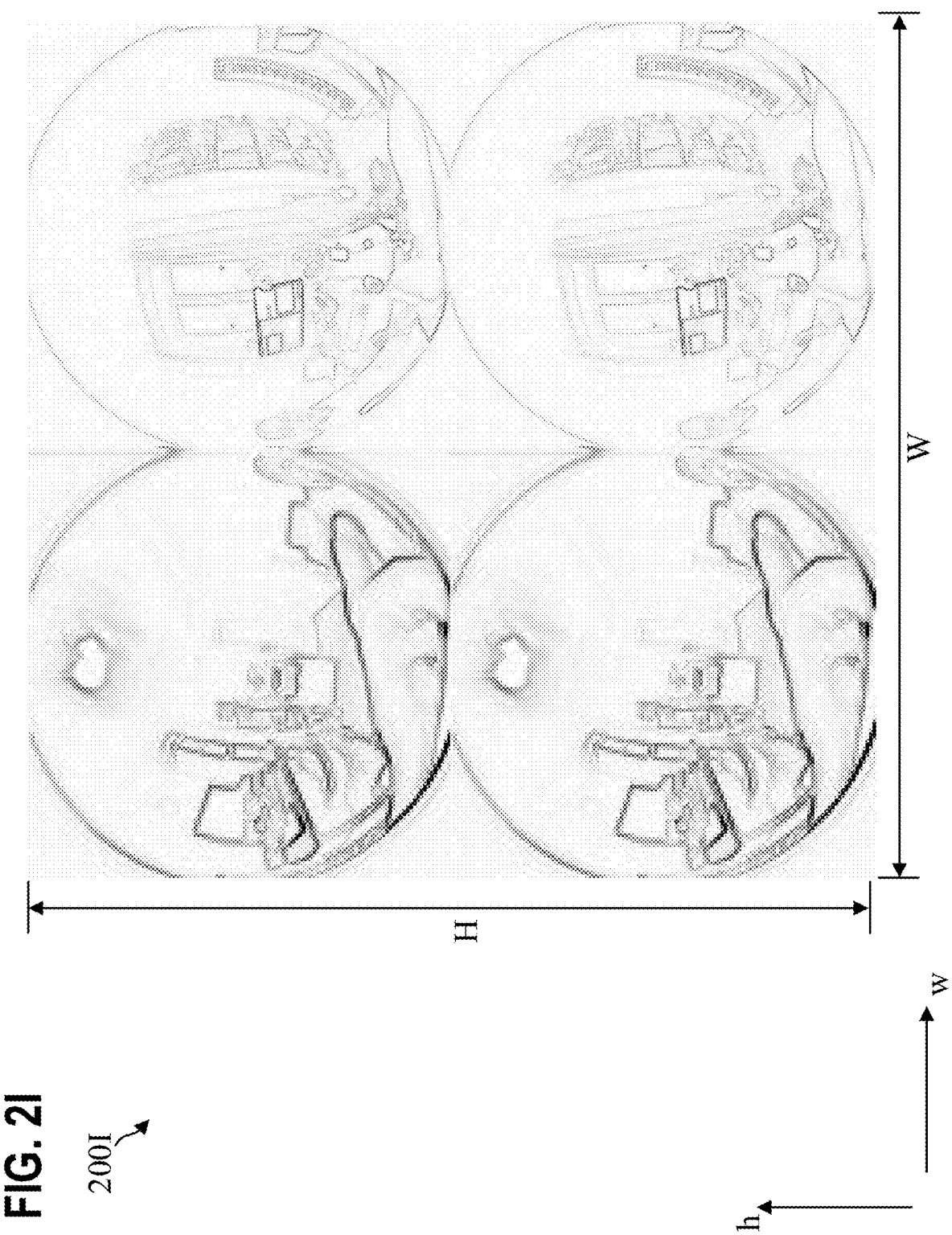

FIG. 2I shows an exemplary immersive image 200I having a stereoscopic, spherical Fisheye format represented by two stereoscopic images for one half-sphere and two stereoscopic images for the other half-sphere, wherein the two stereoscopic images for the same half-sphere are arranged on top of each other and wherein the two stereoscopic images of one half-sphere are arranged side-by-side to the two stereoscopic images of the other half-sphere.

Figure 2J:
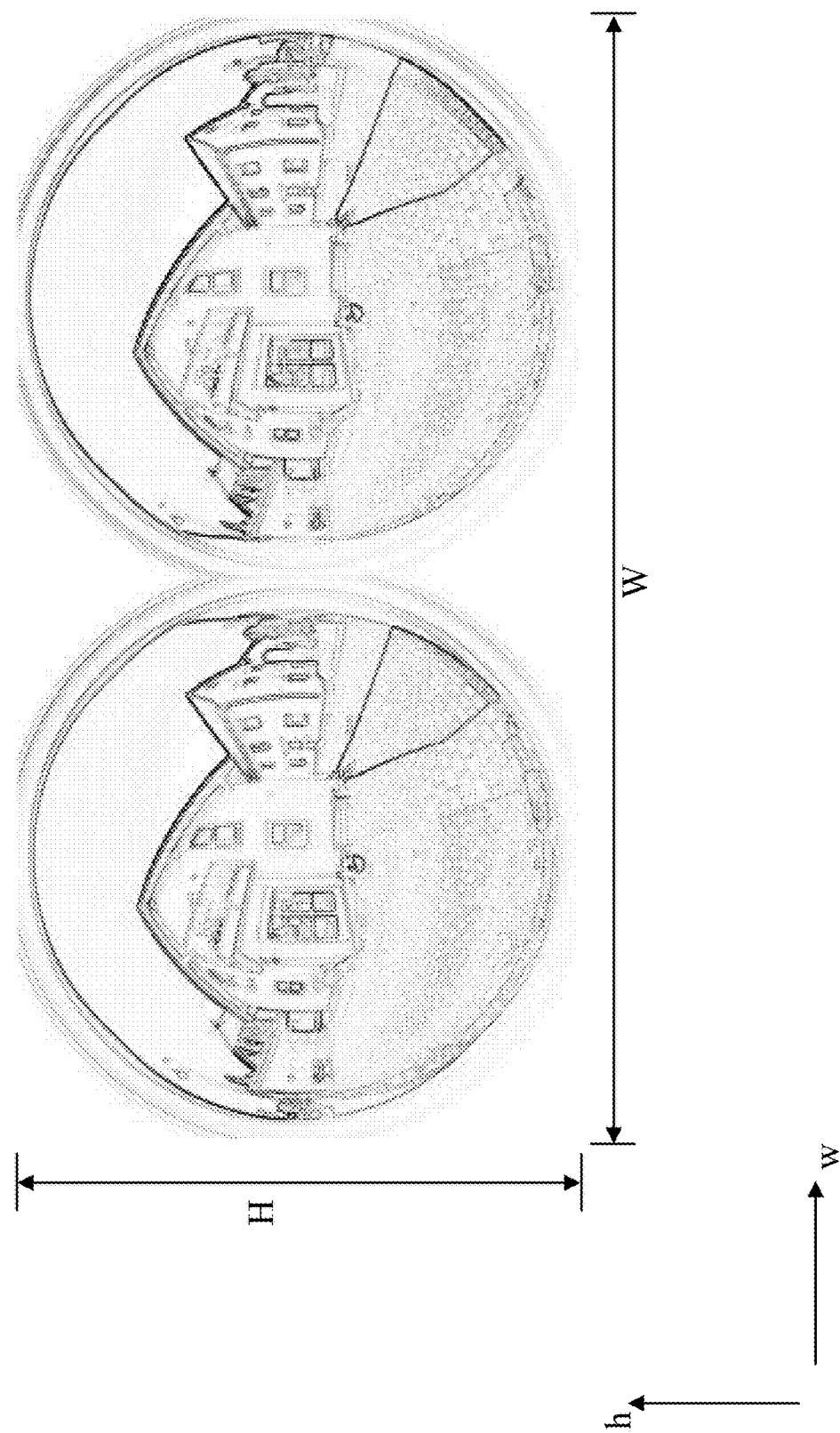

FIG. 2J shows an exemplary immersive image 200J having a stereoscopic, half-spherical Fisheye format, wherein the two images of the stereoscopic image are arranged side-by-side.

Figure 2K:
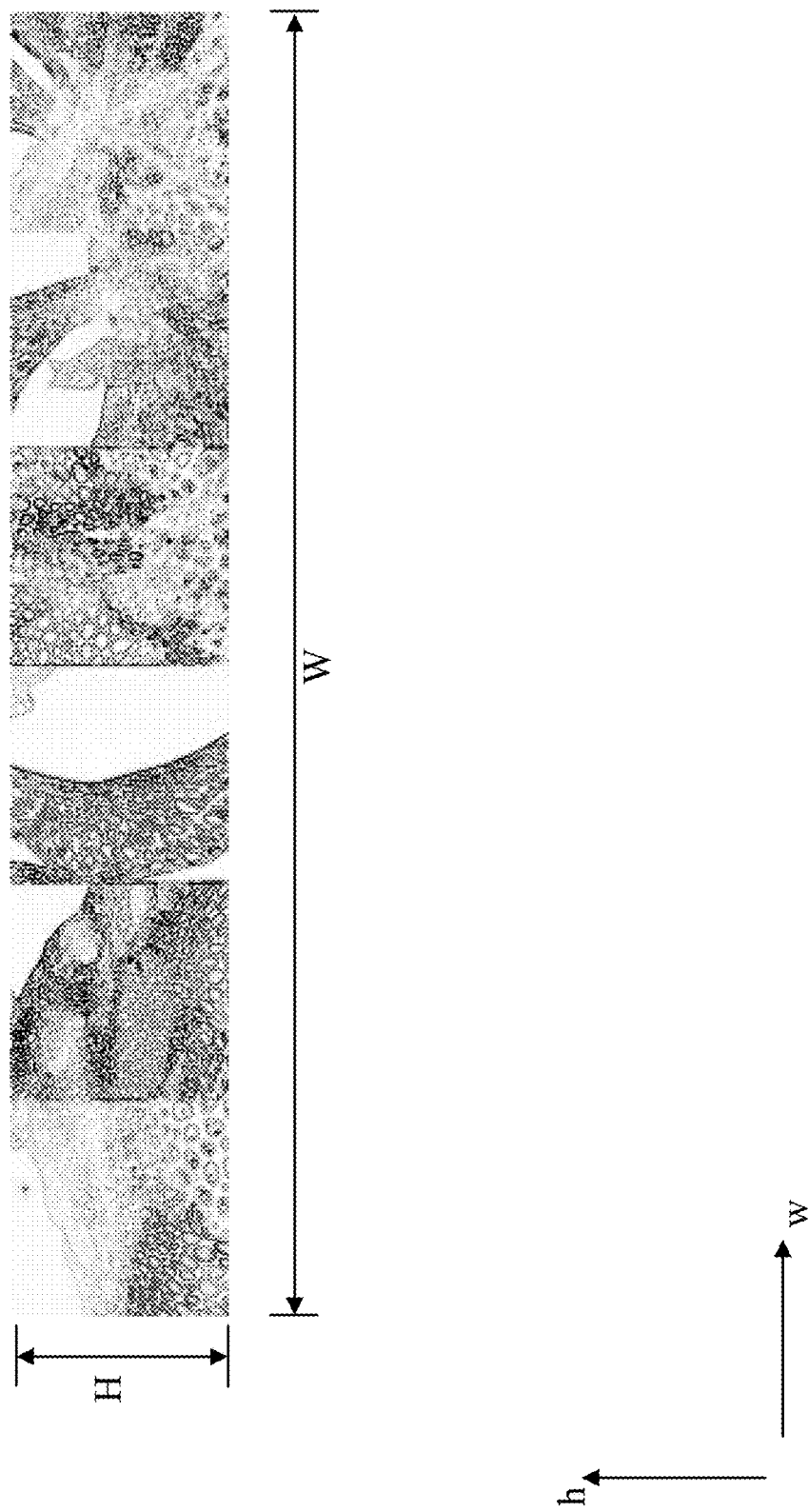

FIG. 2K shows an exemplary immersive image 200K having a monoscopic, spherical Cubemap format.

Figure 2L:
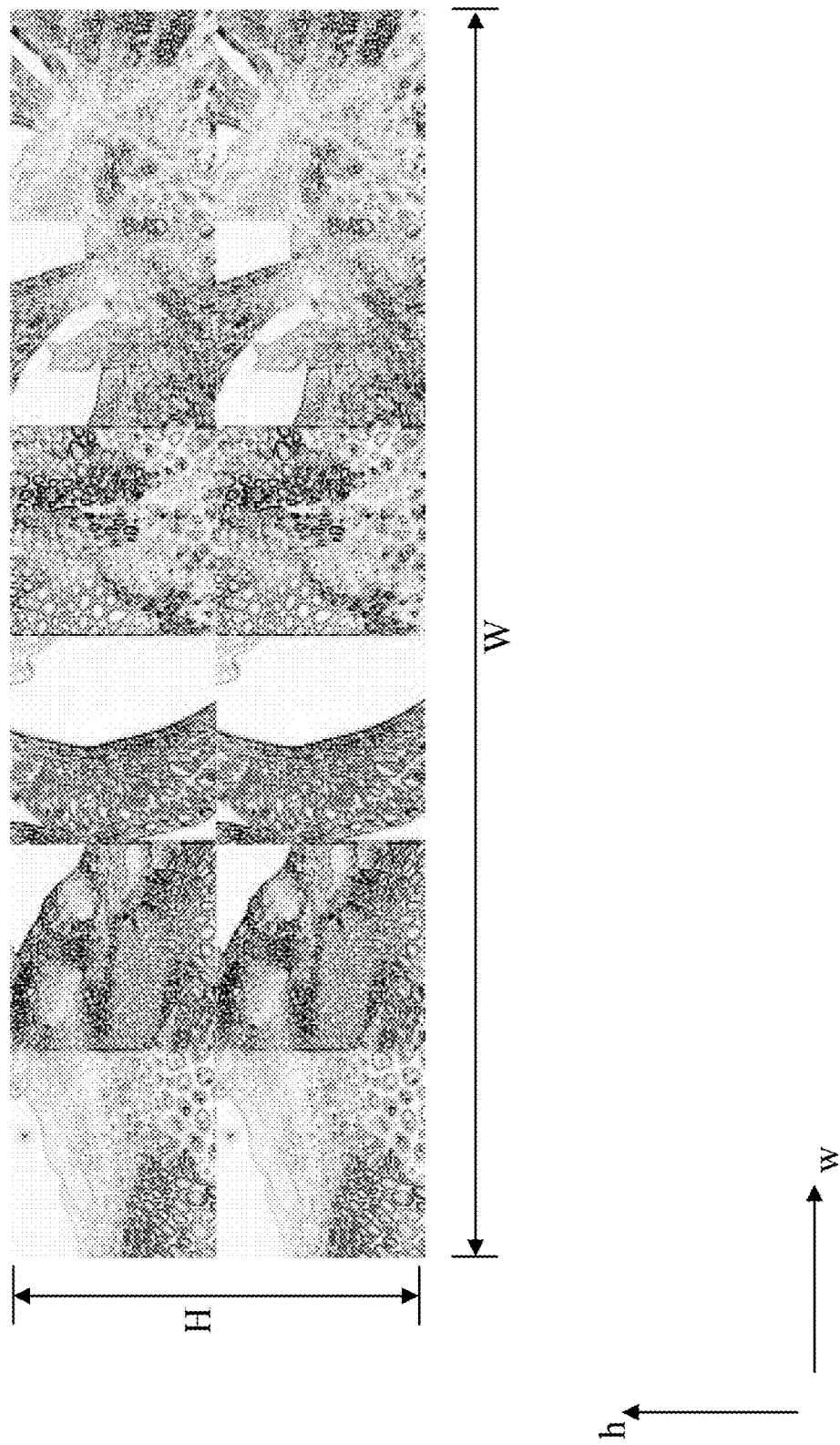

FIG. 2L shows an exemplary immersive image 200L having a stereoscopic, spherical Cubemap format, wherein the two images of the stereoscopic immersive image are arranged on top of each other (e.g., the six images of the Cubemap associated with the left eye on top of the Cubemap associated with the right eye, or vice versa).

Figure 2M:
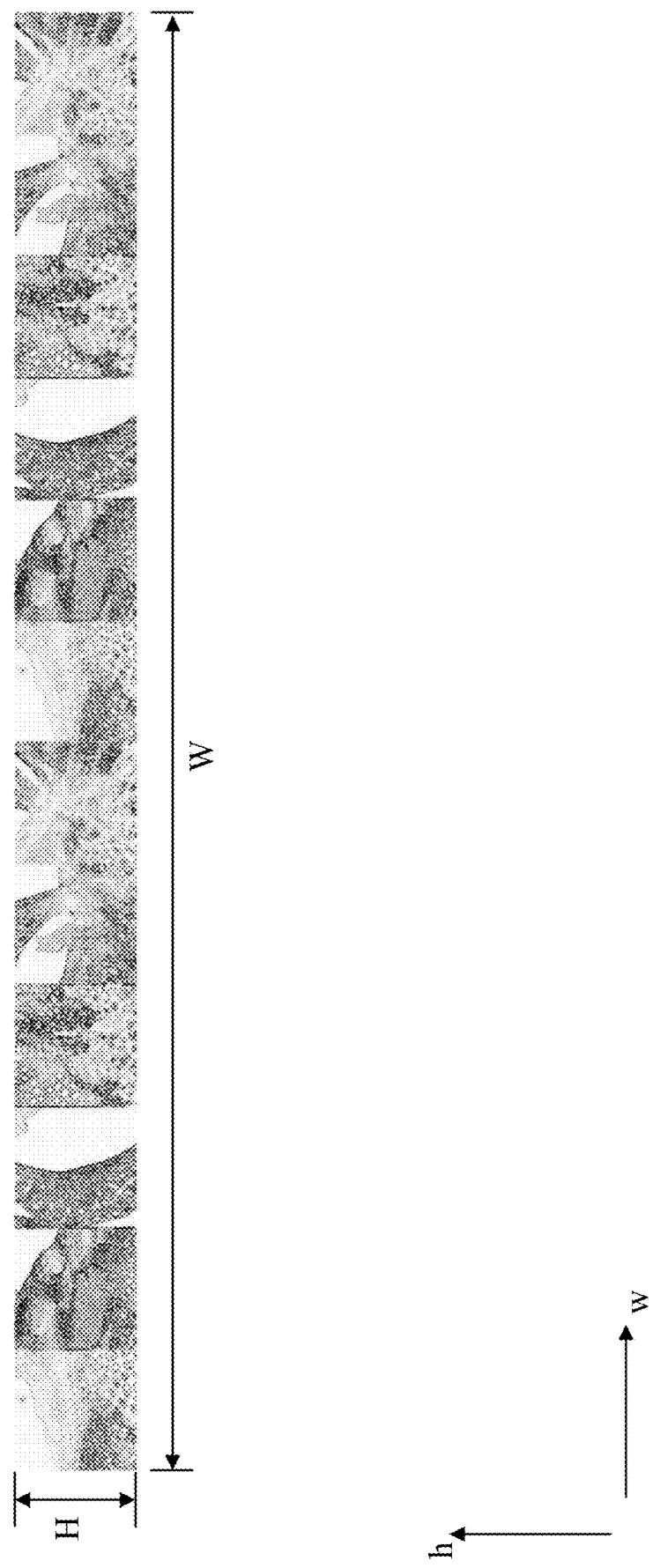

FIG. 2M shows an exemplary immersive image 200M having a stereoscopic, spherical Cubemap format, wherein the two images of the stereoscopic immersive image are arranged side-by-side (e.g., twelve images in a row).

FIG. 2B to FIG. 2M illustratively show that the aspect ratio of the immersive image 102i depends on the format 104. If not otherwise specified, the aspect ratio, as used herein, may be either the ratio of height, H, to width, W, or the ratio of width, W, to height, H. The aspect ratio may be a ratio of the number of pixels in width direction, w, to the number of pixels in height direction, h, or vice versa.

According to various aspects, the one or more processors are configured to determine the format 104 of the immersive image 102 using an aspect ratio of the immersive image 102i and one or more additional characteristics of the immersive image 102i (see, for example, FIG. 4A to FIG. 9).

Figure 3A:
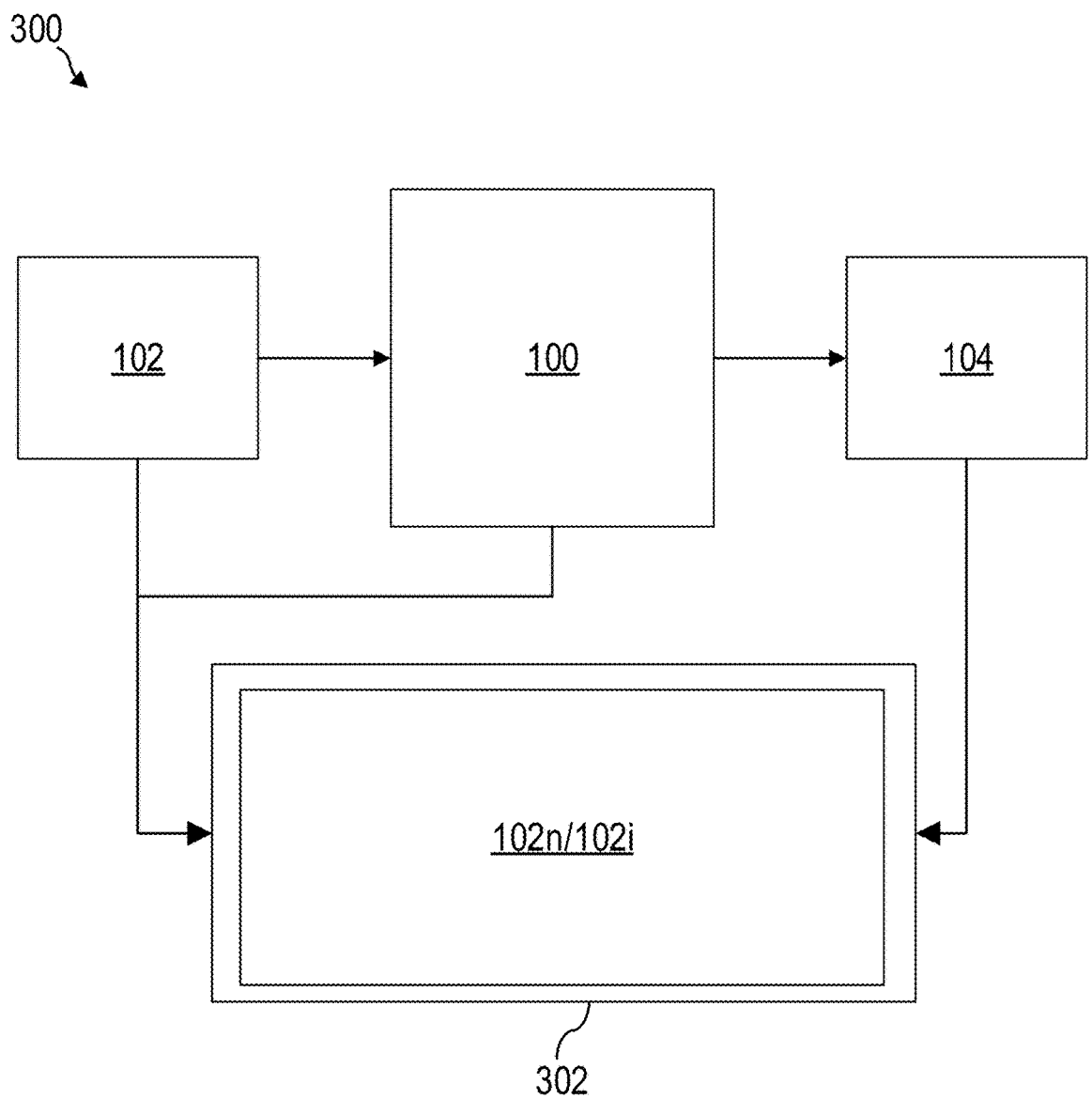
FIG. 3A shows a system including the device of FIG. 1 according to various aspects.

FIG. 3A shows a system 300 according to various aspects. The system 300 may include the device 100 and a display device 302. The display device 302 may be configured to display computer-simulated reality in accordance with the image 102. For example, the device 100 may determine, whether the image 102 is an immersive image 102i and, if so, may determine the format 104 of the immersive image 102i, or whether the image 102 is a non-immersive image 102n. The display device 302 may be a head-mounted display.

The display device 302 may include one or more processors configured to control the displaying of the image 102 and/or the one or more processors of the device 100 may control the display device 302 to display the image 102 and/or another device may include one or more processors configured to control the displaying of the image 102.

Figure 3B:
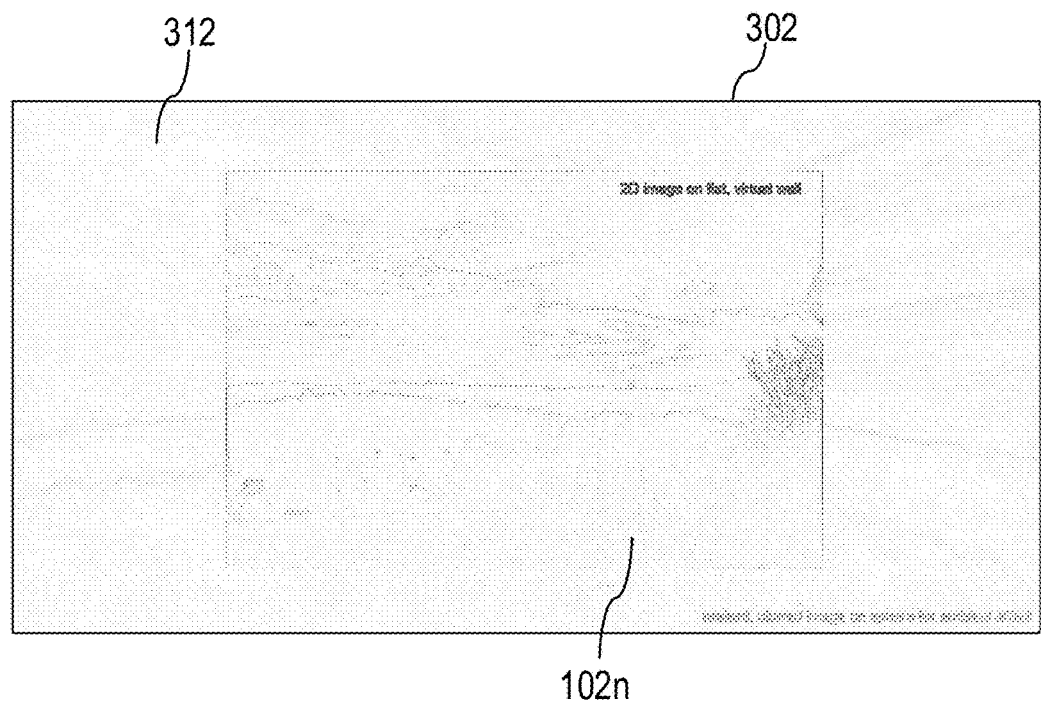
FIG. 3B and FIG. 3C each show an exemplary non-immersive image displayed via a device for computer-simulated reality according to various aspects.
Figure 3C:
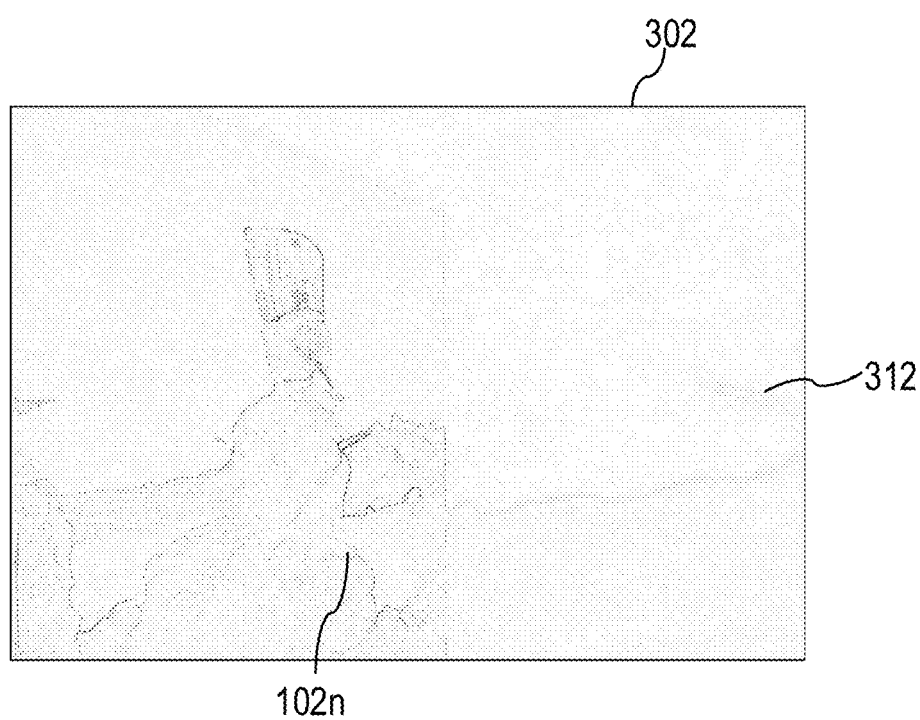

According to various aspects, the respective one or more processors may be configured to, in the case that the image 102 is determined as non-immersive image 102n, control the display device 302 to display the non-immersive image 102n within the computer-simulated environment. For example, the non-immersive image 102n may be presented on a large virtual wall to the user. As exemplarily shown in FIG. 3B and FIG. 3C, the non-immersive image 102n may be displayed in the foreground on the virtual wall and, there may be either a sphere structure, a cylindrical structure, a cube structure, a simulated sphere structure, or a cylindrical or cube structure through mathematical constructs (e.g. a simulated sphere through vector directions during rendering) in the background 312 in which a blurred version of the non-immersive image 102n is shown. This may improve an immersive feeling of the user. The non-immersive image 102n may be shown over the whole 360 degrees. As an example, the non-immersive image 102n may be minimized to, e.g., 512×512 pixels while applying a Gaussian blur filter and the aspect ratio may be changed to match the desired number of degrees, such as 180 degrees or 360 degrees. As another example, the edge pixels of the non-immersive image 102n may be used and the color gradients may be extended on the background sphere, cube, or cylinder as ambient effect.

In the following, an exemplary process flow is described with reference to FIG. 4A to FIG. 9 which the one or more processors of the device 100 may employ in order to determine, whether the image 102 is an immersive image 102i or a non-immersive image 102n, and to determine, in the case that the image 102 is determined as immersive image 102i, the format of the immersive image 102i (exemplarily for virtual reality VR).

Optionally, the one or more processors may be configured to initially determine, whether the type (such as immersive or non-immersive) and/or format of the image 102 are indicated by the metadata of the image file. The one or more processors may be configured to determine, whether the image 102 is an immersive image 102i or a non-immersive image 102n, in the case that the type and/or format of the image 102 is not indicated by the metadata (i.e., if type and/or format are unknown).

Optionally, the one or more processors may be configured to determine, whether the image 102 includes a border frame. For example, the one or more processors may start at one or more outermost pixels of the image 102 and may count in direction of the image center how many pixels are having the same pixel value (e.g., using a floodfill algorithm). The number of pixels may define the width of the border frame. In the case that the number of pixels having the same pixel value is greater than a predefined number, the one or more processors may be configured to determine the image 102 as non-immersive image 102n. As understood, an immersive image 102i may not include a border frame of one color.

Figure 4A:
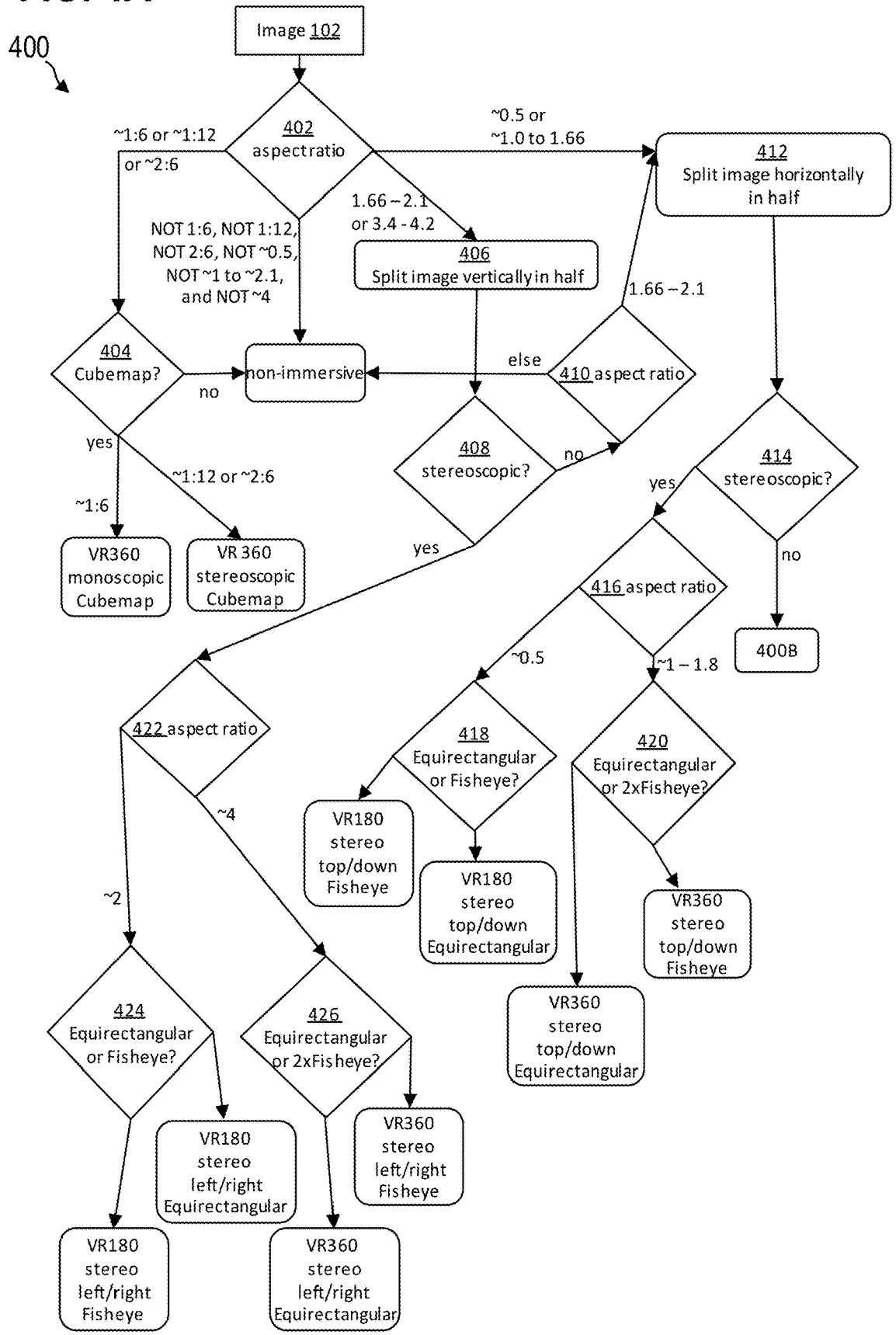
FIG. 4A and FIG. 4B show a flow diagram for determining the format of an image according to various aspects.

As shown in the flow diagram 400 of FIG. 4A, the one or more processors may be configured to determine (in 402), whether the aspect ratio (either height to width or width to height) of the image 102 is about 1:6 (i.e., 1 to 6 or 6 to 1), about 2:6, about 1:12, a ratio of width to height of about 4 (e.g., in a range from about 3.4 to about 4.2), a ratio of width to height of about 0.5 (e.g., in a range from about 0.45 to about 0.55), or a ratio of width to height in the range from about 1 (e.g., from about 0.95) to about 2.1. The one or more processors may be configured to determine that the image 102 is a non-immersive image 102n in the case that the determined aspect ratio is none of the above mentioned aspect ratios. It is understood that the term "about" with respect to a specific value may describe a range around this specific value as center. Therefore, images which are saved in a squeezed format and, thus, may have a slightly different aspect ratio, are taken into account as well. For example, a camera may capture VR360 stereoscopic content (in some aspects referred to as stereo content) into a squeezed format of 3840×2160 pixels. This may be as 4K resolution easier for a video playback hardware to smoothly playback. However, the unsqueezed format would have been 3840×3840 and some hardware might not have been able to play it back.

It is understood that, in the case of an Equirectangular format, a Cubemap format or a Fisheye format is determined for the image 102, the image 102 is determined as immersive image 102i.

As described herein, the Cubemap format may be associated with 6 sub-images representing the six faces of a cube. In the case of a monoscopic Cubemap format, the immersive image 102i may include six sub-images each representing one side of the cube. The six sub-images may be arranged either side-by-side resulting in an aspect ratio of height to width of about 1:6 or on top of each other resulting in an aspect ratio of height to width of about 6:1. In the case of a stereoscopic Cubemap format, the two stereoscopic images may be arranged side-by-side resulting in an aspect ratio of height to width of about 1:12 or on top of each other resulting in an aspect ratio of height to width of about 2:6 (or may be provided as separate files). The Cubemap format may be associated with a spherical format. The one or more processors may be configured that the format is a spherical format in the case that a Cubemap format is determined.

The one or more processors may be configured to determine (in 404), whether the image 102 has a Cubemap format. First, the one or more processors may divide the image 102 into a plurality of sub-images transitioning into each other. The sub-images of the plurality of sub-images may have the same (e.g., equal) size. Each sub-image may have a ratio of height to width of 1 to 1. The one or more processors may be configured to divide the image 102 depending on the aspect ratio. For example, the one or more processors may divide the image 102 into:

six images which are arranged side-by-side in the case that the aspect ratio of height to width is about 1:6,
twelve images which are arranged side-by-side in the case that the aspect ratio of height to width is about 1:12,
twelve images with six images in width direction, w, and two images in height direction, h, in the case that the aspect ratio of height to width is about 2:6,
etc.

At each transition from one sub-image to another sub-image of the plurality of sub-images each pixel of a plurality of pixels of the sub-image may be adjacent to a respective other pixel of a plurality of other pixels of the other sub-image.

Figure 5A:
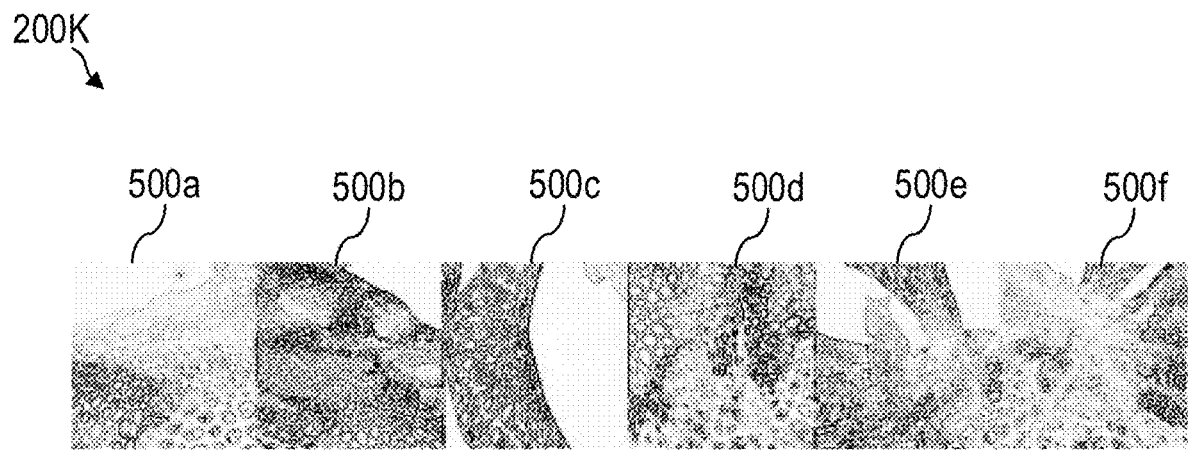
FIG. 5A exemplarily shows the six sub-images of an immersive image having a monoscopic Cubemap format and FIG. 5B shows the respective transitions between two adjacent sub-images.
Figure 5B:
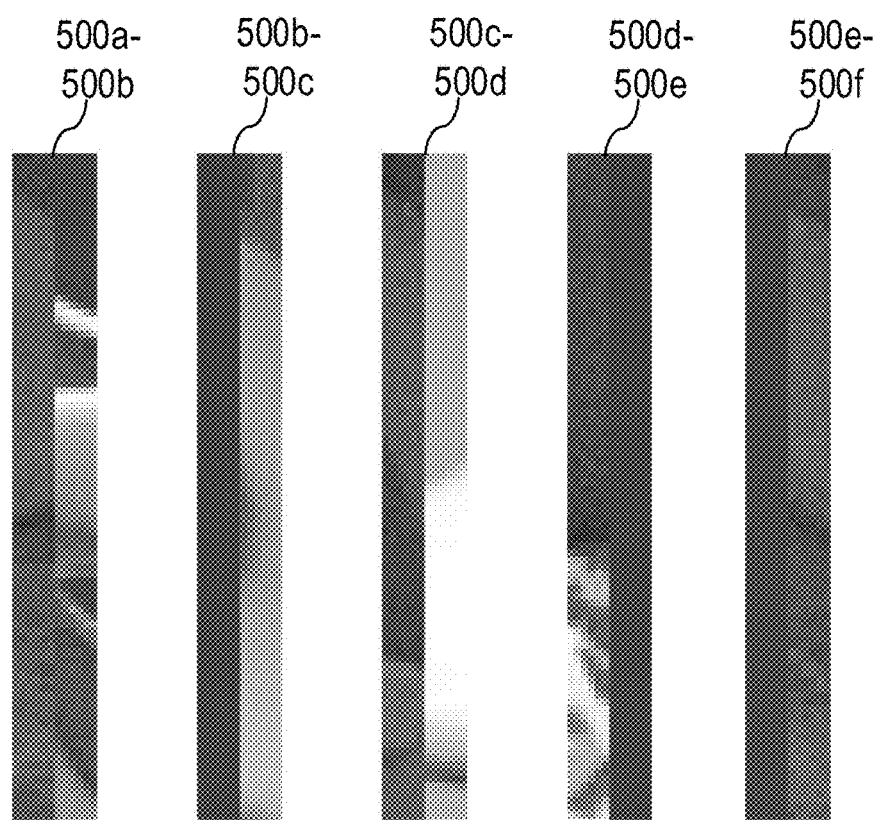

For example, in the case of the immersive image 200K the one or more processors may determine (in 402) an aspect ratio of height to width of 1:6 may divide (e.g., in 404) the immersive image 200K into six sub-images 500a, 500b, 500c, 500d, 500e, and 500f as shown in FIG. 5A. Hence, there may be five transitions (in some aspects referred to as seams) between two respective sub-images. As an example, the immersive image 200K may have 9216 pixels in width direction, w, and 1536 pixels in height direction, h, (i.e., having 9216×1536 pixels) and may be divided into six images of the same size in width direction resulting in six images having dimensions of 1536×1536 pixels. A plurality of pixels of each sub-image at each transition of the five transitions is shown in FIG. 5B. As illustratively shown, at each transition, there may be a significant difference in the adjacent pixel values of the two adjacent sub-images. The one or more processors may be configured to determine, whether there is such kind of "rough" transition or not. As understood, in the case of a non-immersive image, there may be mainly smooth transitions (e.g., no borders) between neighboring pixels at the transitions of the sub-images. Illustratively, the last column of one sub-image in width direction, w, may be adjacent to the first column of the next sub-image in width direction, w.

The one or more processors may be configured to, for at least one transition (e.g., for each transition), for one or more pixels which are adjacent to pixels of an adjacent sub-image (e.g., each adjacent pixel or adjacent pixels in an upper part of the sub-image or adjacent pixels in a lower part of the sub-image) determine a difference between the pixel value of the pixel and the pixel value of the other pixel of the other sub-image adjacent to the pixel. The one or more processors may be configured to aggregate (e.g., to sum up or to determine an average) the differences for all of the one or more pixels of the at least one transition (e.g., all differences of each adjacent pixel for all transitions) to determine an aggregated difference. This aggregated difference may serve as an additional characteristic to determine the type of the image 102 (i.e., whether the image 102 is an immersive image 102i or a non-immersive image 102n). The aggregated difference may serve as an additional characteristic to determine the format 104 of the immersive image 102i.

The aggregated difference may be a sum of all differences, an average of all differences (e.g., an arithmetic average or a median average), a quadratic distance of the determined differences, a contrast difference between the adjacent pixels, an edge difference between the adjacent pixels, etc.

The differences may be determined in color scale (e.g., 24-bit RGB scale or hue saturation value, HSV, color representation or another color scale). According to various aspects, the one or more processors may be configured to convert the image 102 into a greyscale image prior to determining the pixel differences between the respective sub-image and the respectively adjacent sub-image and the differences may be determined in greyscale (e.g., in 8-bit greyscale). Using the greyscale may decrease the computation time for determining the differences.

The one or more processors may be configured to determine, whether the determined aggregated difference is greater than or equal to a predefined minimum difference. As described above, in the case of a non-immersive image, there may be smooth transitions resulting in a low value of the aggregated difference whereas, in the case of an immersive image, there may be rough transitions resulting in a significantly higher value of the aggregated difference. In the case that the aggregated difference is less than the predefined minimum difference, the one or more processors may be configured to determine the image 102 as non-immersive image 102n ("no" in 404) and as immersive image 102i having a Cubemap format otherwise.

The one or more processors may be configured to determine the aggregated difference between the adjacent pixels for one transition, determine the image 102 as an immersive image 102i having a Cubemap format in the case that the aggregated difference is greater than a threshold value and continue to determine the aggregated difference between the adjacent pixels of the next transition in the case that the aggregated difference is less than the threshold value, and so on until the image 102 is determined as immersive image 102i or until all transitions are checked. Checking, after each transition, whether the image 102 is an immersive image 102i having a Cubemap format, may reduce the computational costs as compared to checking all transitions prior to checking the type and format of the image 102.

The one or more processors may be configured to determine a transition using adjacent pixels in a middle part of the image only. For example, the pixels in an upper part and a lower part of the image may be disregarded. Hence, the one or more processors may, for each pixel in the middle part of the image, determine the difference between the pixel values of the pixel and the pixel value of the other pixel of the other sub-image adjacent to the pixel. This may reduce a computational cost. Similarly, the one or more processors may be configured to determine a transition using adjacent pixels in the upper part and/or in the lower part of the image only. Illustratively, for performance optimizations, not all parts of the seams may be taken into account. For example, the respective part may be selected such that only about 50% of the adjacent pixels are considered for determining the difference.

In the case that the image 102 is determined (in 404) as immersive image 102i having a Cubemap format, the one or more processors may determine that:

the immersive image 102i has a spherical (in the case of VR: VR360), monoscopic Cubemap format in the case that the aspect ratio is about 1:6, and/or the immersive image 102i has a spherical (in the case of VR: VR360), stereoscopic Cubemap format, wherein the two images of the stereoscopic immersive image are arranged side-by-side, in the case that the aspect ratio is about 1:12, and/or the immersive image 102i has a spherical (in the case of VR: VR360), stereoscopic Cubemap format, wherein the two images of the stereoscopic immersive image are arranged on top of each other, in the case that the aspect ratio is about 2:6.

The aspect ratios, described herein, may represent a ratio of width to height or of height to width if not otherwise explicitly stated.

With reference to FIG. 4, the one or more processors may be configured to, in the case that the aspect ratio of width to height is determined (in 402) as being in the range from 1.66 to about 2.1 or in the range from about 3.4 to about 4.2, split the image 102 vertically in half (in 406). The one or more processors may vertically split (in 406) the image 102 into a first image and a second image of equal size which are arranged side-by-side. Hence, the first image and the second image are arranged adjacent to each other, wherein the first image may transition into the second image. In the case of the vertical splitting, the transition may be oriented vertically.

The terms "vertical" or "vertically" and "horizontal" or "horizontally", as used herein, may refer to the orientation of the image 102. The term "vertical" may refer to a direction parallel to the height direction, h, of the image 102 and the term "horizontal" may refer to a direction parallel to the width direction, w, of the image 102.

The one or more processors may be configured to determine, whether the first image and the second image are stereoscopic (in 408). Substantially similar to the Cubemap format described above, the one or more processors may be configured to determine a difference between the adjacent pixels of the first image and the second image. The one or more processors may be configured to implement a feature detector. The feature detector may be or may employ one or more of the following: a Harris corner detector, a Shi-Tomasi corner detector and good features to track, a scale-invariant feature transformation (SIFT), a speed up robust features (SURF) detector, a features from accelerated segment test (FAST) detector, an oriented FAST and rotated binary robust independent elementary features (BRIEF) detector, or any other feature detector suitable for computer vision.

The one or more processors may be configured to implement a feature matcher. The feature matcher may be any algorithm capable to compare features and to provide a metric including matching features. The feature matcher may be, for example, or may employ a trained functional link artificial neural network (FLANN), a k-nearest neighbor algorithm (KNN), an accelerated KAZE algorithm, or any other feature matcher capable to compare features of two images.

The one or more processors may be configured to determine features of the first image and features of the second image using the feature detector. The one or more processors may, using the feature matcher, compare the detected features of the first image and second image and determine a feature metric. The feature metric may include matching features of the first image and the second image having a first value for the first image and a second value for the second image.

The differences between the adjacent pixels at the transition and/or the features may be determined in color scale (e.g., 24-bit RGB scale or hue saturation value, HSV, color representation or another color scale) or in greyscale (e.g., in 8-bit greyscale). The respective image may be converted into the greyscale by averaging the red, green, and blue color channels or by taking one of the color channels as input. The one or more processors may be configured to reduce the resolution of the first image and the second image prior to determining the features using the feature detector. The one or more processors may be configured to increase the brightness of the first image and the second image prior to determining the features using the feature detector. The one or more processors may be configured to, prior to determining the features using the feature detector, discard an outer region of the first image and an outer region of the second image, and determine the features of the first image for the remaining region of the first image and the features of the second image for the remaining region of the second image using the feature detector.

Using the greyscale, reducing the resolution, increasing the brightness, and/or discarding the outer region may reduce the computation time for determining the differences. Reducing the resolution and increasing the brightness of the first image and the second image may eliminate noise such that the accuracy of the output provided by the feature detector and/or feature matcher may be improved.

Each matching feature of the feature metric may be associated with a pixel p(h, w) of the first image and a pixel p(h, w) of the second image. The one or more processors may be configured to determine, for each matching feature of the feature metric, a difference between the height value h of the pixel p(h, w) in the first image and the height value h of the pixel p(h, w) in the second image. The one or more processors may be configured to determine a total difference for the height differences of all matching features. The one or more processors may be configured to determine that the image 102 is an immersive image 102i having a stereoscopic format in the case that the total difference less than or equal to a predefined height difference threshold value.

Illustratively, a limitation to the variation in the height direction, h is taken into account since feature detectors and feature matchers are commonly made for very general images where one just takes two photos from different angles. However, in the case of stereoscopic cameras, there are tightly aligned lenses which are substantially at the same height and just differ in the lateral orientation. Hence, matched features from the left eye to the right eye may be almost on the same height, h, coordinate in both images. Therefore, if one of the matched features has a too high difference (i.e., greater than the predefined height difference threshold value) in the height coordinate, e.g., more than 5 pixels, this may indicate non-stereoscopic properties.

Figure 6A:
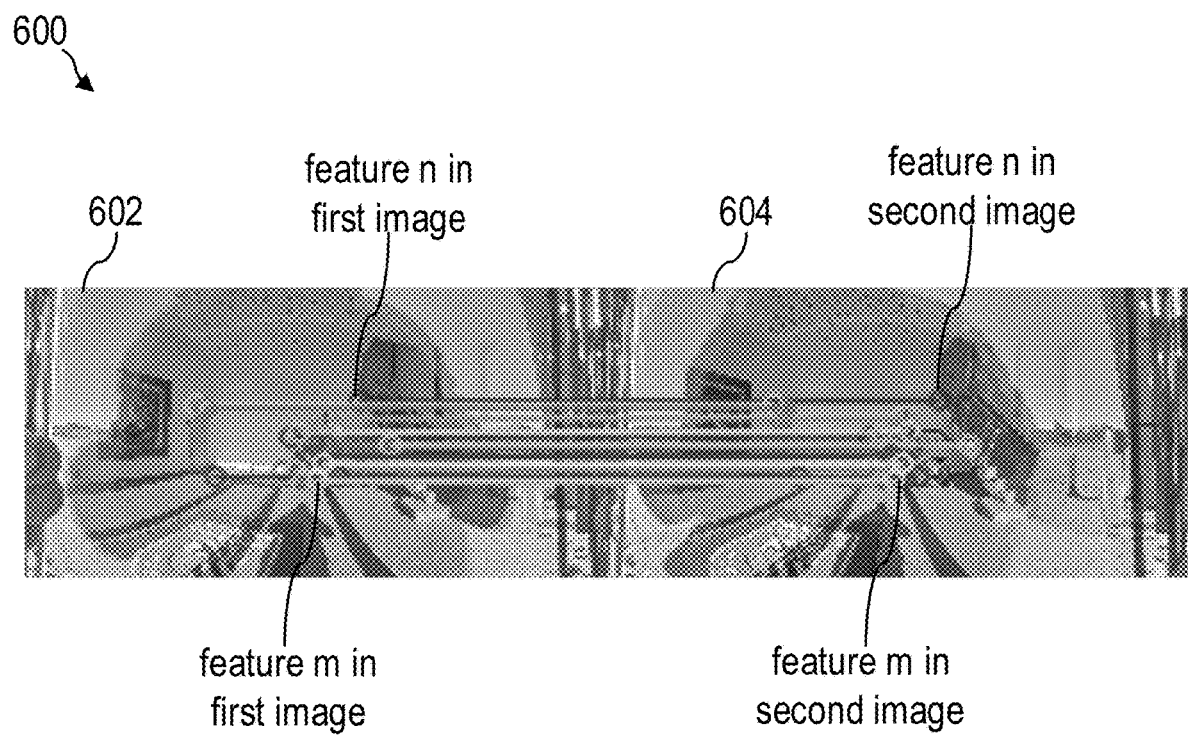
FIG. 6A and FIG. 6B exemplarily show a feature detection and feature matching of the two images of a stereoscopic immersive image according to various aspects.
Figure 6B:
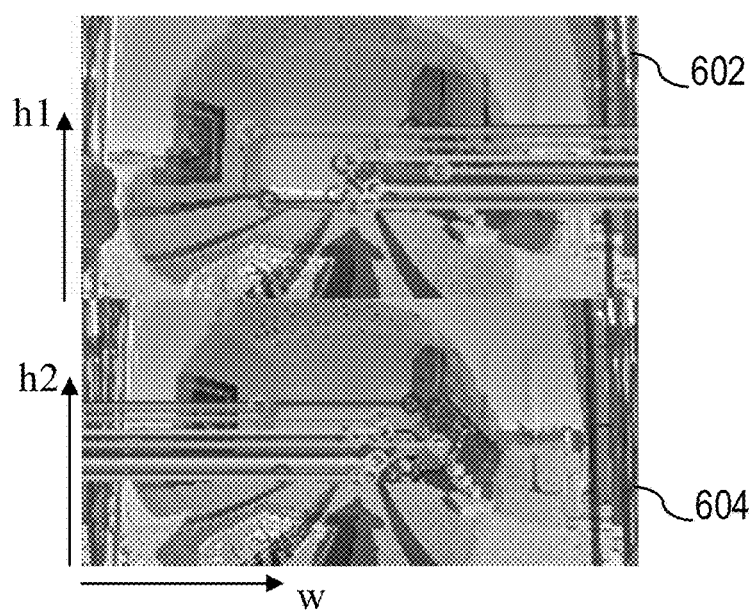

FIG. 6A illustratively shows an exemplary stereoscopic immersive image 600. The one or more processors may, depending on the aspect ratio, split (in 406) the stereoscopic immersive image 600 vertically into half providing a first image 602 and a second image 604 arranged side-by-side. FIG. 6A also shows exemplary results of a feature detection and feature matching. For illustration, matched features are marked by circles and are connected by lines. For example, a feature, n, in the first image 602 may be matched with a feature, n, in the second image 604 and a feature, m, in the first image 602 may be matched with a feature, m, in the second image 604. As described herein, a stereoscopic image may include one image for the left eye and another image for the right eye. In the case of stereoscopy, the two images, such as the first image 602 and the second image 604, are quite similar since only the perspective is slightly changed for the left and right eyes. Thus, in the case of stereoscopy, the matched features may be positioned substantially at the same height (i.e., substantially the same height value, h). This is illustratively shown by the substantially horizontal lines connecting the matched features. Thus, the one or more processors are capable to determine (in 406), whether the image 102 has a stereoscopic format, depending on the height difference between the matched features.

According to various aspects, the one or more processors may be configured to improve the determination of the stereoscopy by pre-filtering the matched features (e.g., using only the most solid feature matches. The one or more processors may be configured to determine a modified feature metric by multiplying, for each matching feature of the feature metric, the first value with a first threshold value and the second value with a second threshold value. The first threshold value may be determined using the second image and the total difference between the plurality of first pixels and the plurality of second pixels. The second threshold value may be determined using the first image and the total difference between the plurality of first pixels and the plurality of second pixels. By multiplying the first value with a threshold value of the second value, it can be filtered how far the results are away from a match and be filtered through that. Exemplary threshold values for multiplication may be e.g., 0.5 or 0.6.

As described above, the differences between the adjacent pixels of the first image and the second image may be determined. According to various aspects, the threshold values for determining the modified feature metric may be selected in dependence on the aggregated differences between the adjacent pixels of the first image and the second image. As described above, in the case of stereoscopy there may be a "rough" transition having a significant difference between the pixel values of the adjacent pixels, whereas in the case of a non-immersive image the difference may be smoother having a smaller difference. Hence, the aggregated differences may serve as an indicator regarding stereoscopy. The higher the aggregated differences, the more the threshold values may be increased. For example, if the average difference at the transition (in some aspects referred to as seam) is over 20.0, the threshold value may be increased by 0.1. For example, if the average difference at the transition (in some aspects referred to as seam) is over 24.0, the threshold value may be increased by 0.15. For example, if the average difference at the transition (in some aspects referred to as seam) is over 60.0, the threshold value may be increased by 0.2. As an example, values of an average difference in the range between about 4 to about 6 may indicated a smooth transition and, thus, a non-immersive image.

Hence, a high average difference at the transition may increase the probability of a stereoscopic image such that it may not be necessary to filter out as strongly the matched features that would prove that stereoscopic content is there. This may result in more not-as-good-matches which may specifically help in images that will have less overall features. Therefore, the probability to detect stereoscopy may be increased. Illustratively, the difference in the pixel values at the transition from the first image to the second image is employed to modify the feature metric.

The one or more processors may be configured to determine, whether the immersive image includes a stereoscopic format using the modified feature metric. As described above, the one or more processors may determine the height differences between the matched features of the modified feature metric and to determine the image 102 as immersive image 102*i* having a stereoscopic format in the case that the differences are below the predefined height difference threshold value.

In the case that the image 102 is determined (in 408) as non-stereoscopic (e.g., in the case that the differences are greater than the predefined height difference threshold value), the one or more processors may be configured to determine, whether the aspect ratio of the image 102 is in a predefined aspect ratio range (in 410). In the case that the aspect ratio of the image 102 is not in the predefined aspect ratio range, the one or more processors may be configured to determine that the image 102 is a non-immersive image 102*n* ("else" in 410). In the case that the aspect ratio of the image 102 is in the predefined aspect ratio range, the one or more processors may be configured to split the image 102 horizontally into half (in 412). The predefined aspect ratio range may be ratio of width to height in the range from about 1.66 to about 2.1. The one or more processors may be configured to, in the case that the aspect ratio of width to height is determined (in 402) as being in the range from about 0.45 to about 0.55 or in the range from about 0.95 to about 1.66, split the image 102 horizontally in half (in 412). The one or more processors may horizontally split (in 412) the image 102 into a first image and a second image of equal size which are arranged on top of each other (i.e., top/down arranged). Hence, the first image and the second image are arranged adjacent to each other, wherein the first image may transition into the second image. In the case of the horizontal splitting, the transition may be oriented horizontally.

The one or more processors may be configured to determine, whether the first image and the second image are stereoscopic (in 414). This may be carried out similar as described above with respect to the determination 408. It is understood that, in the case that the first image and the second image are arranged on top of each other, the transition is oriented horizontally and that a respective height value may be determined for each of the first image and the second image in order to determine the height differences between the matched features. This is illustratively shown in FIG. 6B: The height values, h1, of the pixels p(h1, w) associated with the matched features in the first image 602 may be compared to the height values, h2, of the pixels p(h2, w) associated with the matched features in the second image 604.

With reference to FIG. 4A, the one or more processors may be configured to, in the case that the horizontally split image 102 is determined (in 414) as having a stereoscopic format, to determine the image 102 as immersive image 102*i* and to determine (in 416), whether the aspect ratio of width to height of the immersive image 102*i* is about 0.5 (e.g., in the range from about 0.45 to about 0.55) or is in the range from about 1 (e.g., a value in the range from about 0.95 to about 1.05) to about 1.8.

Since the stereoscopic Fisheye format, in which the two stereoscopic images are arranged on top of each other, are not commonly used (up to now), the one or more processors may (in 420 and analogously in 426 and 908) be configured to directly determine the stereoscopic (e.g., VR360) Equirectangular format in which the two stereoscopic images are arranged on top of each other.

The one or more processors may be configured to determine (in 418 or 420) in dependence on the aspect ratio of the immersive image 102*i*, whether the immersive image 102*i* has an Equirectangular stereoscopic format or a Fisheye stereoscopic format. According to some aspects, the one or more processors may be configured to either check for the Equirectangular format or the Fisheye format. In the case of only checking for the Equirectangular format, the one or more processors may be configured to determine that the immersive image 102*i* has a Fisheye format in the case that it is determined that the immersive image 102*i* does not have the Equirectangular format, and vice versa. According to other aspects, the one or more processors may be configured to check for both, the Equirectangular format and the Fisheye format one after another (e.g., first checking for the Fisheye format and subsequently checking for the Equirectangular format).

In the following, checking for the Fisheye format is described:

The one or more processors may be configured to detect using image recognition, whether the first image includes at least one first ellipse (e.g., a first circle) having a ratio of the diameter of the minor axis to the diameter of the major axis greater than a predefined axis ratio. The predefined axis ratio may include a value slightly below one. An axis ratio of one may refer to a circle. Hence, an axis ratio slightly below one may indicate an ellipse which is as slightly distorted version of a circle. The predefined axis ratio may also refer to a predefined eccentricity of the at least one first ellipse. In this case, the image recognition may detect ellipses having an eccentricity less than the predefined eccentricity (e.g., less than 0.2, e.g., less than 0.1). As understood, a circle is an ellipse having an eccentricity of zero (and an axis ratio equal to one).

The one or more processors may be configured to detect using image recognition, whether the second image includes at least one second ellipse (e.g., a second circle) having a ratio of the diameter of the minor axis to the diameter of the major axis greater than the predefined axis ratio.

According to some aspects, the one or more processors may be configured to check both, the first image and the second image, whether the respective image includes ellipses (e.g., to check for a predefined number of ellipses or to check for all ellipses which fulfill the requirement, such as the predefined axis ratio and/or a predefined eccentricity). According to other aspects, the one or more processors may be configured to check only one of the first image or the second image. This may reduce computational costs.

As described herein, the first image and the second image may have an aspect ratio different from 1. In this case, the one or more processors may be configured to change the size of (e.g., to resize) the first image and/or the second image to an aspect ratio of 1:1 prior to detecting the ellipse(s) within the respective image.

As described herein, the Fisheye format is characterized by a circular center region filled with content and a black surrounding. Illustratively, ellipse(s) (e.g., circles) in an image which have an ellipse center close to the image center may indicate the Fisheye format. Therefore, the one or more processors may be configured to determine, whether the immersive image 102i has a Fisheye format depending on the parameters of the determined ellipse(s) within the respective image.

For example, the one or more processors may be configured to determine the Fisheye format depending on the diameter of the major axis and/or minor axis in relation to the image size in the case that:
- the diameter of the major axis and/or the diameter of the minor axis of the ellipse(s) (e.g., the at least one first ellipse) detected in the first image is greater than a predefined fraction of the height and/or the width of the first image, and/or
- the diameter of the major axis and/or the diameter of the minor axis of the ellipse(s) (e.g., the at least one second ellipse) detected in the second image is greater than a predefined fraction of the height and/or the width of the second image.

Hence, the Fisheye format may be determined in the case that the diameter of the ellipse is close to the diameter of the image. As shown in, for example, FIG. 2G, the diameter of the circular portion within the image 200G is close to the size (e.g., height and/or width) of the image 200G.

For example, the one or more processors may be configured to determine the Fisheye format depending on the center of the respective ellipse(s) and the center of the respective image in the case that:
- a distance between the center of the ellipse(s) (e.g., the at least one first ellipse) detected in the first image and the center of the first image is less than or equal to a predefined maximum distance, and/or
- a distance between the center of the ellipse(s) (e.g., the at least one second ellipse) detected in the second image and the center of the second image is less than or equal to the predefined maximum distance.

Hence, the Fisheye format may be determined in the case that the center of the ellipse is close to the center of the image. As shown in, for example, FIG. 2G, the circular portion within the image 200G is centered.

According to various aspects, the one or more processors may be configured to convert the first image and/or the second image into greyscale, to reduce their resolution, and/or to reduce their sharpness prior to detecting the ellipse(s) within the respective image.

Figure 7:
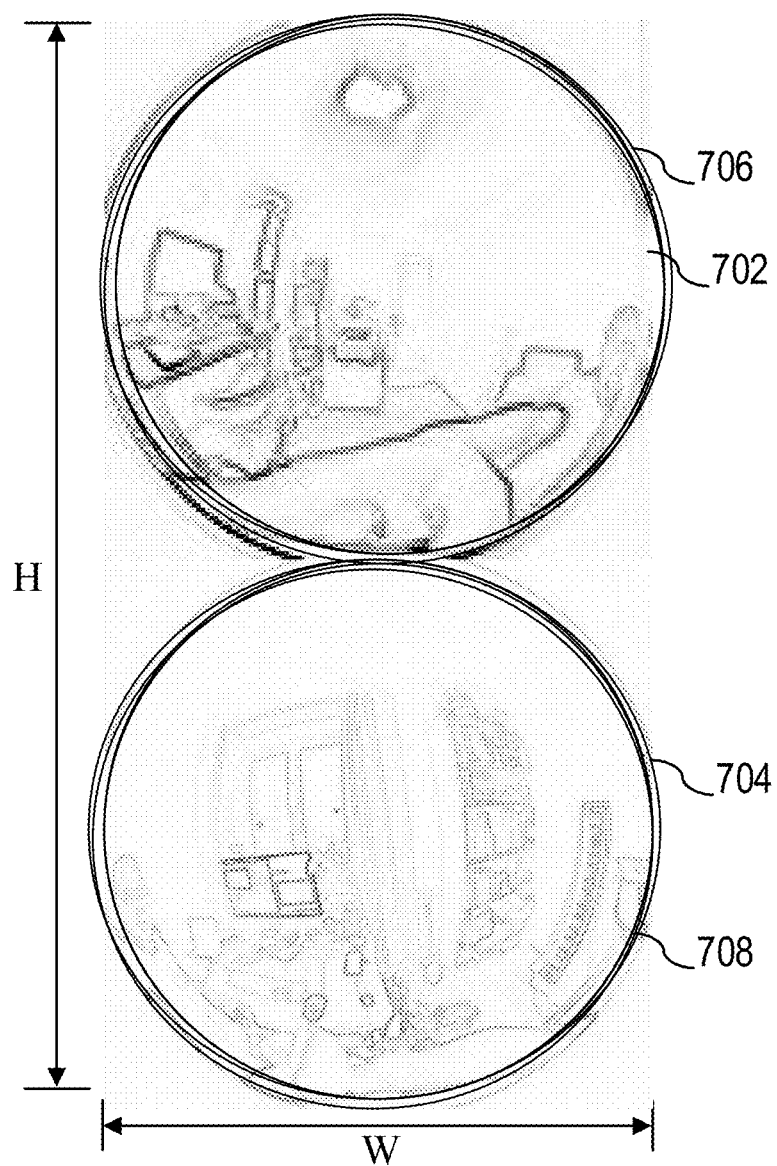
FIG. 7 exemplarily shows a detection of ellipses within a Fisheye immersive image according to various aspects.

FIG. 7 exemplarily shows the image 200H split (in 412) in a first image 702 and a second image 704 which are arranged on top of each other. The one or more processors may implement an image recognition algorithm to detect first ellipses 706 within the first image 702 and second ellipses 708 within the second image 704. The one or more processors may be configured to determine (e.g., in 418 or 420) that the immersive image 200H has a Fisheye format since the centers of the first ellipses 706 are close the center of the first image 702 and/or since the centers of the second ellipses 708 are close to the center of the second image 704 and/or since the diameters (e.g., the diameter of the major axis and/or the diameter of the minor axis) of the first ellipses 706 are within a predefined difference from the width and/or height of the first image 702 and/or since the diameters (e.g., the diameter of the major axis and/or the diameter of the minor axis) of the second ellipses 708 are within a predefined difference from the width and/or height of the second image 704.

As described above, alternatively or additionally the one or more processors may be configured to check for the Equirectangular format. An Equirectangular image may include certain distortions. As exemplarily shown in FIG. 8 for the immersive image 200B, the upper edge region 802 (in some aspects referred to as top region) and the lower edge region 804 (in some aspects referred to as bottom region) of the immersive image 200B having the Equirectangular format may be distorted. This is because the poles of the spherical content (since the immersive image may be projected on a sphere) which contain only little image information are stretched out to the full width of the Equirectangular image. As a result, there is not much different image information along the width direction as just a few pixels are highly stretched horizontally.

According to various aspects, the one or more processors may be configured to check the upper edge region and/or the lower edge region of first image and/or the second image for distortions to determine (e.g., in 418 or 420), whether the immersive image 102i has an Equirectangular format. For example, the one or more processors may check the edge regions one after another (e.g., starting with the lower edge region) and may stop, once distortions and, thus, the Equirectangular format is determined. The one or more processors may be configured to convert the first image and/or the second image into a greyscale image and/or to reduce the resolution of the first image and/or second image prior to checking for the distortions.

In the following, checking the lower edge region of the first image for distortions is exemplarily described:

The one or more processors may detect, in the lower edge region of the first image, an edge value in height direction, h, and an edge value in width direction using an edge detector. The edge detector may be or may employ, for example, the Scharr algorithm, the Sobel algorithm, and/or the Laplace algorithm. The edge value may indicate an amount of edges within the lower edge region. For example, the edge detector may provide an image gradient and edges within the first image for the height direction, h, and the width direction, w. Illustratively, the respective edge value may indicate how "edgy" or how much detail seems to be stored in the lower edge region along the respective direction.

The one or more processors may be configured to determine a ratio of the edge value in width direction to the edge value in height direction. The one or more processors may be configured to determine that the immersive image 102i has no Equirectangular format in the case that the determined ratio is greater than a predefined edge ratio threshold value. For example, in the case that the lower edge region includes a higher amount of detail (i.e., more edges) in the width direction, w, than in the height direction, h, the immersive image 102i may not have the Equirectangular format.

The one or more processors may be configured to, in the case that the determined ratio is less than or equal to the predefined edge ratio threshold value, continue to check for the Equirectangular format. The one or more processors may reduce the width of (e.g., resize the) the first image (e.g., to about one sixteenth of the width) while keeping the height unchanged. Illustratively, the content in width direction may be squeezed. Subsequently, the one or more processors may increase the height and width of the first image with reduced width in the same proportion such that the width of the first image corresponds to the original width prior to reducing the width. Illustratively, the whole first image may be unsqueezed (e.g., by the factor of sixteen). The one or more processors may be configured to determine a difference between the lower edge region of the first image prior to reducing the size and after increasing the image size.

As describe above, the Equirectangular format contains mostly information in the height direction, but only stretched pixels in the width direction. Therefore, the original lower edge region should be almost identical to the horizontally squeezed and unsqueezed image.

The difference may be determined using metrics like Peak signal-to-noise ratio (PSNR), the Structural Similarity Index (SSIM) or other methods to determine a similarity between two images. The one or more processors may determine that the immersive image 102i has an Equirectangular format in the case that the difference is less than a predefined edge region difference threshold value.

The one or more processors may be configured to, in the case that it is determined that the difference is equal to or greater than the predefined edge region difference threshold value, to select a larger region (e.g., increase the height of the selected lower edge region by 1.5) of the first image as lower edge region and to determine compare again the lower edge region within the original first image with the lower edge region of the squeezed and unsqueezed first image, as described above.

According to various aspects, the one or more processors may be configured to determine (e.g., in 416 or at any other point) a difference between the pixel values of the pixels in a last column of pixels of an image (e.g., the image 102 or the first image or the second image) and the pixel value of the pixels in the first column of pixels. This difference may be determined similar as described above for the transition(s) between the first image and the second image or between different sub-images. Hence, two pixels p(h w) having the same height value h may be compared with each other. In the case of a spherical Equirectangular immersive image, after projecting the image on a sphere, the first column and the last column may be arranged next to each other and a "smooth" transition can be expected. Hence, in the case that the aggregated difference between the pixels in the last column and the pixels in the first column greater than a predefined maximum difference threshold value, it may be determined that the images does not have a spherical Equirectangular format. For example, it may be determined that the image is a non-immersive image 102n.

With reference to FIG. 4A, in the case that the image 102 is determined (in 408) as stereoscopic (e.g., in the case that the differences are less than the predefined height difference threshold value), the one or more processors may be configured to determine (in 422) the image 102 as immersive image 102i. The one or more processors may be configured to determine (in 422) the aspect ratio of the immersive image 102i and may determine (in 424 or 426), whether the immersive image 102i has an Equirectangular format and/or whether the immersive image 102i has a Fisheye format. This checking for the Equirectangular format and/or the Fisheye format may be carried out as detailed above.

Figure 4B:
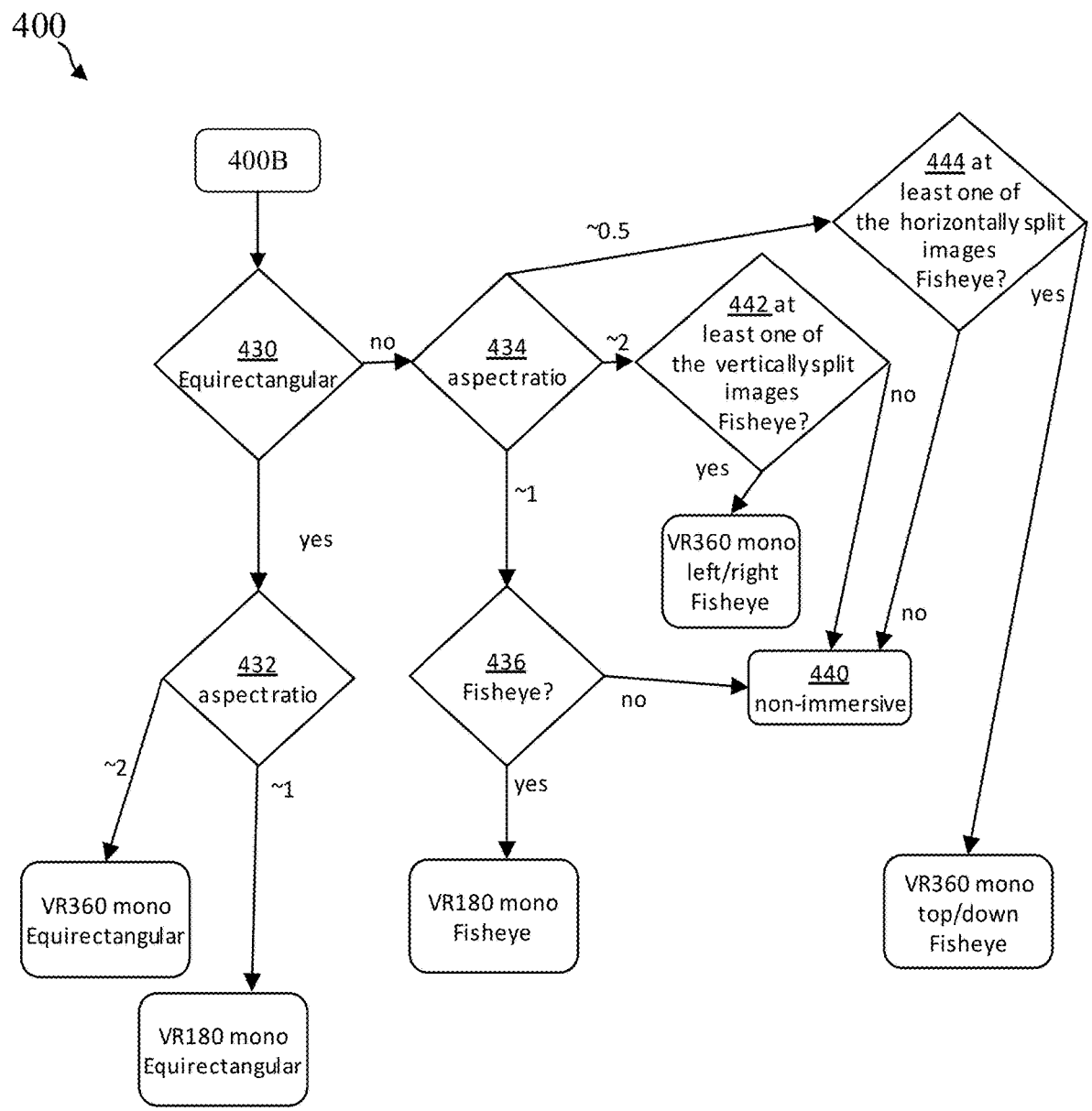

With reference to FIG. 4B, in the case that the image 102 is determined (in 414) as non-stereoscopic, the one or more processors may be configured to determine (in 430), whether the image 102 has an Equirectangular format (e.g., checking as detailed above). In the case that the image 102 is determined (in 430) as having an Equirectangular format, the one or more processors may determine the image 102 as immersive image 102i and may determine (in 432) depending on the aspect ratio (e.g., width to height), whether the immersive image 102i has a spherical (e.g., VR360) or a half-spherical (e.g., VR180) monoscopic Equirectangular format.

In the case that the image 102 is determined (in 430) as not having an Equirectangular format, the one or more processors may determine (in 434) the aspect ratio of the image 102. In the case that the aspect ratio is about 1 (e.g., in the range from about 0.95 to about 1.05), the one or more processors may determine (in 436), whether the image 102 has a Fisheye format. In the case that the aspect ratio is about 0.5 (e.g., in the range from about 0.45 to about 0.55), the one or more processors may split the image 102 horizontally in half and may determine (in 444), whether at least one of the two images has a Fisheye format. In the case that the aspect ratio is about 2 (e.g., in the range from about 1.66 to about 2.1), the one or more processors may split the image 102 vertically in half and may determine (in 442), whether at least one of the two images has a Fisheye format. Checking for the Fisheye format may be carried out as detailed above (e.g., by checking for one or more ellipses within the images). In the case that (independent of the aspect ratio), the image 102 is determined as having no Fisheye format, the one or more processors may determine (in 440) the image 102 as non-immersive image 102n.

As described herein, the two images 102(1) and 102(2) of a stereoscopic immersive image 102i may exist as two separate files and/or a spherical (e.g., Equirectangular or Fisheye) immersive image 102i may exist as two separate half-spherical files.

As an example, two images having the same file name may be provided, wherein one file may have a ".jpg" file extension and the other file may have a ".jp2" file extension. Similarly, in another example, one of two images having the same file name may have a ".png" file extension and the other file may have a ".pn2" file extension. The one or more processors may be configured to determine, based on the same file name and the different file extension, that the two files represent the two images of a stereoscopic immersive image.

Figure 9:
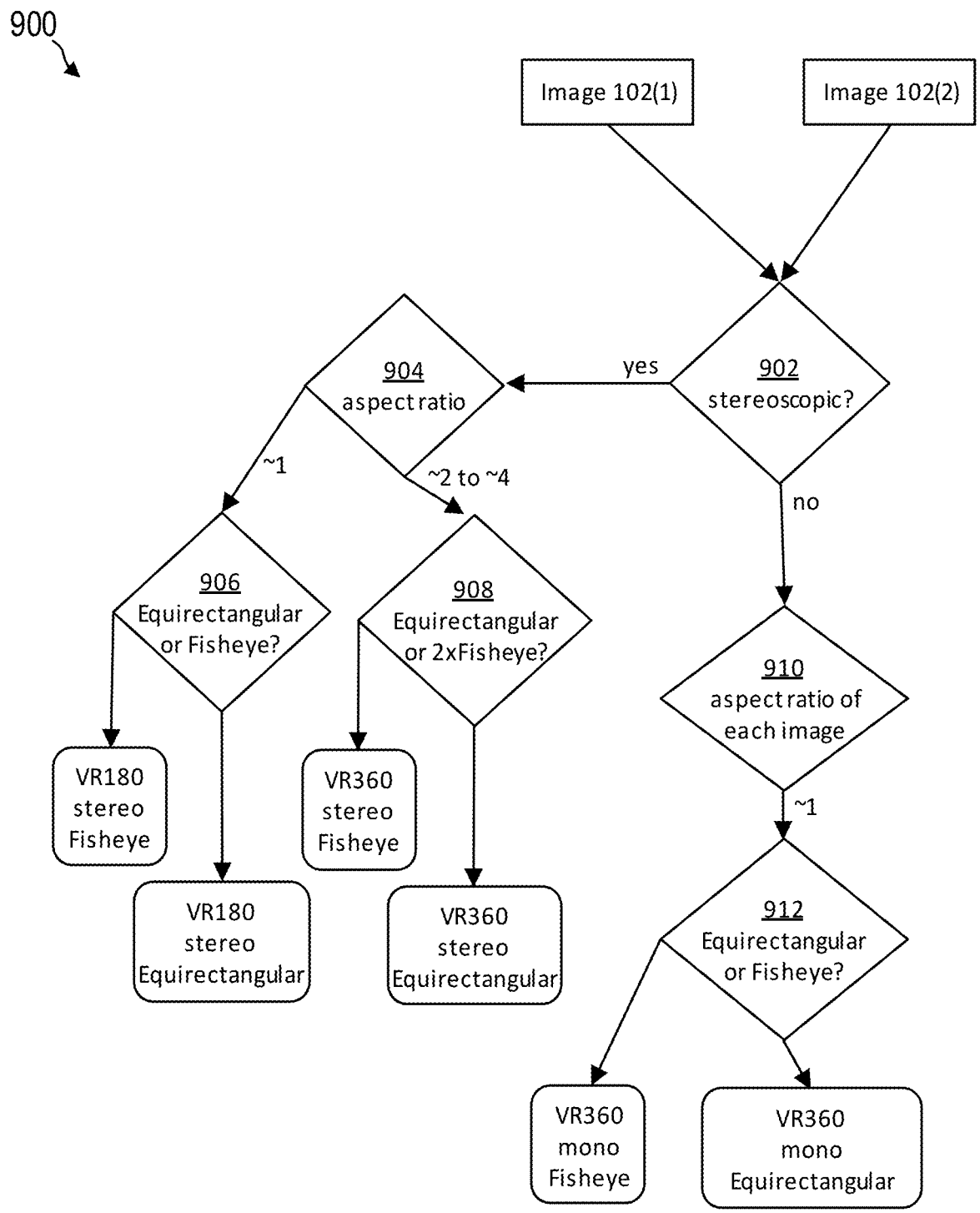
FIG. 9 shows a flow diagram for determining the format of an immersive image which exists as two separate files according to various aspects.

In this case, the two files may be treated similar to the first image and the second image described above. With reference to FIG. 9, the one or more processors may determine (in 902) whether the first image 102(1) and the second image 102(2) are stereoscopic. In the case that the first image 102(1) and the second image 102(2) are stereoscopic ("yes" in 902), the one or more processors may determine (in 904) the aspect ratio of each of the first image 102(1) and the second image 102(2) and may check (in 906 or 908 depending on the aspect ratio) at least one (e.g., both) of the first image 102(1) and the second image 102(2) for an Equirectangular format and/or Fisheye format. As described herein, the images may have a squeezed format resulting in an aspect ratio greater than two (e.g., in the range from about 2 to about 4).

In the case that the first image 102(1) and the second image 102(2) are not stereoscopic ("no" in 902), the one or more processors may determine (in 910) the aspect ratio of each of the first image 102(1) and the second image 102(2). In the case that the aspect ratio of each of the first image 102(1) and the second image 102(2) is about 1 (e.g., in the range from about 0.95 to about 1.05), the one or more processors may check (in 912) at least one (e.g., both) of the first image 102(1) and the second image 102(2) for an Equirectangular format and/or Fisheye format.

In the case that
   the aspect ratio determined in 910 is different from one, and/or
   neither the Equirectangular format nor the Fisheye format is determined (in 906 or in 908 or in 912), the one or more processors may determine a format-detection error. In this case, the one or more processor may be configured to display one of the images 102(1), 102(2) on the display device 302 as a non-immersive image. Optionally, the one or more processors may be configured to display an information regarding the format-detection error to the user via the display device 302. For example, the user may be asked to select the format of the image(s).

As described herein, the immersive image 102*i* having a Cubemap format may be provided as six separate files (in the case of a monoscopic format) or as twelve separate files (in the case of a stereoscopic format). In this case, the one or more processors may determine the format using the six or twelve files substantially similarly as described above with respect to the six or twelve sub-images.

According to various aspects, the flow diagram 400 may be adjusted in accordance with other possible formats for immersive images. An example of this is the Lightfield image format including a plurality of sub-images (e.g., 25 sub-images arranged as 5 times 5 images or 192 sub-images arranged as 12 times 16 images, etc.) which are only slightly different from one another. In this case, the one or more processors may be configured to divide the image 102 into a plurality of sub-images and to determine, whether there are "rough" transitions between the sub-images, as for example described with reference to checking for the Cubemap format (in 404). According to various aspects, the one or more processors may be configured to determine the "rough" transitions between sub-images of the immersive image without knowing the number and/or arrangement of the sub-images in advance. In this case, the one or more processors may be configured to determine the number and arrangement of the sub-images based on the detected "rough" transitions indicating a transition from one sub-image to another.

Additionally or alternatively, to the flow diagram 400, the one or more processors may be configured to implement a machine-learning model. The machine-learning model may be, for example, a reinforcement learning model (e.g., employing Q-learning, temporal difference (TD), deep adversarial networks, etc.), a classification model (e.g., a linear classifier (e.g., logistic regression or naive Bayes classifier), a support vector machine, a decision tree, a boosted tree, a random forest, a neural network, or a nearest neighbor model). A neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, among others.

The machine-learning model may be trained to determine the format 104 of the image 102. According to some aspects, the process shown in flow diagram 400 may be combined with the machine-learning model. For example, the flow diagram 400 may be employed to determine, whether the image 102 has a Cubemap format and the machine-learning model may be trained to determine whether the image 102 has an Equirectangular format or a Fisheye format or whether the image 102 is a non-immersive image.

Figure 14:
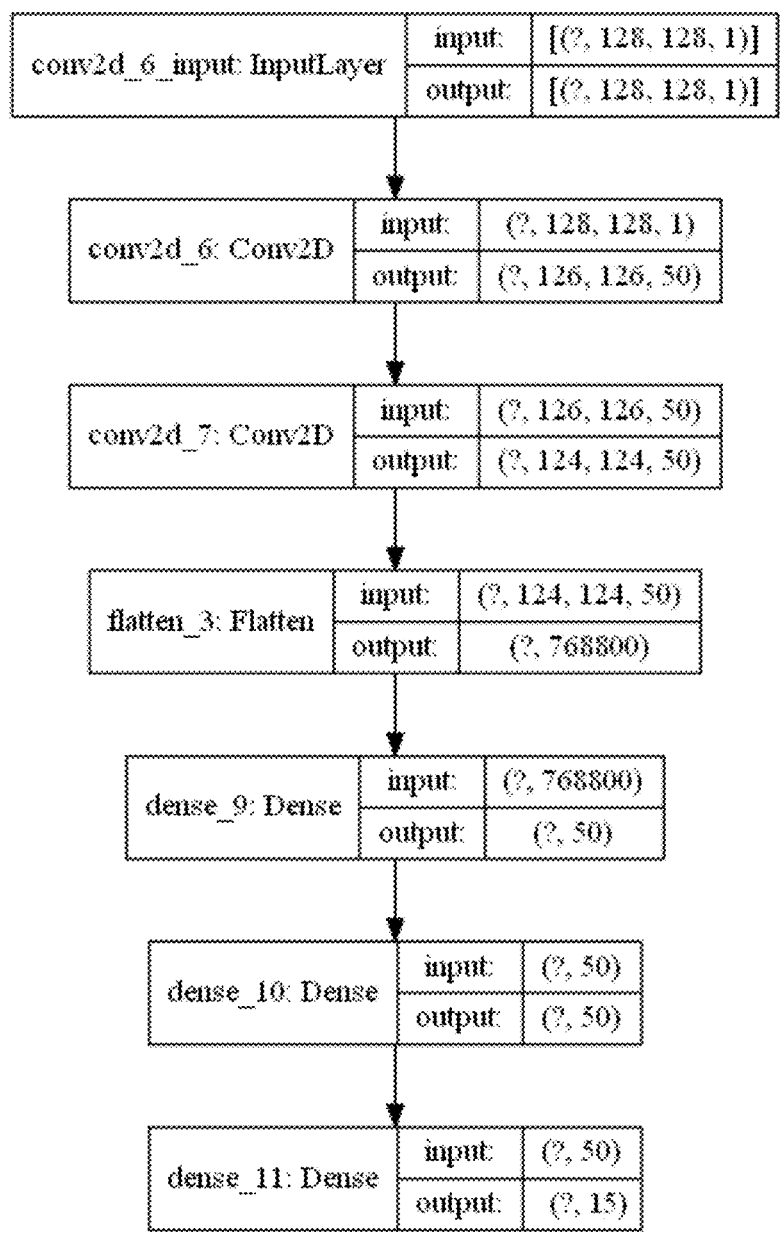
FIG. 14 shows an exemplary machine-learning model according to various aspects.

For illustration, an exemplary machine-learning model 1400 (in this example a convolutional neural network) is shown in FIG. 14. In this example, the image 102 may be resized to 128×128 pixels (independent of the original aspect ratio) and inputted into the model. Different implementations may use other resolutions, e.g., 256×256 or 400×300. This exemplary machine-learning model 1400 has two convolutional layers with a filter size of 50 and a 3×3 kernel. For these two layers, the activation function "rectified linear unit" (ReLU) is used. After that, the two-dimensional image gets flattened into a one-dimensional array and two dense layers with the ReLU activation functions are used afterwards. The third and last dense layer of this exemplary machine learning model 1400 uses the "softmax" activation function. During the model compilation, the optimizer may be set to "Adaptive Moment Estimation" (ADAM). The used loss function may be a "Sparse Categorical Crossentropy".

According to some aspects, the machine-learning model may be trained supervised using labelled images (i.e., a plurality of images, wherein the format of each image is known). According to other aspects, the machine-learning model may be trained unsupervised using the flow diagram 400. In this case, the one or more processors may, for each image of a plurality of images having unknown formats, determine the format of the image using the flow diagram 400 and may train the machine-learning model to output the determined format responsive to inputting the respective image. Illustratively, the plurality of images may be labelled using the flow diagram 400. The machine-learning model may be configured to predict the format of an image. The machine-learning model may be trained using a plurality of labelled images (e.g., including a format determined using flow diagram 400 for each of the images). Training the machine-learning model may include, for each image of the plurality of labelled images: inputting the image to the machine-learning model to predict the format of the image, comparing the predicted format with the format associated with the labelled image (e.g., the format determined using flow diagram 400) to determine a loss value (e.g., using a loss function), and training the machine-learning model (e.g., using a backpropagation algorithm) to reduce the determined loss value.

The inference of the machine-learning model (e.g., the application of the neural network after the training phase of FIG. 14), may be carried out by inputting an arbitrary image as input to the neural network with the previously defined resolution (e.g. 128×128). As output, the neural network outputs a decision from many categories, such as the possible formats described herein (e.g. VR360 stereo fisheye).

Figure 10A:
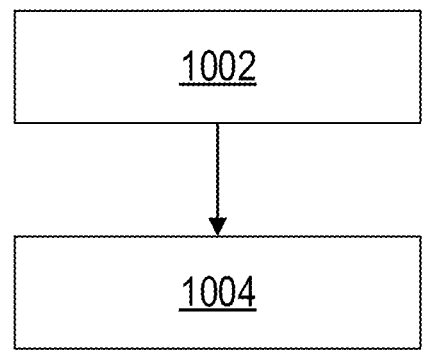
FIG. 10A shows a flow diagram of a method for determining a format of an immersive image according to various aspects.

FIG. 10A shows a flow diagram of a method 1000 for detecting a format of an image according to various aspects. The method 1000 may include determining an aspect ratio of an immersive image and one or more additional characteristics of the immersive image (in 1002). The method 1000 may include determining a format of the immersive image using the determined aspect ratio and the determined one or more additional characteristics of the immersive image (in 1004). The determining of the format of the immersive image using the determined aspect ratio and the determined one or more additional characteristics may be carried out as described with reference to the flow diagram 400.

The method 1000 may be implemented in hardware. For example, the method 1000 may be carried out by a fast image processor. Such a chip may be implemented into a head-mounted display and/or augmented reality glasses. This may provide a faster, smoother and less battery-draining experience when browsing through various immersive images.

Figure 10B:
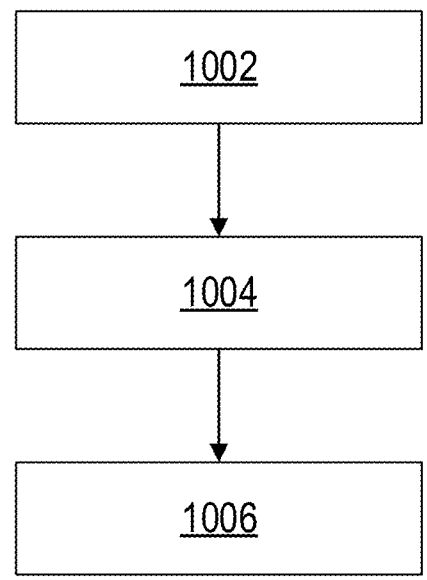
FIG. 10B shows a flow diagram of a method for generating a thumbnail of an immersive image according to various aspects.

Optionally, as shown in FIG. 10B, the method 1000 may further include generating a thumbnail of the immersive image using the determined format of the immersive image (in 1006). The generation of the thumbnail may be, for example, carried out as described below exemplarily for the one or more processors.

According to various aspects, the one or more processors may be configured to generate the thumbnail of the immersive image 102i using the determined format 104. Considering the format 104 of the immersive image 102i may improve the thumbnail as compared to merely minimizing (e.g., by brute-force) the immersive image 102i, as will be apparent from the following description. For example in the case of a Fisheye format, mere minimization of the immersive image 102i may show the black region not filled with content.

Figure 11A:
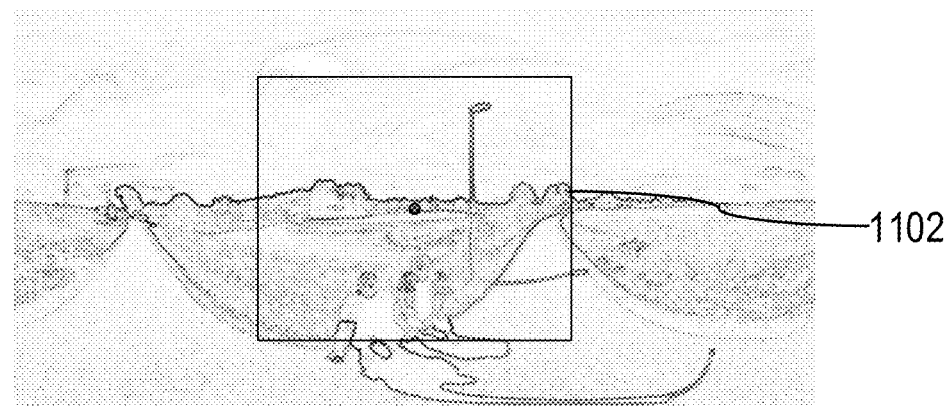
FIG. 11A and FIG. 11B each show a square within the immersive image selected as thumbnail according to various aspects.
Figure 11B:
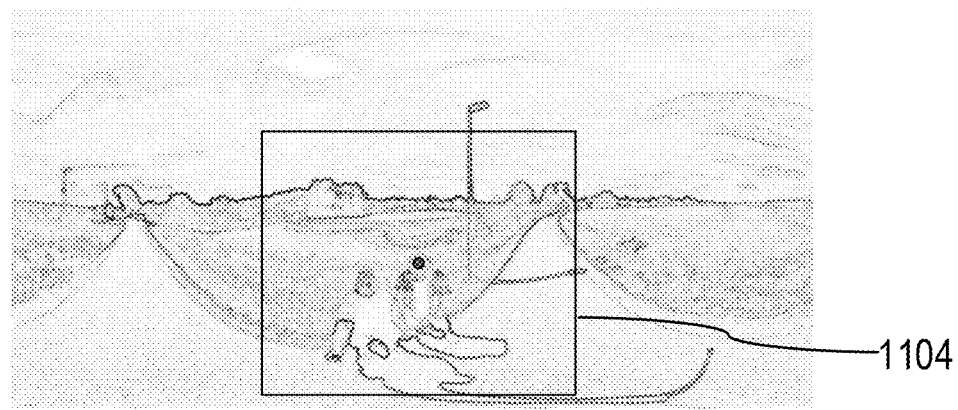

The one or more processors may be configured to, in the case that the image 102 is determined as immersive image 102i having a monoscopic Equirectangular format, select a rectangle (e.g., a square) within the immersive image 102i. The rectangle may be selected as originating in a predefined point of the immersive image 102i. According to some aspects, the predefined point may be the center of the immersive image 102i. According to other aspects, the one or more processors may be configured to detect one or more faces within the immersive image 102i using a face detection and to select one of the detected one or more faces as the predefined point. According to even other aspects, the one or more processors may be configured to carry out eye tracking of users to which the immersive image 102i is presented via the dedicated device and to select the predefined point as a point at which the users look most. FIG. 11A shows an exemplarily selected square 1102 having the center of the immersive image 200B as predefined point. FIG. 11B shows an exemplarily selected square 1104 having a face detect within the immersive image 200B as predefined point.

According to various aspects, the predefined point may be updated. For example, the center or a detected face may be selected as an initial predefined point and after providing the immersive image 102i to one or more users, the predefined point may be updated to a look-at-point using eye tracking of the users.

The rectangle may be selected to show only part of the immersive image 102i, such as showing about 80 percent of the immersive image 102i. As an example, about 10 percent in the upper region and about 10 percent in the lower region of the immersive image 102i may be not be covered by the rectangle.

The one or more processors may be configured to generate the thumbnail of the immersive image 102i showing the selected rectangle.

The one or more processors may be configured to, in the case that the image 102 is determined as immersive image 102i having a half-spherical Fisheye format, select, within the immersive image, a rectangle (e.g., a square) originating in the predefined point and to generate the thumbnail of the immersive image showing the selected rectangle. As described herein, a spherical Fisheye image may consist of two half-spherical Fisheye images. Therefore, in the case that the image 102 is determined as immersive image 102i having a spherical Fisheye format one of the two half-spherical Fisheye images may be used to select the rectangle and to generate the thumbnail from that rectangle. For example, the one or more processors may be configured to select one half-spherical image as forward direction and the other half-spherical image as backward direction (e.g., using metadata). For example, the forward direction and backward direction may be selected using a camera model and/or camera manufacturer of the camera used to acquire the image. For example, the arrangement of the image showing the forward direction and the image showing the backward direction may be fixed for each camera model. The metadata may include information regarding the camera model. According to various aspects, in the case of a Fisheye format, the one or more processors may be configured to use the diameter(s) of the detected ellipses to determine the camera model and/or camera manufacturer. According to various aspects, in the case of an Equirectangular format, the one or more processors may be configured to determine a noise behavior of the image and may compare the noise behavior with a stored list which includes a plurality of sensors of cameras and a corresponding noise behavior. Alternatively, the one of the images may be selected (e.g., the first one or may be selected randomly).

The rectangle may be selected to show only part of the immersive image 102i, such as showing about 60 percent of the immersive image 102i. According to various aspects, instead of cutting out the rectangle (which contains the distortions of the respective format), a non-rectangular image area may be selected and may be converted into a flat, perspective representation, which is then rectangular.

The one or more processors may be configured to, in the case that the image 102 is determined as immersive image 102i having monoscopic Cubemap format, divide the immersive image into six sub-images transitioning into each other, wherein each of the six sub-images corresponds to one of the following directions: a forward direction (x), a backward direction (−x) opposite to the forward direction, an up direction (y), a down direction (−y) opposite to the up direction, a left direction (z), and a right direction (−z) opposite to the left direction. The one or more processors may be configured to select, within the sub-image corresponding to the forward direction, a rectangle (e.g., a square) originating in the predefined point and to generate the thumbnail of the immersive image showing the selected rectangle. The rectangle may be selected to show only part of the immersive image 102i, such as showing about 65 percent of the immersive image 102i. According to various aspects, the fifth image may be selected as forward direction. According to other aspects, the one or more processors may be configured to detect one or more faces within the sub-images using a face detection and to select the sub-image, in which one or more faces are detected, as forward direction.

The one or more processors may be configured to, in the case that the image 102 is determined as non-immersive image 102n, to select a rectangle (e.g., a square) originating in the predefined point and to generate the thumbnail of the immersive image showing the selected rectangle.

According to various aspects, the one or more processors may be configured to render the immersive image 102i depending on the determined format and generate the thumbnail of the immersive image 102i by taking a screenshot of a rectangle within the rendered immersive image. According to other aspects, the one or more processors may be configured to render the immersive image 102i depending on the determined format and generate the thumbnail of the immersive image as an animated thumbnail showing a plurality of consecutive images from a first point within the immersive image to the second point within the immersive image. Illustratively, the thumbnail may be a sequence of consecutive images. Illustratively, the thumbnail may be an animated thumbnail scrolling through the (e.g., spherical) panorama of the immersive image 102i. Two or more points of interest may be selected (e.g., picked) inside the panorama, such as a first point at one third of the width, W, at half of the height, H, of the immersive image 102i and a second point at two third of the width, W, and half of the height, H. When the thumbnail is displayed, a virtual camera may render the undistorted view with the first "look at"-point at (⅓, ½) and over time smoothly rotate to the second "look at"-point at (⅔, ½). This way, even in a square crop, more information about the immersive image 102i can be displayed to the user through watching the thumbnail over time. Other spots for such effects could be taken if two faces are detected in such a panorama and those locations are taken for transition of the look-at-point of the virtual rendering camera for the thumbnail.

In the case of a stereoscopic format, only one of the two stereoscopic images may be used for the thumbnail and processed as described above (e.g., the one for the left eye or the one for the right eye).

Illustratively, automatically detecting the format 104 of the immersive image 102i may allow to generate a meaningful thumbnail of the immersive image 102i.

Figure 12:
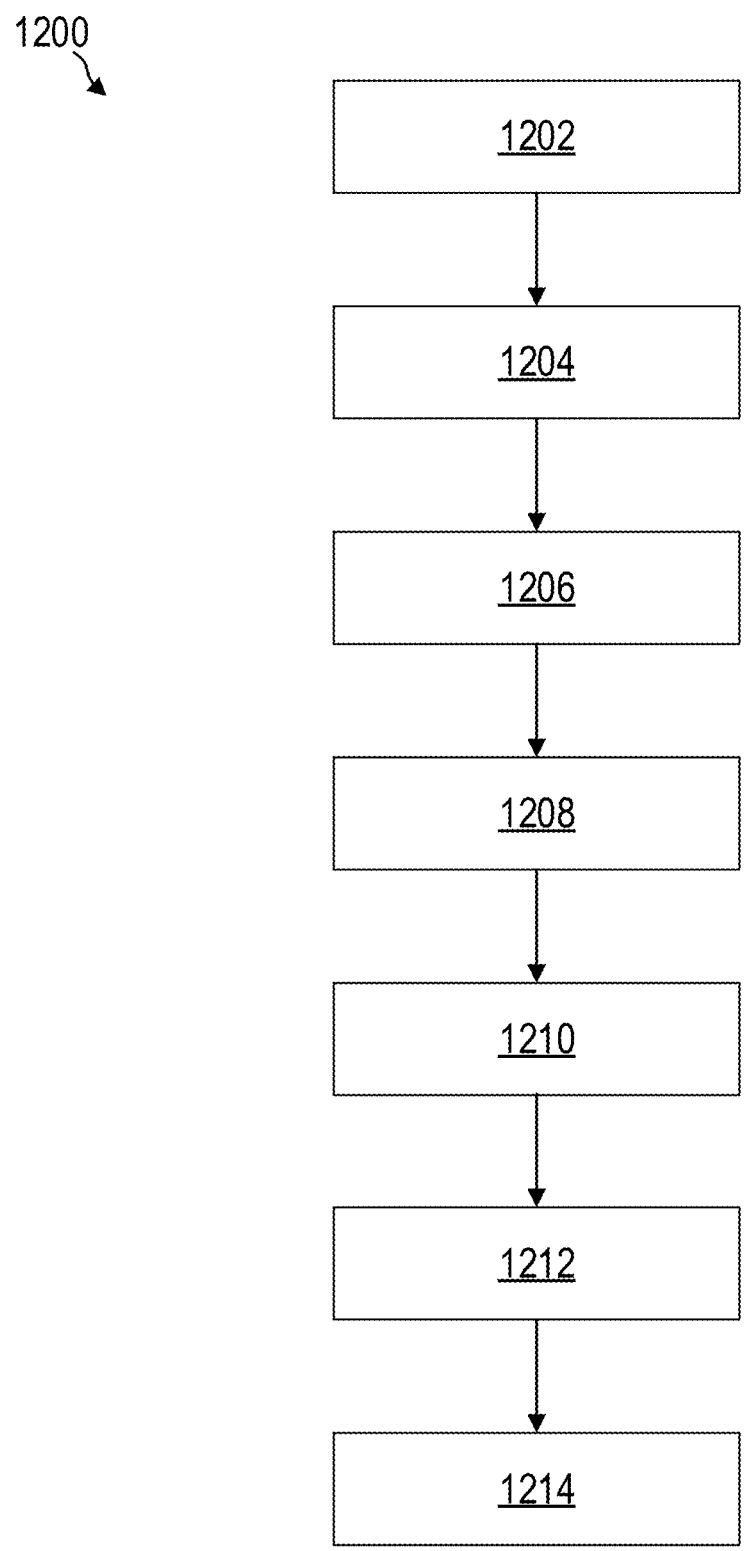
FIG. 12 shows a flow diagram of a method for rendering an immersive image according to various aspects.

FIG. 12 shows a flow diagram of a method 1200 for rendering an immersive image (e.g., having an Equirectangular format) according to various aspects. The one or more processors of the device 100 may be configured to carry out the method 1200. According to various aspects, at least a part of the method 1200 may be carried out in a shader and/or a graphics driver. For example, the method 1200 may be implemented directly in hardware (e.g., with specific support for 180 degrees and/or 360 degrees Equirectangular images) in a texture sampling unit on a GPU. Also rendering an immersive image having a Fisheye format may be implemented in hardware (e.g., in a special texture sampling mode in the texture units of the GPU) having changes of the texture coordinates in the shader implemented.

As known to the skilled person, rendering (also called image synthesis) is the process of generating an image considering geometry, viewpoint, texture, lighting, and shading information describing the (e.g., virtual) scene. In the case of an immersive image, rendering the immersive image may include projecting the immersive image on a sphere. Images (e.g., immersive images) may be rendered, for example, using rasterization or ray-tracing.

In rasterization, a sphere consisting of triangles (then called triangle rasterization) or quads may be put into the scene having texture coordinates on all its vertices which can be used to access the texels. A texel, as used herein, may be understood as a pixel in a texture. However, to parameterize a sphere into such a triangle mesh certain issues will arise at the poles: The triangles at the poles may be very large in one dimension. For the pole cap, a "triangle fan" may be used with multiple triangles sharing one common vertex. The resolution at the poles may be increased by adding more triangles, but this would add a lot of extra and computational expensive geometric detail in an area which is comparatively small. Further, when rendering scenes in a rasterizer, the textures may contain evenly spread information inside them. A brick texture will have the same amount of detail that will be applied to a virtual wall in the top left corner, in the center, and anywhere else.

If the rendering resolution is not as high as to cover all the details during rendering a texture, artifacts will appear. This is based on the Nyquist-Shannon sampling theorem which provides a guidance in the field of signal processing about sampling continuous signals with discrete-steps. This applies to the minification, hence, when the content is sampled in a smaller version than the original data. To compensate for this issues, at least bilinear texture filtering may be used when the texture data is sampled. For example, minification using bilinear texture filtering may improve the image quality, but by far not enough to be visually pleasing. To optimize the visual quality, the concept of mipmaps may be employed. "Mipmaps" as used herein may be pre-filtered smaller versions of the same texture. Depending on derivatives to the neighboring rendering pixel, during shading, a mipmap level may be determined (e.g., calculated) and the pre-filtered version of the texture may be used. However, by only using a discrete mipmap level, there may be a noticeable border during rendering when the mipmap level changes. To avoid this hard border, trilinear filtering may be used: The texture may be accessed with bilinear filtering in the two closest mipmap levels and these two filtered results may be linear filtered. This kind of filtering may use an isotropic filter width. In the case of isotropic filtering, a sample may be taken with the same width and height for the filter. Specifically, on surfaces that are far angled from the viewer an anisotropic filtering with different filter height and width may lead to better results. Mipmap levels may be determined using the lengths of the derivative vectors.

Figure 8:
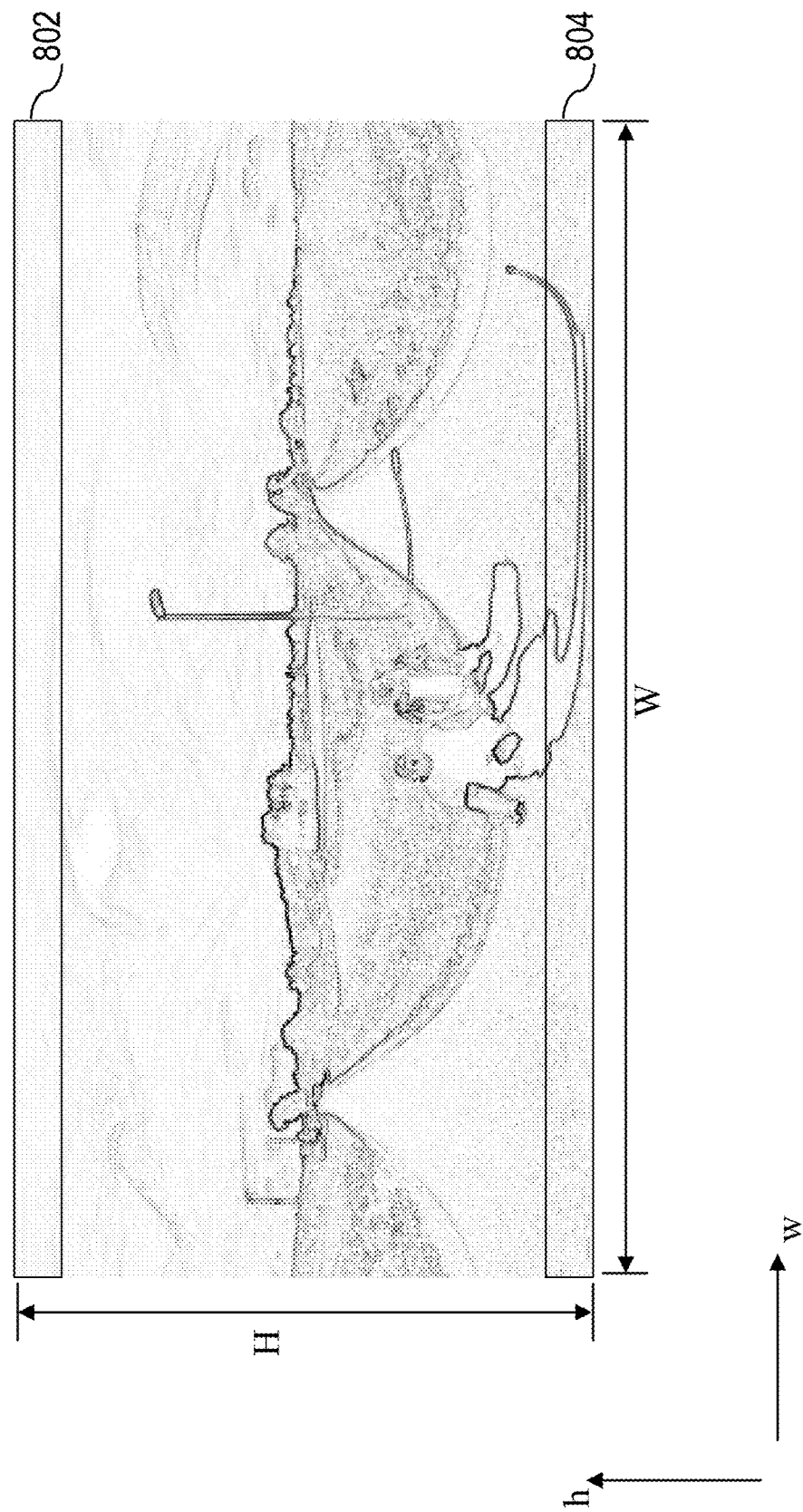
FIG. 8 exemplarily shows a selecting of an upper edge region and a lower edge region of an Equirectangular immersive image.

However, as detailed herein exemplarily for the immersive image 200B in FIG. 8, in the case of an immersive image having an Equirectangular format, the pixels in the upper edge region 802 and the pixels in the lower edge region 804 are widely stretched horizontally. When applying an Equirectangular texture in rasterization to the sphere, the determined mipmap level for trilinear filtering may have been chosen from the texture coordinate derivatives without considering that some regions (e.g., the upper edge region 802 and the lower edge region 804) of the Equirectangular image already contain less detail. This may result in blurred renderings. The effect is even increased by the long spikey triangles at the poles which, for example, during isotropic filtering may result in even more overly blurred renderings. The details within these regions may be increased using the method 1200.

The method 1200 may include determining a first mipmap level in width direction of an immersive image having an Equirectangular format and a second mipmap level in height direction of the immersive image (in 1202).

The method 1200 may include selecting an upper edge region of the immersive image and/or a lower edge region of the immersive image (in 1204). As detailed above, these regions may be distorted. As exemplarily shown in FIG. 13, the upper (in some aspects referred to as top) 20% of the immersive image 200B may be selected as upper edge region 802 and/or the lower (in some aspects referred to as bottom) 20% of the immersive image 200B may be selected as lower edge region 804. As understood, in these regions there may be more detail in horizontal direction, h than in width direction, w.

The method 1200 may include selecting, for the outermost pixel row of the selected edge region, a predefined mipmap shifting bias (in 1206). The predefined mipmap shifting bias may be greater than zero (e.g., 1.21). In the case of the upper edge region 802, the outermost pixel row may be the uppermost pixel row (e.g., the pixels p(h, w) having the highest height value, h). In the case of the lower edge region 804, the outermost pixel row may be the lowest pixel row (e.g., the pixels p(h, w) having the lowest height value, h). Illustratively, the outermost pixel row may refer to the pixels being closest to the respective pole when projecting the immersive image 200B on a sphere. It is noted that a "pixel row" as used herein may also refer to a texel row.

The method 1200 may include selecting, for the innermost pixel row of the selected edge region, a mipmap shifting bias equal to zero (in 1208).

Figure 13:
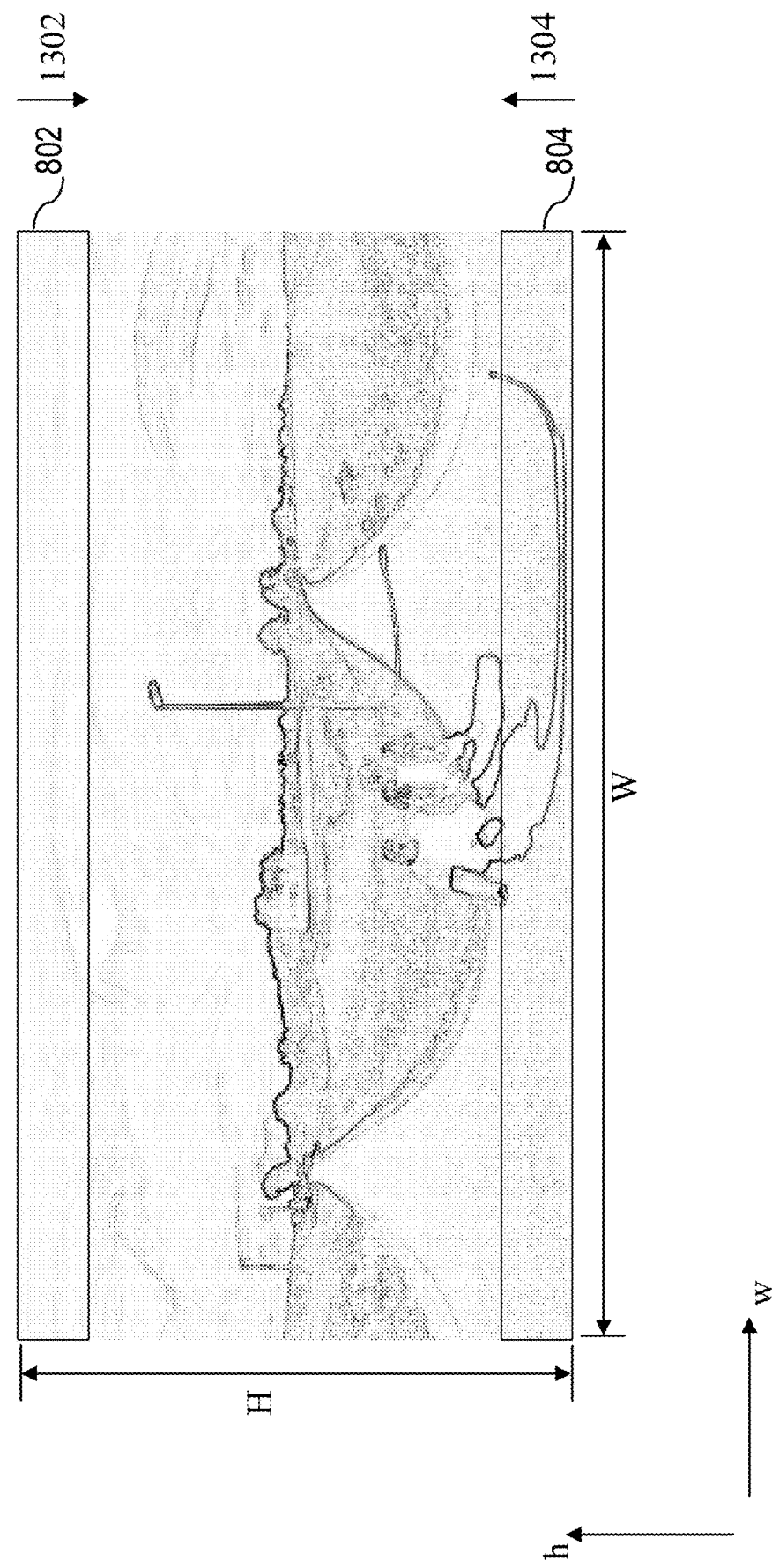
FIG. 13 shows an immersive image to be rendered according to various aspects.

The method 1200 may include determining for each pixel row of the selected edge region a mipmap shifting bias by interpolating the predefined mipmap shifting bias in height direction (or opposite the height direction) of the immersive image from the outmost pixel towards zero at the innermost pixel row (in 1210). The interpolation may be or may employ a linear interpolation, a sinus function, etc. The mipmap shifting bias may correspond to a shifting bias value. With reference to FIG. 13, the mipmap shifting bias 1302 determined for the pixel rows of the upper edge region 802 may increase towards the center of the immersive image 200B (as indicated by the arrow). Analogously, the mipmap shifting bias 1304 determined for the pixel rows of the lower edge region 804 may increase towards the center of the immersive image 200B (as indicated by the arrow). For example, at the most top or most bottom texel row of the immersive image, the predefined mipmap shifting bias of 1.21 may be selected for sampling in the height direction. This will result in a sharper image along the height direction. The value of 1.21 may be interpolated towards 0 at the point where the 20% border is reached.

The method 1200 may include adjusting the determined second mipmap level using the mipmap shifting biases (in 1212).

The method 1200 may include rendering the immersive image using the determined first mipmap level and the adjusted second mipmap level (in 1214). Illustratively, when accessing the texture for sampling, the mipmap level value for the width direction, w, may be kept as initially determined, but the value for the height direction, h, may be modified according to the determined mipmap shifting bias. This may lead to an anisotropic filtering.

It is noted that anisotropic texture filtering may be carried out using rip maps. "Rip maps", as used herein, may be pre-filtered mipmaps with different sizes for different width direction and height direction downsampling factors. The method 1200 may be used for rip maps as well. As described above, the immersive image may be rendered using ray-tracing. Here, virtual camera rays are used to sample the scene. This enables to have a skysphere effect in which the rays determine the direction of a sphere that would be sampled. This may avoid the issue with the parameterization of the sphere at the poles. To determine which mipmap level to use, ray differentials may be applied which basically result in texture derivatives. The texture derivatives may be modified using the mipmap shifting biases determined according to method 1200. In rasterization, such a sky sphere shader may be approximated as well through using the geometry of the sphere, but to calculate directional vectors from the current virtual camera position to the vertices of the triangles to be shaded. In this case, the mipmap shifting biases determined according to method 1200 may be used as well.

In the following, various aspects of this disclosure will be illustrated. It is noted that aspects described with reference to the device may be accordingly implemented in the method and vice versa.

Example 1 is a device including: one or more processors configured to: determine an aspect ratio of an immersive image and one or more additional characteristics of the immersive image, and determine a format of the immersive image using the determined aspect ratio and the determined one or more additional characteristics of the immersive image.

In Example 2, the subject-matter of Example 1 can optionally include that the immersive image is an image of an immersive video.

In Example 3, the device of Example 1 or 2 can optionally further include: a display device to display computer-simulated reality in accordance with the immersive image.

In Example 4, the subject-matter of any one of Examples 1 to 3 can optionally include that the format of the immersive image includes an Equirectangular format, a Fisheye format or a Cubemap format.

In Example 5, the subject-matter of Example 4 can optionally include that the format of the immersive image indicates, whether the immersive image is a stereoscopic image or a monoscopic image.

In Example 6, the subject-matter of Example 5 can optionally include that, in the case of a stereoscopic immersive image, the format indicates: whether the two images of the stereoscopic immersive image are arranged side-by-side, or whether the two images of the stereoscopic immersive image are arranged on top of each other, or whether the two images of the stereoscopic immersive image exist as two separate files.

In Example 7, the subject-matter of any one of Examples 1 to 6 can optionally include that the format of the immersive image indicates, whether the immersive image is a spherical or a half-spherical immersive image.

In Example 8, the subject-matter of any one of Examples 1 to 7 can optionally include that the format of the immersive image is a format from the following list of formats: a monoscopic, half-spherical Equirectangular format; a monoscopic, spherical Equirectangular format; a stereoscopic, half-spherical Equirectangular format, wherein the two images of the stereoscopic immersive image are arranged side-by-side; a stereoscopic, half-spherical Equirectangular format, wherein the two images of the stereoscopic immersive image are arranged on top of each other; a stereoscopic, half-spherical Equirectangular format, wherein the two images of the stereoscopic immersive image exist as two separate files; a stereoscopic, spherical Equirectangular format, wherein the two images of the stereoscopic immersive image are arranged side-by-side; a stereoscopic, spherical Equirectangular format, wherein the two images of the stereoscopic immersive image are arranged on top of each other; a stereoscopic, spherical Equirectangular format, wherein the two images of the stereoscopic immersive image exist as two separate files; a monoscopic, half-spherical Fisheye format; a monoscopic, spherical Fisheye format represented by two half-spherical images, wherein the two half-spherical images are arranged side-by-side; a monoscopic, spherical Fisheye format represented by two half-spherical images, wherein the two half-spherical images are arranged on top of each other; a monoscopic, spherical Fisheye format represented by two half-spherical images, wherein the two half-spherical images exist as two separate files; a stereoscopic, half-spherical Fisheye format, wherein the two images of the stereoscopic immersive image are arranged side-by-side; a stereoscopic, half-spherical Fisheye format, wherein the two images of the stereoscopic immersive image are arranged on top of each other; a stereoscopic, half-spherical Fisheye format, wherein the two images of the stereoscopic immersive image exist as two separate files; a stereoscopic, spherical Fisheye format represented by two stereoscopic images for one half-sphere and two stereoscopic images for the other half-sphere, wherein the four images are arranged side-byside; a stereoscopic, spherical Fisheye format represented by two stereoscopic images for one half-sphere and two stereoscopic images for the other half-sphere, wherein the four images are arranged on top of each other; a monoscopic, spherical Cubemap format; a stereoscopic, spherical Cubemap format, wherein the two images of the stereoscopic immersive image are arranged side-by-side; a stereoscopic, spherical Cubemap format, wherein the two images of the stereoscopic immersive image are arranged on top of each other; a stereoscopic, spherical Cubemap format, wherein the two images of the stereoscopic immersive image exist as two separate files.

In Example 9, the subject-matter of any one of Examples 1 to 8 can optionally include that the one or more processors are configured to determine, whether the immersive image includes a spherical format or a half-spherical format, using the determined aspect ratio of the immersive image.

In Example 10, the subject-matter of any one of Examples 1 to 9 can optionally include that the one or more processors are configured to determine an aspect ratio of an image, and determine, whether the image is a non-immersive image (e.g., a two-dimensional flat image) or the immersive image, using the determined aspect ratio.

In Example 11, the subject-matter of Example 10 can optionally include that the one or more processors are configured to determine that the image is a non-immersive image in the case that the aspect ratio has none of the following ratios: a ratio of about 6:1 (e.g., a ratio of width to height of about 6:1 or of about 1:6), a ratio of about 6:2 (e.g., a ratio of width to height of about 6:2 or of about 2:6), a ratio of about 12:1 (e.g., a ratio of width to height of about 12:1 or of about 1:12), a ratio of width to height in a range from about 1.66 to about 2.1, a ratio of width to height in a range from about 3.4 to about 4.2, a ratio of width to height in a range from about 0.45 to about 0.55, or a ratio of width to height in a range from about 0.95 to about 1.05.

In Example 12, the subject-matter of Example 10 or 11 can optionally include that the one or more processors are configured to divide the image into a plurality of sub-images transitioning into each other, wherein at each transition from one sub-image to another sub-image of the plurality of sub-images each pixel of a plurality of pixels of the sub-image is adjacent to a respective other pixel of a plurality of other pixels of the other sub-image, wherein the one or more processors are configured to: for at least one transition, for each pixel of the plurality of pixels of the sub-image, determine a difference between the pixel value of the pixel and the pixel value of the other pixel of the other sub-image adjacent to the pixel, and determine that the image is a non-immersive image in the case that the aggregated differences between the plurality of pixels of the sub-image and the plurality of other pixels of the other sub-image of all transitions are less than a predefined minimum difference.

In Example 13, the subject-matter of Example 12 can optionally include that the one or more processors are configured to divide the image into a plurality of sub-images in the case that the aspect ratio of the image is a ratio of about 6:1, of about 6:2 or of about 12:1.

In Example 14, the subject-matter of Example 12 or 13 can optionally include that the one or more processors are configured to determine that the image is the immersive image in the case that the aggregated differences are greater than or equal to the predefined minimum difference.

In Example 15, the subject-matter of any one of Examples 12 to 14 can optionally include that the one or more processors are configured to convert the image into a greyscale image prior to determining the pixel differences between the respective sub-image and the respectively adjacent sub-image.

In Example 16, the subject-matter of any one of Examples 10 to 15 can optionally include that the one or more processors are configured to divide the image depending on the determined aspect ratio either: vertically into a first image and a second image of equal size which are arranged side-by-side, or horizontally in the first image and the second image such that the first image and the second image are arranged on top of each other.

In Example 17, the subject-matter of Example 16 can optionally include that, in a transition from the first image to the second image, each first pixel of a plurality of first pixels of the first image is adjacent to a corresponding second pixel of a plurality of second pixels of the second image, wherein the one or more processors are configured to: determine for each first pixel of the plurality of first pixel a difference between the pixel value of the first pixel and the pixel value of the second pixel (of the second image) adjacent to the first pixel, determine respective features of the first image and the second image using a feature detector, determine a feature metric using a feature matcher, wherein the feature metric includes matching features of the first image and the second image having a first value for the first image and a second value for the second image, and determine, whether the image is the non-immersive image, using the feature metric and the aggregated differences between the plurality of first pixels and the plurality of second pixels.

In Example 18, the subject-matter of Example 17 can optionally include that the one or more processors are configured to convert the image into a greyscale image prior to determining the pixel differences and/or prior to determining the features using the feature detector.

In Example 19, the subject-matter of Example 17 or 18 can optionally include that the one or more processors are configured to reduce the resolution of the image prior to determining the features using the feature detector.

In Example 20, the subject-matter of any one of Examples 17 to 19 can optionally include that the one or more processors are configured to increase the brightness of the image prior to determining the features using the feature detector.

In Example 21, the subject-matter of any one of Examples 17 to 20 can optionally include that the one or more processors are configured to, prior to determining the features using the feature detector, discard an outer region of the first image and an outer region of the second image, and determine the features of the first image for the remaining region of the first image and the features of the second image for the remaining region of the second image using the feature detector.

In Example 22, the subject-matter of any one of Examples 17 to 21 can optionally include that the one or more processors are configured to: determine a modified feature metric by multiplying, for each matching feature of the feature metric, the first value with a first threshold value and the second value with a second threshold value, wherein the first threshold value is determined using the second image and the aggregated differences between the plurality of first pixels and the plurality of second pixels and wherein the second threshold value is determined using the first image and the aggregated differences between the plurality of first pixels and the plurality of second pixels, and determine, whether the image is the non-immersive image, using the modified feature metric.

In Example 23, the subject-matter of any one of Examples 17 to 22 can optionally include that each matching feature of the feature metric is associated with a pixel of the first image and a pixel of the second image, wherein the position of each pixel is characterized by a height value in a height direction and a width value in a width direction, wherein the one or more processors are configured to: determine, for each matching feature of the feature metric, a difference between the height value of the first image and the height value of the second image, determine that the image is the non-immersive image in the case that the aggregated differences are greater than a predefined height difference threshold value.

In Example 24, the subject-matter of Example 16 and any one of Examples 17 to 23 can optionally include that the one or more processors are configured to determine that the image is the non-immersive image in the case that: the immersive image is divided vertically into the first image and the second image, the stereoscopic format is not determined for the vertically divided immersive image, and the aspect ratio of the immersive image is not in a predefined aspect ratio range.

In Example 25, the subject-matter of Example 24 can optionally include that the predefined aspect ratio range includes a range of the aspect ratio (e.g., width to height) from about 1.66 to about 2.1.

In Example 26, the subject-matter of any one of Examples 10 to 25 can optionally include that the one or more processors are configured to, for the first and/or second image or for the image: determine, for each pixel of a last column of pixels of the respective image, a difference between the pixel value of the pixel in the last column and the pixel value of the pixel in the first column of pixels having the same height value as the pixel in the last column, and determine, whether the image is the non-immersive image, using the aggregated differences between the pixels in the last column of pixels and the pixels in the first column of pixels.

In Example 27, the subject-matter of Example 26 can optionally include that the one or more processors are configured to that the image is the non-immersive image in the case that the aggregated differences are greater than a predefined maximum difference threshold value.

In Example 28, the subject-matter of any one of Examples 1 to 27 can optionally include that the one or more processors are configured to divide the immersive image into a plurality of sub-images transitioning into each other.

In Example 29, the subject-matter of Example 28 can optionally include that the one or more processors are configured to divide the image into a plurality of sub-images in the case that the aspect ratio (e.g., a ratio of width to height or of width to height) of the immersive image is a ratio of about 6:1, of about 6:2 or of about 12:1.

In Example 30, the subject-matter of Example 28 or 29 can optionally include that at each transition from one sub-image to another sub-image of the plurality of sub-images each pixel of a plurality of pixels (e.g., each adjacent pixel or adjacent pixels in an upper part of the sub-image or adjacent pixels in a lower part of the sub-image) of the sub-image is adjacent to a respective other pixel of a plurality of other pixels of the other sub-image wherein the one or more processors are configured to, for at least one transition, for each pixel of the plurality of pixels of the sub-image, determine a difference between the pixel value of the pixel and the pixel value of the other pixel of the other sub-image adjacent to the pixel, wherein the aggregated differences between the plurality of pixels of the sub-image and the plurality of other pixels of the other sub-image of all transitions is an additional characteristic of the one or more additional characteristics of the immersive image.

In Example 31, the subject-matter of Example 30 can optionally include that the one or more processors are configured to convert the immersive image into a greyscale image prior to determining the pixel differences between the respective sub-image and the respectively adjacent sub-image.

In Example 32, the subject-matter of Example 30 or 31 can optionally include that the one or more processors are configured to determine, whether the immersive image includes a Cubemap format, using the determined aspect ratio and the aggregated differences between the plurality of pixels of the sub-image and the plurality of other pixels of the other sub-image.

In Example 33, the subject-matter of Example 32 can optionally include that the one or more processors are configured to determine that the immersive image includes the Cubemap format in the case that the aspect ratio of the immersive image is a ratio of about 6:1, of about 6:2 or of about 12:1 and that the aggregated differences between the plurality of pixels of the sub-image and the plurality of other pixels of the other sub-image are greater than or equal to a predefined minimum difference.

In Example 34, the subject-matter of any one of Examples 30 to 33 can optionally include that the one or more processors are configured to determine, whether the immersive image includes a monoscopic, spherical Cubemap format or a stereoscopic, spherical Cubemap format, using the determined aspect ratio.

In Example 35, the subject-matter of Example 34 can optionally include that the one or more processors are configured to determine that the immersive image includes the monoscopic, spherical Cubemap format in the case that the determined aspect ratio is a ratio of about 6:1.

In Example 36, the subject-matter of Example 34 or 35 can optionally include that the one or more processors are configured to determine that the immersive image includes the stereoscopic, spherical Cubemap format in the case that the aspect ratio is a ratio of about 12:1 or of about 6:2.

In Example 37, the subject-matter of any one of Examples 1 to 36 can optionally include that the one or more processors are configured to determine, whether the immersive image includes a monoscopic format or a stereoscopic format, using the determined aspect ratio of the immersive image.

In Example 38, the subject-matter of Example 37 can optionally include that the one or more processors are configured to divide the immersive image depending on the determined aspect ratio either: vertically into a first image and a second image of equal size such that the first image and the second image are arranged side-by-side, or horizontally in the first image and the second image such that the first image and the second image are arranged on top of each other.

In Example 39, the subject-matter of Example 38 can optionally include that the one or more processors are configured to divide the immersive image vertically into the first image and the second image in the case that the determined aspect ratio of the immersive image includes a ratio of width to height in a range from about 1.66 to about 2.1 or in a range from about 3.4 to about 4.2.

In Example 40, the subject-matter of Example 38 or 39 can optionally include that the one or more processors are configured to divide the immersive image horizontally into the first image and the second image in the case that the determined aspect ratio of the immersive image includes a ratio of width to height in a range from about 0.45 to about 0.55 or in a range from about 0.95 to about 1.05.

In Example 41, the subject-matter of any one of Examples 38 to 40 can optionally include that, in a transition from the first image to the second image, each first pixel of a plurality of first pixels of the first image is adjacent to a corresponding second pixel of a plurality of second pixels of the second image, wherein the one or more processors are configured to: determine for each first pixel of the plurality of first pixel a difference between the pixel value of the first pixel and the pixel value of the second pixel (of the second image) adjacent to the first pixel, wherein the aggregated differences between the plurality of first pixels and the plurality of second pixels is an additional characteristic of the one or more additional characteristics of the immersive image, determine respective features of the first image and the second image using a feature detector, determine a feature metric using a feature matcher, wherein the feature metric includes matching features of the first image and the second image having a first value for the first image and a second value for the second image, and determine, whether the immersive image includes a monoscopic format or a stereoscopic format, using the feature metric and the aggregated differences between the plurality of first pixels and the plurality of second pixels.

In Example 42, the subject-matter of Example 41 can optionally include that the one or more processors are configured to convert the immersive image into a greyscale image prior to determining the pixel differences and/or prior to determining the features using the feature detector.

In Example 43, the subject-matter of Example 41 or 42 can optionally include that the one or more processors are configured to reduce the resolution of the immersive image prior to determining the features using the feature detector.

In Example 44, the subject-matter of any one of Examples 41 to 43 can optionally include that the one or more processors are configured to increase the brightness of the immersive image prior to determining the features using the feature detector.

In Example 45, the subject-matter of any one of Examples 41 to 44 can optionally include that the one or more processors are configured to prior to determining the features using the feature detector discard an outer region of the first image and an outer region of the second image, and determine the features of the first image for the remaining region of the first image and the features of the second image for the remaining region of the second image using the feature detector.

In Example 46, the subject-matter of any one of Examples 41 to 45 can optionally include
that the one or more processors are configured to: determine a modified feature metric by multiplying, for each matching feature of the feature metric, the first value with a first threshold value and the second value with a second threshold value, wherein the first threshold value is determined using the second image and the aggregated differences between the plurality of first pixels and the plurality of second pixels and wherein the second threshold value is determined using the first image and the aggregated differences between the plurality of first pixels and the plurality of second pixels, and determine, whether the immersive image includes a monoscopic format or a stereoscopic format, using the modified feature metric.

In Example 47, the subject-matter of any one of Examples 41 to 46 can optionally include that each matching feature of the feature metric is associated with a pixel of the first image and a pixel of the second image, wherein the position of each pixel is characterized by a height value in a height direction and a width value in a width direction.

In Example 48, the subject-matter of Example 47 can optionally include that the one or more processors are configured to: determine, for each matching feature of the feature metric, a difference between the height value of the first image and the height value of the second image, determine that the immersive image includes a stereoscopic format in the case that the aggregated differences are less than or equal to a predefined height difference threshold value.

In Example 49, the subject-matter of any one of Examples 38 to 48 can optionally include that in the case that: the immersive image is divided vertically into the first image and the second image, the stereoscopic format is not determined for the vertically divided immersive image, and the aspect ratio of the immersive image is in a predefined aspect ratio range, the one or more processors are configured to divide the immersive horizontally into the first image and the second image and to determine again, whether the immersive image includes a monoscopic format or a stereoscopic format.

In Example 50, the subject-matter of Example 49 can optionally include that the predefined aspect ratio range includes a ratio of width to height in the range from about 1.66 to about 2.1.

In Example 51, the subject-matter of any one of Examples 37 to 50 can optionally include that the one or more processors are configured to determine that the immersive image includes either a stereoscopic format or a Fisheye format in the case that the immersive image exists as two files.

In Example 52, the subject-matter of any one of Examples 37 to 51 can optionally include that the one or more processors are configured to, in the case that the stereoscopic format is determined for the immersive image, detect using image recognition, whether the first image includes at least one first ellipse (e.g., a first circle) having a ratio of the diameter of the minor axis to the diameter of the major axis greater than a predefined axis ratio and/or whether the second image includes at least one second ellipse (e.g., a second circle) having a ratio of the diameter of the minor axis to the diameter of the major axis greater than the predefined axis ratio.

In Example 53, the subject-matter of Example 52 can optionally include that the one or more processors are configured to change the size of the first image and/or the size of the second image to an aspect ratio of 1:1 prior to detecting whether the first image includes the at least one first ellipse and/or whether the second image includes at least one second ellipse.

In Example 54, the subject-matter of Example 52 or 53 can optionally include that the one or more processors are configured to determine, whether the immersive image includes a stereoscopic Fisheye format, depending on the parameters (e.g., the diameter of the major axis, the diameter of the minor axis, and/or the center of the ellipse) of the determined at least one first ellipse and/or at least one second ellipse.

In Example 55, the subject-matter of any one of Examples 52 to 54 can optionally include that the one or more processors are configured to determine that the immersive image includes a stereoscopic Fisheye format in the case that: the diameter of the major axis and/or the diameter of the minor axis of the at least one first ellipse is greater than a predefined fraction of the height and/or the width of the first image, and/or the diameter of the major axis and/or the diameter of the minor axis of the at least one second ellipse is greater than a predefined fraction of the height and/or the width of the second image, and/or a distance between the center of the at least one first ellipse and the center of the first image is less than or equal to a predefined maximum distance, and/or a distance between the center of the at least one second ellipse and the center of the second image is less than or equal to the predefined maximum distance.

In Example 56, the subject-matter of Example 54 or 55 can optionally include that the one or more processors are configured to determine that the immersive image includes a stereoscopic Equirectangular format that the immersive image is determined as having no stereoscopic Fisheye format.

In Example 57, the subject-matter of any one of Examples 52 to 56 can optionally include that the one or more processors are configured to convert the first image and/or second image into a greyscale image prior to detecting whether the first image includes the at least one first ellipse and/or whether the second image includes at least one second ellipse.

In Example 58, the subject-matter of any one of Examples 52 to 57 can optionally include that the one or more processors are configured to reduce the resolution of the first image and/or the resolution of the second image prior to detecting whether the first image includes the at least one first ellipse and/or whether the second image includes at least one second ellipse.

In Example 59, the subject-matter of any one of Examples 52 to 58 can optionally include that the one or more processors are configured to reduce the sharpness of the first image and/or the sharpness of the second image prior to detecting whether the first image includes the at least one first ellipse and/or whether the second image includes at least one second ellipse.

In Example 60, the subject-matter of any one of Examples 37 to 59 can optionally include that the one or more processors are configured to, in the case that the stereoscopic format is determined for the immersive image: detect in an upper edge region of the first image, a lower edge region of the first image, an upper edge region of the second image, and/or a lower edge region of the second image a respective edge value in height direction of the respective image and in width direction of the respective image using an edge detector (e.g., the Scharr algorithm, the Sobel algorithm, and/or the Laplace algorithm), wherein the edge value indicates an amount of edge within the respective edge region, determine a ratio of the edge value in width direction to the edge value in height direction, and determine that the immersive image includes no Equirectangular format in the case that the determined ratio is greater than a predefined edge ratio threshold value.

In Example 61, the subject-matter of Example 60 can optionally include that the one or more processors are configured to determine that the immersive image includes a Fisheye format in the case that the immersive image is determined as having no Equirectangular format.

In Example 62, the subject-matter of Example 60 can optionally include that the one or more processors are configured to determine, whether the ratio of the edge value in width direction to the edge value in height direction is greater than the predefined edge ratio threshold value, in the case that it is determined according to Example 54 or 55 that the immersive image includes no stereoscopic Fisheye format.

In Example 63, the subject-matter of any one of Examples 60 to 62 can optionally include that the one or more processors are configured to convert the first image and/or the second image into a greyscale image prior to detecting the respective edge values.

In Example 64, the subject-matter of any one of Examples 60 to 63 can optionally include that the one or more processors are configured to reduce the resolution of the first image and/or the resolution of the second image prior to detecting the respective edge values.

In Example 65, the subject-matter of any one of Examples 60 to 64 can optionally include that the one or more processors are configured to, in the case that the determined ratio is less than or equal to the predefined edge ratio threshold value: reduce the width of the first image and/or the second image while keeping the height unchanged, increase the height and width of the respective image with reduced width in the same proportion such that the width of the respective image corresponds to the original width prior to reducing the width, determine a difference between the respective edge region of the respective image prior to reducing the size and the edge region after increase the image size, and determine that the immersive image includes a stereoscopic Equirectangular format in the case that the difference is less than a predefined edge region difference threshold value.

In Example 66, the subject-matter of Example 65 can optionally include that the one or more processors are configured to determine that the immersive image includes no Fisheye format in the case that the difference is greater than or equal to the predefined edge region difference threshold value.

In Example 67, the subject-matter of any one of Examples 60 to 65 can optionally include that, in the case that it is determined that the immersive image includes no Equirectangular format, the one or more processors are configured to select a larger region of the respective image as edge region and to determine again, whether the ratio of the edge value in width direction to the edge value in height direction is greater than the predefined edge ratio threshold value.

In Example 68, the subject-matter of any one of Examples 37 to 51 can optionally include that, in the case that it is determined that the immersive image includes a monoscopic format or that the immersive image includes no stereoscopic format, the one or more processors are configured to detect using image recognition, whether the immersive image includes at least one ellipse (e.g., a circle) having a ratio of the diameter of the minor axis to the diameter of the major axis greater than a predefined axis ratio.

In Example 69, the subject-matter of Example 68 can optionally include that the one or more processors are configured to change the size of the immersive image to an aspect ratio of 1:1 prior to detecting, whether the immersive image includes the at least one ellipse.

In Example 70, the subject-matter of Example 68 or 69 can optionally include that the one or more processors are configured to determine depending on the parameters (e.g., the diameter of the major axis, the diameter of the minor axis, and/or the center of the ellipse) of the determined at least one ellipse, whether the immersive image includes a monoscopic Fisheye format.

In Example 71, the subject-matter of any one of Examples 68 to 70 can optionally include that the one or more processors are configured to determine that the immersive image includes a monoscopic Fisheye format in the case that: the diameter of the major axis and/or the diameter of the minor axis of the at least one ellipse is greater than a predefined fraction of the height and/or the width of the immersive image, and/or a distance between the center of the at least one ellipse and the center of the immersive image is less than or equal to a predefined maximum distance.

In Example 72, the subject-matter of Example 70 or 71 can optionally include that the one or more processors are configured to determine that the immersive image includes a monoscopic Equirectangular format in the case that the immersive image is determined as having no monoscopic Fisheye format.

In Example 73, the subject-matter of any one of Examples 68 to 72 can optionally include that the one or more processors are configured to convert the immersive image into a greyscale image prior to detecting, whether the immersive image includes at least one ellipse.

In Example 74, the subject-matter of any one of Examples 68 to 73 can optionally include that the one or more processors are configured to reduce the resolution of the immersive image prior to detecting, whether the immersive image includes the at least one ellipse.

In Example 75, the subject-matter of any one of Examples 68 to 74 can optionally include that the one or more processors are configured to reduce the sharpness of the immersive image prior to detecting, whether the immersive image includes the at least one ellipse.

In Example 76, the subject-matter of any one of Examples 37 to 51 and optionally further according to any one of Examples 68 to 75 can optionally include that the one or more processors are configured to, in the case that the monoscopic format is determined for the immersive image: detect in an upper edge region of the immersive image and/or a lower edge region of the immersive image a respective edge value in height direction of the immersive image and in width direction of the immersive image using an edge detector (e.g., the Scharr algorithm, the Sobel algorithm, and/or the Laplace algorithm), wherein the edge value indicates an amount of edge within the respective edge region, determine a ratio of the edge value in width direction to the edge value in height direction, and determine that the immersive image includes no Equirectangular format in the case that the determined ratio is greater than a predefined edge ratio threshold value.

In Example 77, the subject-matter of Example 76 can optionally include that the one or more processors are configured to determine that the immersive image includes a Fisheye format in the case that the immersive image is determined as having no Equirectangular format.

In Example 78, the subject-matter of Example 76 can optionally include that the one or more processors are configured to determine, whether the ratio of the edge value in width direction to the edge value in height direction is greater than the predefined edge ratio threshold value, in the case that it is determined according to Example 70 or 71 that the immersive image includes no monoscopic Fisheye format.

In Example 79, the subject-matter of any one of Examples 76 to 78 can optionally include that the one or more processors are configured to convert the immersive image into a greyscale image prior to detecting the edge values.

In Example 80, the subject-matter of any one of Examples 76 to 79 can optionally include that the one or more processors are configured to reduce the resolution of the immersive image prior to detecting the edge values.

In Example 81, the subject-matter of any one of Examples 76 to 80 can optionally include that the one or more processors are configured to, in the case that the determined ratio is less than or equal to the predefined edge ratio threshold value: reduce the width of the immersive image while keeping the height unchanged, increase the height and width of the immersive image with reduced width in the same proportion such that the width of the immersive image corresponds to the original width prior to reducing the width, determine a difference between the respective edge region of the immersive image prior to reducing the size and the edge region after increase the image size, and determine that the immersive image includes a monoscopic Equirectangular format in the case that the difference is less than a predefined edge region difference threshold value.

In Example 82, the subject-matter of Example 81 can optionally include that the one or more processors are configured to determine that the immersive image includes a Fisheye format in the case that the difference is greater than or equal to the predefined edge region difference threshold value.

In Example 83, the subject-matter of any one of Examples 76 to 81 can optionally include that, in the case that it is determined that the immersive image includes no Equirectangular format, the one or more processors are configured to select a larger region of the immersive image as edge region and to determine again, whether the ratio of the edge value in width direction to the edge value in height direction is greater than the predefined edge ratio threshold value.

In Example 84, the subject-matter of any one of Examples 1 to 83 can optionally include that the one or more processors are configured to determine a format of an immersive video by determining the format of at least one immersive image of the immersive video.

In Example 85, the subject-matter of any one of Examples 1 to 84 can optionally include that the one or more processors are further configured to: generate a thumbnail of the immersive image using the determined format of the immersive image.

In Example 86, the subject-matter of Example 85 can optionally include that the one or more processors are configured to, in the case that the immersive image is determined as having an Equirectangular format: select, within the immersive image, a rectangle (e.g., a square) originating in a predefined point of the immersive image (e.g., showing about 65 percent of the immersive image), and generate the thumbnail of the immersive image showing the selected rectangle.

In Example 87, the subject-matter of Example 85 or 86 can optionally include that the one or more processors are configured to, in the case that the immersive image is determined as having a half-spherical Fisheye format: select, within the immersive image, a rectangle (e.g., a square) originating in a predefined point of the immersive image, and generate the thumbnail of the immersive image showing the selected rectangle.

In Example 88, the subject-matter of any one of Examples 85 to 87 can optionally include that the one or more processors are configured to, in the case that the immersive image is determined as having a spherical Fisheye format: select one half-spherical image of the spherical immersive image as forward direction and the other half-spherical image of the spherical immersive image as backward direction (e.g., using metadata) select, within the half-spherical immersive image selected as forward direction, a rectangle (e.g., a square) originating in a predefined point of the half-spherical immersive image, and generate the thumbnail of the immersive image showing the selected rectangle.

In Example 89, the subject-matter of Example 88 can optionally include that the one or more processors are configured to determine a camera model and/or camera manufacturer of the camera which acquired the image and to determine the forward direction using the determined camera model and/or camera manufacturer. A memory may store information about a plurality of camera models and/or camera manufacturers and corresponding arrangement of the image associated with the forward direction and the image associated with the backward direction. Optionally, the one or more processors may detect one or more ellipses in the image in accordance with Example 52 and may determine the camera model and/or camera manufacturer using the diameter of the major axis and/or the diameter of the minor axis of the detected one or more ellipses. Additionally or alternatively, the memory may store a list which includes a plurality of sensors of cameras and a corresponding noise behavior and the one or more processors may be configured to determine a noise behavior of the image and to determine the camera model and/or camera manufacturer by comparing the determined noise behavior with the noise behaviors in the stored list.

In Example 90, the subject-matter of any one of Examples 85 to 89 can optionally include that the one or more processors are configured to, in the case that the immersive image is determined as having a monoscopic Cubemap format: divide the immersive image into six sub-images transitioning into each other, wherein each of the six sub-images corresponds to one of the following directions: a forward direction (x), a backward direction (−x) opposite to the forward direction, an up direction (y), a down direction (−y) opposite to the up direction, a left direction (z), and a right direction (−z) opposite to the left direction, select, within the sub-image corresponding to the forward direction, a rectangle (e.g., a square) originating in a predefined point of the half-spherical immersive image, and generate the thumbnail of the immersive image showing the selected rectangle.

In Example 91, the subject-matter of any one of Examples 85 to 90 can optionally include that the one or more processors are configured to, in the case that the immersive image is determined as having a stereoscopic Cubemap format: divide each of the two images of the stereoscopic immersive image into six sub-images transitioning into each other, wherein each of the six sub-images corresponds to one of the following directions: a forward direction (x), a backward direction (−x) opposite to the forward direction, an up direction (y), a down direction (−y) opposite to the up direction, a left direction (z), and a right direction (−z) opposite to the left direction, select one of the two images of the stereoscopic immersive image, select, within the sub-image corresponding to the forward direction of the selected image, a rectangle (e.g., a square) originating in a predefined point of the half-spherical immersive image, and generate the thumbnail of the immersive image showing the selected rectangle. Optionally, the one or more processors may be configured to select the fifth sub-image as forward direction.

In Example 92, the subject-matter of any one of Examples 86 to 91 can optionally include that the one or more processors are configured to select the rectangle by selecting a non-rectangular image area within the image and by converting (e.g., projecting) the selected non-rectangular image area into a perspective representation being rectangular.

In Example 93, the subject-matter of any one of Examples 85 to 92 can optionally include that the one or more processors are further configured to: render the immersive image depending on the determined format, generate the thumbnail of the immersive image by taking a screenshot of a portion within the rendered immersive image.

In Example 94, the subject-matter of any one of Examples 85 to 93 can optionally include that the one or more processors are configured to: render the immersive image depending on the determined format, generate the thumbnail of the immersive image as an animated thumbnail showing a plurality of consecutive images from a first point within the immersive image to the second point within the immersive image.

In Example 95, the subject-matter of any one of Examples 86 to 94 can optionally include that the predefined point is the center of the immersive image.

In Example 96, the subject-matter of any one of Examples 86 to 95 can optionally include that the one or more processors are further configured to: detect one or more faces within the immersive image using a face detection, select one of the detected one or more faces as the predefined point.

In Example 97, the subject-matter of any one of Examples 1 to 96 can optionally include that the one or more processors are further configured to: determine (e.g., select) parameters for rendering the immersive image using the determined format of the immersive image.

In Example 98, the subject-matter of Example 97 can optionally include that the one or more processors are configured to, in the case that the immersive image is determined as having an Equirectangular format: determine (e.g., calculate) a first mipmap level in width direction (x) of the immersive image and a second mipmap level in height direction (y) of the immersive image (e.g., using a shader and/or graphics driver), select an upper edge region of the immersive image and/or a lower edge region of the immersive image, select, for the outermost pixel row of the selected edge region, a predefined mipmap shifting bias, select, for the innermost pixel row of the selected edge region, a mipmap shifting bias equal to zero, determining for each pixel row of the selected edge region a mipmap shifting bias by interpolating (e.g., using a linear interpolation, a sinus function, etc.) the predefined mipmap shifting bias in height direction of the immersive image from the outmost pixel towards zero at the innermost pixel row, adjust the determined second mipmap level using the mipmap shifting biases, and rendering the immersive image using the determined first mipmap level and the adjusted second mipmap level.

Example 99 is a method (e.g., a method of determining a format of an immersive image) including: determining an aspect ratio of an immersive image and one or more additional characteristics of the immersive image, and determining a format of the immersive image using the determined aspect ratio and the determined one or more additional characteristics of the immersive image. The format may be determined using any of the features described in Examples 1 to 96.

Example 100 is a non-transitory computer-readable medium having instructions recorded thereon which, when executed by one or more processors, cause the one or more processors to carry out the method according to Example 99.

Example 101 is a device including: one or more processors configured to: determine (e.g., calculate) a first mipmap level in width direction (x) of an immersive image having an Equirectangular format and a second mipmap level in height direction (y) of the immersive image (e.g., using a shader and/or graphics driver), select an upper edge region of the immersive image and/or a lower edge region of the immersive image, select, for the outermost pixel row of the selected edge region, a predefined mipmap shifting bias, select, for the innermost pixel row of the selected edge region, a mipmap shifting bias equal to zero, determine for each pixel row of the selected edge region a mipmap shifting bias by interpolating (e.g., using a linear interpolation, a sinus function, etc.) the predefined mipmap shifting bias in height direction of the immersive image from the outmost pixel towards zero at the innermost pixel row, adjust the determined second mipmap level using the mipmap shifting biases, and render the immersive image using the determined first mipmap level and the adjusted second mipmap level.

Example 102 is a method (e.g., a method of rendering an immersive image) including: determining a first mipmap level in width direction of an immersive image having an Equirectangular format and a second mipmap level in height direction of the immersive image, selecting an upper edge region of the immersive image and/or a lower edge region of the immersive image, selecting, for the outermost pixel row of the selected edge region, a predefined mipmap shifting bias, selecting, for the innermost pixel row of the selected edge region, a mipmap shifting bias equal to zero, determining for each pixel row of the selected edge region a mipmap shifting bias by interpolating the predefined mipmap shifting bias in height direction of the immersive image from the outmost pixel towards zero at the innermost pixel row, adjusting the determined second mipmap level using the mipmap shifting biases, and rendering the immersive image using the determined first mipmap level and the adjusted second mipmap level.

Example 103 is a non-transitory computer-readable medium having instructions recorded thereon which, when executed by one or more processors, cause the one or more processors to carry out the method according to Example 102.

Example 104 is a method of training a neural network, the method including: for each image of a plurality of images, determine, whether the image is a non-immersive image or an immersive image using an aspect ratio of the image; for each immersive image of the plurality of images, determine a format of the immersive image using the aspect ratio and one or more additional characteristics of the immersive image; for each image of the plurality of images, training the neural network to, responsive to inputting the image to the neural network, output: whether the image is a non-immersive image or an immersive image, and in the case that the image is the immersive image, the format of the immersive image.

What is claimed is:

1. A device, comprising:
one or more processors configured to:
  determine an aspect ratio of an immersive image and one or more additional characteristics of the immersive image; and
  determine a format of the immersive image using the determined aspect ratio and the determined one or more additional characteristics of the immersive image,
wherein the one or more processors are configured to divide the immersive image depending on the determined aspect ratio either:
  vertically into a first image and a second image of equal size such that the first image and the second image are arranged side-by-side, or
  horizontally in the first image and the second image such that the first image and the second image are arranged on top of each other
wherein, in a transition from the first image to the second image, each first pixel of a plurality of first pixels of the first image is adjacent to a corresponding second pixel of a plurality of second pixels of the second image;
wherein the one or more processors are configured to:
  determine for each first pixel of the plurality of first pixel a difference between the pixel value of the first pixel and the pixel value of the second pixel adjacent to the first pixel, wherein the aggregated differences between the plurality of first pixels and the plurality of second pixels is an additional characteristic of the one or more additional characteristics of the immersive image,
determine respective features of the first image and the second image using a feature detector,
determine a feature metric using a feature matcher, wherein the feature metric comprises matching features of the first image and the second image having a first value for the first image and a second value for the second image, and
determine, whether the immersive image comprises a monoscopic format or a stereoscopic format, using the feature metric and the aggregated differences between the plurality of first pixels and the plurality of second pixels.

2. The device according to claim 1,
wherein the format of the immersive image comprises an Equirectangular format, a Fisheye format or a Cubemap format; and/or,
wherein the format of the immersive image indicates, whether the immersive image is a stereoscopic image or a monoscopic image, wherein, preferably, the format indicates: whether the two images of the stereoscopic immersive image are arranged side-by-side or whether the two images of the stereoscopic immersive image are arranged on top of each other or whether the two images of the stereoscopic immersive image exist as two separate files; and/or,
wherein the format of the immersive image indicates, whether the immersive image is a spherical or a half-spherical immersive image.

3. The device according to claim 1,
wherein the one or more processors are configured to divide the immersive image into a plurality of sub-images transitioning into each other in the case that the aspect ratio of the immersive image is a ratio of about 6:1, of about 6:2 or of about 12:1.

4. The device according to claim 3,
wherein at each transition from one sub-image to another sub-image of the plurality of sub-images each pixel of a plurality of pixels of the sub-image is adjacent to a respective other pixel of a plurality of other pixels of the other sub-image:
wherein the one or more processors are configured to, for at least one transition, for each pixel of the plurality of pixels of the sub-image, determine a difference between the pixel value of the pixel and the pixel value of the other pixel of the other sub-image adjacent to the pixel; and
wherein the one or more processors are configured to determine, whether the immersive image comprises a Cubemap format, using the determined aspect ratio and the aggregated differences between the plurality of pixels of the sub-image and the plurality of other pixels of the other sub-image.

5. The device according to claim 1,
wherein the one or more processors are configured to:
determine a modified feature metric by multiplying, for each matching feature of the feature metric, the first value with a first threshold value and the second value with a second threshold value, wherein the first threshold value is determined using the second image and the aggregated differences between the plurality of first pixels and the plurality of second pixels and wherein the second threshold value is determined using the first image and the aggregated differences between the plurality of first pixels and the plurality of second pixels, and
determine, whether the immersive image comprises a monoscopic format or a stereoscopic format, using the modified feature metric.

6. The device according to claim 1,
wherein each matching feature of the feature metric is associated with a pixel of the first image and a pixel of the second image, wherein the position of each pixel is characterized by a height value in a height direction and a width value in a width direction; and
wherein the one or more processors are configured to:
determine, for each matching feature of the feature metric, a difference between the height value of the first image and the height value of the second image,
determine that the immersive image comprises a stereoscopic format in the case that the aggregated differences are less than or equal to a predefined height difference threshold value.

7. The device according to claim 1,
wherein the one or more processors are configured to:
discard an outer region of the first image and an outer region of the second image prior to determining the features using the feature detector, and
determine the features of the first image for a remaining region of the first image and the features of the second image for a remaining region of the second image using the feature detector.

8. The device according to claim 1,
wherein the one or more processors are configured to:
increase the brightness of the immersive image prior to determining the features using the feature detector.

9. The device according to claim 1,
wherein the one or more processors are configured to, in the case that the stereoscopic format is determined for the immersive image, detect using image recognition, whether the first image comprises at least one first ellipse having a ratio of the diameter of the minor axis to the diameter of the major axis greater than a predefined axis ratio and/or whether the second image comprises at least one second ellipse having a ratio of the diameter of the minor axis to the diameter of the major axis greater than the predefined axis ratio.

10. The device according to claim 9,
wherein the one or more processors are configured to determine that the immersive image comprises a stereoscopic Fisheye format in the case that:
the diameter of the major axis and/or the diameter of the minor axis of the at least one first ellipse is greater than a predefined fraction of the height and/or the width of the first image, and/or
the diameter of the major axis and/or the diameter of the minor axis of the at least one second ellipse is greater than a predefined fraction of the height and/or the width of the second image, and/or
a distance between the center of the at least one first ellipse and the center of the first image is less than or equal to a predefined maximum distance, and/or
a distance between the center of the at least one second ellipse and the center of the second image is less than or equal to the predefined maximum distance.

11. The device according to claim 1,
wherein the one or more processors are configured to, in the case that the stereoscopic format is determined for the immersive image:
detect in an upper edge region of the first image, a lower edge region of the first image, an upper edge region of the second image, and/or a lower edge region of the second image a respective edge value in height direction of the respective image and in width direction of the respective image using an edge detector, wherein the edge value indicates an amount of edge within the respective edge region:
   determine a ratio of the edge value in width direction to the edge value in height direction; and
   determine that the immersive image comprises no Equirectangular format in the case that the determined ratio is greater than a predefined edge ratio threshold value.

12. The device according to claim 11,
wherein the one or more processors are configured to, in the case that the determined ratio is less than or equal to the predefined edge ratio threshold value:
   reduce the width of the first image and/or the second image while keeping the height unchanged:
   increase the height and width of the respective image with reduced width in the same proportion such that the width of the respective image corresponds to the original width prior to reducing the width:
   determine a difference between the respective edge region of the respective image prior to reducing the size and the edge region after increase the image size; and
   determine that the immersive image comprises a stereoscopic Equirectangular format in the case that the difference is less than a predefined edge region difference threshold value.

13. The device according to claim 1,
wherein the one or more processors are further configured to:
   generate a thumbnail of the immersive image using the determined format of the immersive image.

14. The device according to claim 13,
wherein the one or more processors are configured to, in the case that the immersive image is determined as having an Equirectangular format or as having a half-spherical Fisheye format:
   select, within the immersive image, a rectangle originating in a predefined point of the immersive image; and
   generate the thumbnail of the immersive image showing the selected rectangle.

15. The device according to claim 13,
wherein the one or more processors are further configured to:
   render the immersive image depending on the determined format; and
   generate the thumbnail of the immersive image:
      by taking a screenshot of a portion within the rendered immersive image: or
      as an animated thumbnail showing a plurality of consecutive images from a first point within the immersive image to the second point within the immersive image.

16. The device according to claim 1,
wherein the one or more processors are further configured to:
   determine an aspect ratio of an image, and
   determine, whether the image is a non-immersive image or the immersive image, using the determined aspect ratio of the image.

17. A method, comprising:
providing the device of claim 1;
   determining an aspect ratio of an immersive image and one or more additional characteristics of the immersive image; and
   determining a format of the immersive image using the determined aspect ratio and the determined one or more additional characteristics of the immersive image.

18. A method of training a neural network, the method comprising:
providing the device of claim 1;
   for each image of a plurality of images, determine, whether the image is a non-immersive image or an immersive image using an aspect ratio of the image:
   for each immersive image of the plurality of images, determine a format of the immersive image using the aspect ratio and one or more additional characteristics of the immersive image; and
   for each image of the plurality of images, training the neural network to, responsive to inputting the image to the neural network, output:
      whether the image is a non-immersive image or an immersive image, and
      in the case that the image is the immersive image, the format of the immersive image.

* * * * *